(12) United States Patent
Shahamat et al.

(10) Patent No.: US 10,412,487 B2
(45) Date of Patent: Sep. 10, 2019

(54) AUTO-PROVISIONING OF WIRELESS SPEAKER DEVICES FOR AUDIO/VIDEO RECORDING AND COMMUNICATION DEVICES

(71) Applicant: Ring Inc., Santa Monica, CA (US)

(72) Inventors: Ahmad Shahamat, Santa Monica, CA (US); Ajay M. Raval, Camarillo, CA (US); Elliott Lemberger, Santa Monica, CA (US); Joshua Yoon, Los Angeles, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/784,041

(22) Filed: Oct. 13, 2017

(65) Prior Publication Data

US 2018/0041830 A1 Feb. 8, 2018

Related U.S. Application Data

(63) Continuation-in-part of application No. 15/217,741, filed on Jul. 22, 2016, now Pat. No. 9,948,892, which
(Continued)

(51) Int. Cl.
*G08B 3/10* (2006.01)
*H04M 1/02* (2006.01)
(Continued)

(52) U.S. Cl.
CPC ............. *H04R 3/00* (2013.01); *G08B 3/10* (2013.01); *G08B 13/19619* (2013.01); *G08B 13/19656* (2013.01); *H04L 12/2823* (2013.01); *H04L 12/2825* (2013.01); *H04L 12/2869* (2013.01); *H04L 41/0886* (2013.01); *H04M 1/0291* (2013.01); *H04M 11/025* (2013.01);
(Continued)

(58) Field of Classification Search
CPC combination set(s) only.
See application file for complete search history.

(56) References Cited

U.S. PATENT DOCUMENTS 7,193,644 B2   3/2007 Carter
8,139,098 B2   3/2012 Carter
(Continued)

*Primary Examiner* — Phung-Hoang J Nguyen
(74) *Attorney, Agent, or Firm* — Chong IP Law, LLP

(57) ABSTRACT

Methods for a speaker device in accordance with various embodiments of the present disclosure are provided. In one embodiment, a method for a speaker device is provided, the method comprising transmitting a first provisioning beacon signal using the communication module; receiving, in response to the provisioning beacon signal, at least one credential signal from a network device configured to provide an access point, wherein the at least one credential signal includes credential data; storing the credential data in the non-volatile memory; attempting to connect to the access point using the credential data; determining whether the attempt to connect to the access point was successful; and playing a first audio prompt, using the speaker, upon determining an unsuccessful connection to the access point, wherein the first audio prompt comprises a statement indicating that the connection to the access point was unsuccessful.

23 Claims, 48 Drawing Sheets

Related U.S. Application Data is a continuation-in-part of application No. 15/150,387, filed on May 9, 2016, which is a continuation-in-part of application No. 14/905,653, filed as application No. PCT/US2014/046952 on Jul. 17, 2014, now Pat. No. 9,734,675, said application No. 15/217,741 is a continuation-in-part of application No. 14/334,922, filed on Jul. 18, 2014.

(60) Provisional application No. 61/847,816, filed on Jul. 18, 2013, provisional application No. 61/847,274, filed on Jul. 17, 2013.

(51) Int. Cl.

| | | |
|---|---|---|
| *H04N 7/14* | (2006.01) | |
| *H04N 7/18* | (2006.01) | |
| *H04R 3/00* | (2006.01) | |
| *H04L 12/24* | (2006.01) | |
| *H04L 12/28* | (2006.01) | |
| *H04M 1/725* | (2006.01) | |
| *H04M 11/02* | (2006.01) | |
| *H04W 88/04* | (2009.01) | |
| *G08B 13/196* | (2006.01) | |

(52) U.S. Cl.
CPC ............... *H04N 7/14* (2013.01); *H04N 7/142* (2013.01); *H04N 7/148* (2013.01); *H04N 7/185* (2013.01); *H04N 7/186* (2013.01); *H04W 88/04* (2013.01); *G08B 13/19695* (2013.01); *H04L 2012/285* (2013.01); *H04L 2012/2841* (2013.01); *H04M 1/7253* (2013.01); *H04R 2420/07* (2013.01)

(56) References Cited

U.S. PATENT DOCUMENTS

| | | | |
|---|---|---|---|
| 8,144,183 | B2 | 3/2012 | Carter |
| 8,154,581 | B2 | 4/2012 | Carter |
| 8,872,915 | B1 | 5/2014 | Scalisi et al. |
| 8,780,201 | B1 | 7/2014 | Scalisi et al. |
| 8,823,795 | B1 | 9/2014 | Scalisi et al. |
| 8,842,180 | B1 | 9/2014 | Kasmir et al. |
| 8,937,659 | B1 | 1/2015 | Scalisi et al. |
| 8,941,736 | B1 | 1/2015 | Scalisi |
| 8,947,530 | B1 | 2/2015 | Scalisi |
| 8,953,040 | B1 | 2/2015 | Scalisi et al. |
| 9,013,575 | B2 | 4/2015 | Scalisi |
| 9,049,352 | B2 | 6/2015 | Scalisi et al. |
| 9,053,622 | B2 | 6/2015 | Scalisi |
| 9,058,738 | B1 | 6/2015 | Scalisi |
| 9,060,103 | B2 | 6/2015 | Scalisi |
| 9,060,104 | B2 | 6/2015 | Scalisi |
| 9,065,987 | B2 | 6/2015 | Scalisi |
| 9,094,584 | B2 | 7/2015 | Scalisi et al. |
| 9,113,051 | B1 | 8/2015 | Scalisi |
| 9,113,052 | B1 | 8/2015 | Scalisi et al. |
| 9,118,819 | B1 | 8/2015 | Scalisi et al. |
| 9,142,214 | B2 | 9/2015 | Scalisi |
| 9,160,987 | B1 | 10/2015 | Kasmir et al. |
| 9,165,444 | B2 | 10/2015 | Scalisi |
| 9,172,920 | B1 | 10/2015 | Kasmir et al. |
| 9,172,921 | B1 | 10/2015 | Scalisi et al. |
| 9,172,922 | B1 | 10/2015 | Kasmir et al. |
| 9,179,107 | B1 | 11/2015 | Scalisi |
| 9,179,108 | B1 | 11/2015 | Scalisi |
| 9,179,109 | B1 | 11/2015 | Kasmir et al. |
| 9,196,133 | B2 | 11/2015 | Scalisi et al. |
| 9,197,867 | B1 | 11/2015 | Scalisi et al. |
| 9,230,424 | B1 | 1/2016 | Scalisi et al. |
| 9,237,318 | B2 | 1/2016 | Kasmir et al. |
| 9,247,219 | B2 | 1/2016 | Kasmir et al. |
| 9,253,455 | B1 | 2/2016 | Harrison et al. |
| 9,342,936 | B2 | 5/2016 | Scalisi |
| 9,508,239 | B1 | 11/2016 | Harrison et al. |
| 9,736,284 | B2 | 8/2017 | Scalisi et al. |
| 9,743,049 | B2 | 8/2017 | Scalisi et al. |
| 9,769,435 | B2 | 9/2017 | Scalisi et al. |
| 9,786,133 | B2 | 10/2017 | Harrison et al. |
| 9,799,183 | B2 | 10/2017 | Harrison et al. |
| 2006/0258323 | A1* | 11/2006 | Hara ................... H04M 1/7253 455/343.2 |
| 2013/0047233 | A1* | 2/2013 | Fisk .................... G06F 21/6245 726/7 |
| 2013/0242852 | A1* | 9/2013 | Petros ................. H04W 88/04 370/315 |

* cited by examiner

AUTO-PROVISIONING OF WIRELESS SPEAKER DEVICES FOR AUDIO/VIDEO RECORDING AND COMMUNICATION DEVICES

CROSS-REFERENCE TO RELATED APPLICATIONS

This application is a continuation-in-part of application Ser. No. 15/217,741, filed on Jul. 22, 2016, which is a continuation-in-part of application Ser. No. 15/150,387, filed on May 9, 2016, which is a continuation-in-part of application Ser. No. 14/905,653, filed on Jan. 15, 2016, which is a national stage entry of international application Serial No. PCT/US2014/046952, filed on Jul. 17, 2014, which claims priority to provisional application Ser. No. 61/847,274, filed on Jul. 17, 2013. The application Ser. No. 15/217,741, filed on Jul. 22, 2016 is also a continuation-in-part of application Ser. No. 14/334,922, filed on Jul. 18, 2014, which claims priority to provisional application Ser. No. 61/847,816, filed on Jul. 18, 2013. The entire contents of the priority applications are hereby incorporated by reference in their entireties as if fully set forth.

TECHNICAL FIELD

The present embodiments relate to audio/video (A/V) recording and communication devices, including wireless A/V recording and communication doorbell systems. In particular, the present embodiments improve on the functionality of A/V recording and communication devices by providing auto-provisioning of wireless speaker devices configured for use with A/V recording and communication devices.

BACKGROUND

Home safety is a concern for many homeowners and renters. Those seeking to protect or monitor their homes often wish to have video and audio communications with visitors, for example, those visiting an external door or entryway. Audio/Video (A/V) recording and communication devices, such as doorbells, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

SUMMARY

The various embodiments of the present auto-provisioning of wireless speaker devices for audio/video (A/V) recording and communication devices, have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that the process for setting up (also referred to herein as "provisioning") wireless speaker devices for A/V recording and communication devices sometimes results in failure, and the reason(s) for the failure may not be apparent, which can lead to frustration for the person attempting to provision the wireless speaker device. Another aspect of the present embodiments includes the realization that provisioning wireless speaker devices for A/V recording and communication devices sometimes succeeds, but thereafter the wireless speaker device performs poorly due to weak wireless signal strength, and the reason(s) for the poor performance may not be apparent, which can lead to frustration for the user of the wireless speaker device. The present embodiments solve these problems by providing audio prompts to the user to inform him or her of why the setup process failed and/or to inform him or her that the setup process was successful but the wireless signal is weak, which could cause poor performance. For example, a speaker device, such as a wireless speaker device, may be configured to auto-provision (e.g., to perform the provisioning process with little to no user intervention) during initial setup using at least one audio prompt played using a speaker of the speaker device. In various embodiments, upon powering up, the speaker device may be configured to automatically attempt to connect to an access point provided by a network device, such as (but not limited to) a router, and to play at least one audio prompt indicating successful or unsuccessful connection of the speaker device to the access point. Further, where the connection to the access point is unsuccessful, the audio prompt may include a statement that the provisioning process was unsuccessful because the wireless signal is too weak, and may include a further statement directing a user to move the speaker device and the access point closer to one another (e.g., by directing the user to move the speaker device to a location closer to the access point, or by directing the user to move the access point to a location closer to the speaker device), and/or to remove any obstructions that may be between the speaker device and the access point, in order to improve the connection reliability of the speaker device to the access point. In such embodiments, the setup of the speaker device may be more reliable (e.g., result in fewer failed attempts), may require less user input, and may be more efficient, since the various audio prompts may immediately inform the user of why the setup attempt failed and how to fix the problem, and/or immediately inform the user of why the setup, though successful, may result in poor performance. It would be advantageous, therefore, to allow for auto-provisioning of wireless speaker devices for A/V recording and communication devices using at least one audio prompt. The present embodiments provide these advantages, as described below.

Another aspect of the present embodiments includes the realization that when an attempt to provision a wireless speaker device for A/V recording and communication devices fails, and another attempt is made to provision the device, often the same setup steps must be performed by the user, which can lead to fatigue, frustration, and/or customer dissatisfaction. The present embodiments solve this problem by configuring the wireless speaker device to reboot and automatically attempt again to connect to the access point using locally stored network credentials, when a user reattempts to set up the wireless speaker device, such as in a different location and/or at a different point in time. The user thus does not have to repeat one or more user steps for provisioning the wireless speaker device during subsequent attempts to provision the wireless speaker device. In such embodiments, the setup of the speaker device may be more reliable (e.g., result in fewer failed attempts), may require less user input, and may be more efficient, since the user does not have to repeat one or more setup steps. It would be advantageous, therefore, to allow for auto-provisioning of wireless speaker devices for A/V recording and communication devices using at least one audio prompt. The present embodiments provide these advantages, as described below.

Another aspect of the present embodiments includes the realization that wireless devices, such as (but not limited to) A/V recording and communication devices, may from time to time experience weak signal strength (and occasionally complete loss of signal) from their wireless access point. The present embodiments solve this problem by configuring the wireless speaker device to serve as a repeater/extender for the access point, enabling various other network devices, such as (but not limited to) A/V recording and communication devices to connect to the repeater/extender, and to further provide locally stored network credentials for the access point to the other network devices, thereby enabling those devices to switch their connection from the wireless speaker device to the access point when the signal received by those devices from the access point is stronger than the signal received by those devices from the repeater/extender, and/or when the signal strength received by those devices from the repeater/extender drops below a threshold, thereby providing a stronger and more reliable connection to the Internet for the other network devices.

In a first aspect, a wireless speaker device configured for use with a wireless audio/video (A/V) recording and communication device, a local area network (LAN) including one or more LAN devices, and a wide area network (WAN) including one or more WAN devices is provided, the wireless speaker device comprising a wireless communication module including a wireless repeater configured to receive a wireless signal from the one or more LAN devices and rebroadcast the wireless signal, and a speaker, wherein the wireless speaker device is configured to receive from the one or more WAN devices, via the one or more LAN devices and via the wireless communication module of the wireless speaker device, a tone signal, the tone signal including a command to the wireless speaker device to emit a tone from the speaker of the wireless speaker device, and wherein the wireless speaker device is configured to emit the tone from the speaker of the wireless speaker device in response to receiving the tone signal including the command.

In an embodiment of the first aspect, the wireless speaker device is further configured to receive from the one or more WAN devices, via the one or more LAN devices and via the wireless communication module of the wireless speaker device, the tone signal in response to the one or more WAN devices receiving from the wireless A/V recording and communication device, via the one or more LAN devices, a visitor detection signal, the visitor detection signal indicating that a visitor has been detected at the wireless A/V recording and communication device.

In another embodiment of the first aspect, the wireless A/V recording and communication device comprises a wireless A/V recording and communication doorbell including a button, and wherein the visitor detection signal comprises a button press signal indicating that the doorbell button has been pressed.

In another embodiment of the first aspect, the wireless A/V recording and communication device further comprises a motion detector, and wherein the visitor detection signal is received in response to the motion detector detecting motion at the wireless A/V recording and communication device.

In another embodiment of the first aspect, the one or more WAN devices comprises one or more servers.

In another embodiment of the first aspect, the one or more WAN devices comprises one or more network services.

In a second aspect, a method for communicating among a wireless audio/video (A/V) recording and communication device, a wireless speaker device including a speaker and a wireless repeater, a local area network (LAN) including one or more LAN devices, and a wide area network (WAN) including one or more WAN devices is provided, the method comprising the wireless repeater receiving a wireless signal from the one or more LAN devices and rebroadcasting the wireless signal, the one or more WAN devices receiving from the wireless A/V recording and communication device, via the one or more LAN devices, a visitor detection signal, the visitor detection signal indicating that a visitor has been detected at the wireless A/V recording and communication device, the one or more WAN devices transmitting to the wireless speaker device, via the one or more LAN devices, in response to receiving the visitor detection signal, a tone signal, the tone signal including a command to the wireless speaker device to emit a tone from the speaker of the wireless speaker device.

In an embodiment of the second aspect, the wireless A/V recording and communication device comprises a wireless A/V recording and communication doorbell including a button.

In another embodiment of the second aspect, the visitor detection signal comprises a button press signal indicating that the doorbell button has been pressed.

In another embodiment of the second aspect, the wireless A/V recording and communication device further comprises a motion detector.

In another embodiment of the second aspect, the visitor detection signal is received in response to the motion detector detecting motion at the wireless A/V recording and communication device.

Another embodiment of the second aspect further comprises the one or more WAN devices receiving from the wireless A/V recording and communication device a first alert signal and a first video signal, the first video signal including images captured by a camera of the wireless A/V recording and communication device.

Another embodiment of the second aspect further comprises the one or more WAN devices transmitting to a client device, in response to receiving the first alert signal and the first video signal, a second alert signal and a second video signal, the second video signal including the images captured by the camera of the wireless A/V recording and communication device.

In another embodiment of the second aspect, the client device is a smartphone.

In another embodiment of the second aspect, the one or more WAN devices comprises one or more servers.

In another embodiment of the second aspect, the one or more WAN devices comprises one or more network services.

In a third aspect, a wireless speaker device configured for use with a wireless audio/video (A/V) recording and communication device, a local area network (LAN) including one or more LAN devices, and a wide area network (WAN) including one or more WAN devices is provided, the wireless speaker device comprising a wireless communication module configured to transmit data wirelessly to and/or receive data wirelessly from another wireless device, independently of the LAN, via a direct wireless connection to another wireless device, and a speaker, wherein the wireless speaker device is configured to receive from the one or more WAN devices, via the one or more LAN devices and via the wireless communication module of the wireless speaker device, a tone signal, the tone signal including a command to the wireless speaker device to emit a tone from the speaker of the wireless speaker device, and wherein the wireless speaker device is configured to emit the tone from the speaker of the wireless speaker device in response to receiving the tone signal including the command.

In an embodiment of the third aspect, the wireless speaker device is further configured to receive from the one or more WAN devices, via the one or more LAN devices and via the wireless communication module of the wireless speaker device, the tone signal in response to the one or more WAN devices receiving from the wireless A/V recording and communication device, via the one or more LAN devices, a visitor detection signal, the visitor detection signal indicating that a visitor has been detected at the wireless A/V recording and communication device.

In another embodiment of the third aspect, the wireless A/V recording and communication device comprises a wireless A/V recording and communication doorbell including a button, and wherein the visitor detection signal comprises a button press signal indicating that the doorbell button has been pressed.

In another embodiment of the third aspect, the wireless A/V recording and communication device further comprises a motion detector, and wherein the visitor detection signal is received in response to the motion detector detecting motion at the wireless A/V recording and communication device.

In another embodiment of the third aspect, the one or more WAN devices comprises one or more servers.

In another embodiment of the third aspect, the one or more WAN devices comprises one or more network services.

In a fourth aspect, a method for communicating among a wireless audio/video (A/V) recording and communication device, a wireless speaker device including a speaker and a wireless communication module, a local area network (LAN) including one or more LAN devices, and a wide area network (WAN) including one or more WAN devices is provided, the method comprising the wireless communication module transmitting data wirelessly to and/or receiving data wirelessly from another wireless device, independently of the LAN, via a direct wireless connection to another wireless device, the one or more WAN devices receiving from the wireless A/V recording and communication device, via the one or more LAN devices, a visitor detection signal, the visitor detection signal indicating that a visitor has been detected at the wireless A/V recording and communication device, and the one or more WAN devices transmitting to the wireless speaker device, via the one or more LAN devices, in response to receiving the visitor detection signal, a tone signal, the tone signal including a command to the wireless speaker device to emit a tone from the speaker of the wireless speaker device.

In an embodiment of the fourth aspect, the wireless A/V recording and communication device comprises a wireless A/V recording and communication doorbell including a button.

In another embodiment of the fourth aspect, the visitor detection signal comprises a button press signal indicating that the doorbell button has been pressed.

In another embodiment of the fourth aspect, the wireless A/V recording and communication device further comprises a motion detector.

In another embodiment of the fourth aspect, the visitor detection signal is received in response to the motion detector detecting motion at the wireless A/V recording and communication device.

Another embodiment of the fourth aspect further comprises the one or more WAN devices receiving from the wireless A/V recording and communication device a first alert signal and a first video signal, the first video signal including images captured by a camera of the wireless A/V recording and communication device.

Another embodiment of the fourth aspect further comprises the one or more WAN devices transmitting to a client device, in response to receiving the first alert signal and the first video signal, a second alert signal and a second video signal, the second video signal including the images captured by the camera of the wireless A/V recording and communication device.

In another embodiment of the fourth aspect, the client device is a smartphone.

In another embodiment of the fourth aspect, the one or more WAN devices comprises one or more servers.

In another embodiment of the fourth aspect, the one or more WAN devices comprises one or more network services.

In a fifth aspect, a method for a speaker device comprising a speaker, a non-volatile memory, a communication module, and a processing module operatively connected to the speaker, the non-volatile memory, and to the communication module is provided, the method comprising: transmitting a first provisioning beacon signal using the communication module; receiving, in response to the provisioning beacon signal, at least one credential signal from a network device configured to provide an access point, using the communication module, wherein the at least one credential signal includes credential data; storing the credential data in the non-volatile memory; attempting to connect to the access point using the credential data; determining whether the attempt to connect to the access point was successful; and playing a first audio prompt, using the speaker, upon determining an unsuccessful connection to the access point, wherein the first audio prompt comprises a statement indicating that the connection to the access point was unsuccessful.

In an embodiment of the fifth aspect, the method further comprises playing a second audio prompt, using the speaker, upon determining a successful connection to the access point, wherein the second audio prompt comprises a statement indicating that the connection to the access point was successful.

In another embodiment of the fifth aspect, the measuring a connection strength level between the speaker device and the access point.

In another embodiment of the fifth aspect, the method further comprises determining that the attempted connection was successful when the connection strength level is above a first connection strength threshold.

In another embodiment of the fifth aspect, the method further comprises determining that the attempted connection was not strong enough when the connection strength level is below a connection strength threshold.

In another embodiment of the fifth aspect, the method further comprises playing a second audio prompt, using the speaker, the second audio prompt comprising a statement indicating that the attempted connection to the access point is weak and the speaker device should be moved to a location closer in proximity to the network device.

In another embodiment of the fifth aspect, the connection strength level is measured using a received signal strength indication (RSSI) score.

In another embodiment of the fifth aspect, the credential data includes an identifier for the network device.

In another embodiment of the fifth aspect, the identifier is a service set identifier (SSID).

In another embodiment of the fifth aspect, the credential data is a password for gaining access to the access point.

In another embodiment of the fifth aspect, the network device is a wireless router device.

In another embodiment of the fifth aspect, the method further comprises receiving, from a client device associated with the network device, at least one second credential signal comprising a password for gaining access to the access point.

In another embodiment of the fifth aspect, the statement includes directions to move the speaker device closer in proximity to the network device.

In another embodiment of the fifth aspect, the statement further includes directions to move the speaker device away from any obstructions between the speaker device and the network device.

In another embodiment of the fifth aspect, the method further comprises reattempting to connect to the access point using the credential data stored in the non-volatile memory.

In another embodiment of the fifth aspect, the speaker device is associated with a first location when attempting to connect to the access point and associated with a second location when reattempting to connect to the access point.

In another embodiment of the fifth aspect, the reattempting to connect to the access point is performed without any additional input from a user.

In another embodiment of the fifth aspect, the method further comprises, upon determining a successful connection to the access point, acting as a repeater/extender for the access point to provide an alternate wireless connection point for an Audio/Video (A/V) recording and communication device when the A/V recording and communication device is not able to connect to the access point.

In another embodiment of the fifth aspect, the method further comprises playing a second audio prompt, using the speaker, wherein the second audio prompt comprises an indication that the connection to the A/V recording and communication device was successful.

In another embodiment of the fifth aspect, the method further comprises measuring a connection strength level between the speaker device and the A/V recording and communication device.

In another embodiment of the fifth aspect, the method further comprises determining that the connection to the A/V recording and communication device was successful when the connection strength level is above a connection strength threshold.

In another embodiment of the fifth aspect, the method further comprises determining that the connection to the A/V recording and communication device is was unsuccessful when the connection strength level is below a connection strength threshold.

In another embodiment of the fifth aspect, the method further comprises playing a second audio prompt, using the speaker, the second audio prompt comprising a statement indicating that the attempted connection to the A/V recording and communication device is weak and the speaker device should be moved to a location closer in proximity to the A/V recording and communication device.

BRIEF DESCRIPTION OF THE DRAWINGS

The various embodiments of the present auto-provisioning of wireless speaker devices for audio/video (A/V) recording and communication devices, now will be discussed in detail with an emphasis on highlighting the advantageous features. These embodiments depict the novel and non-obvious auto-provisioning of wireless speaker devices for A/V recording and communication devices, shown in the accompanying drawings, which are for illustrative purposes only. These drawings include the following figures, in which like numerals indicate like parts.

DETAILED DESCRIPTION

Figure 1:
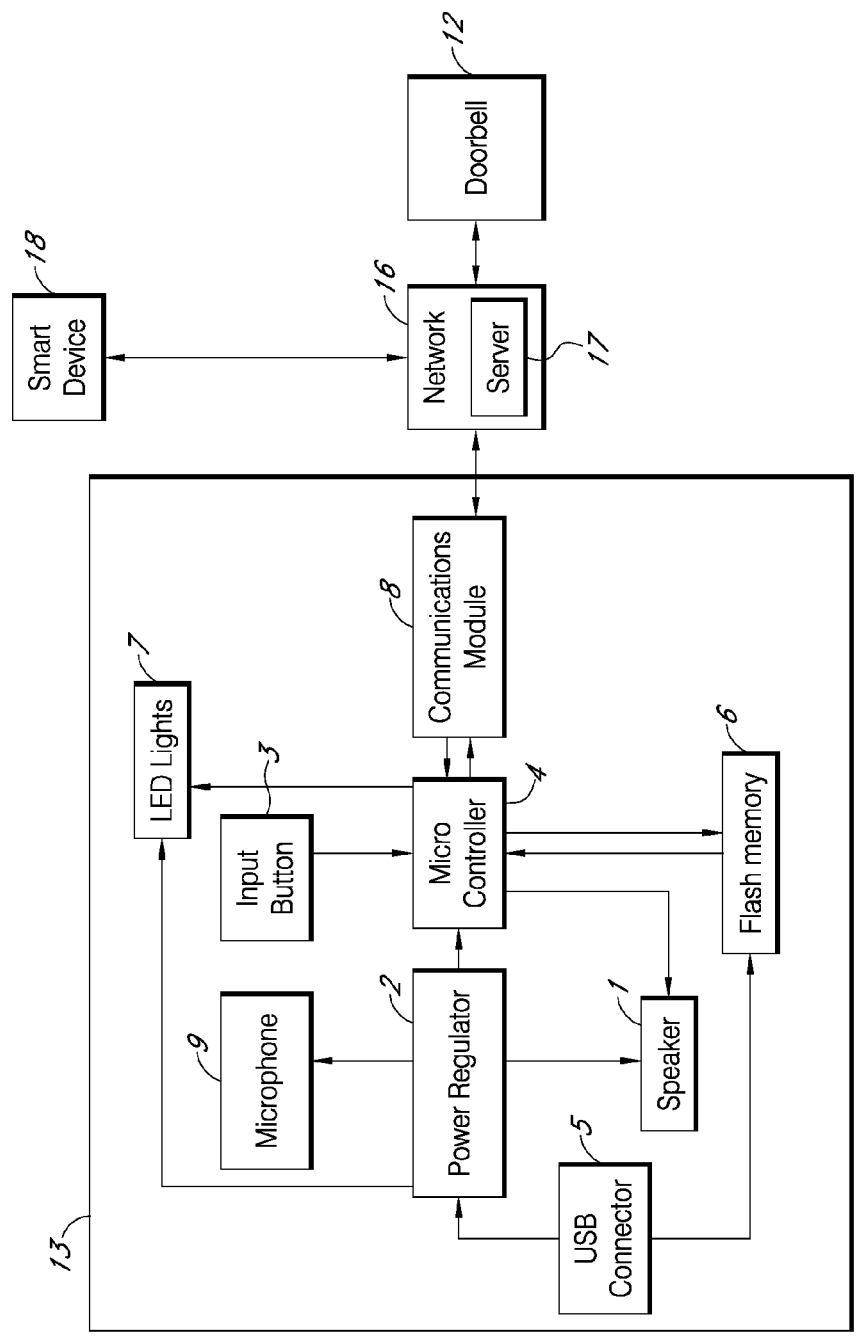
FIG. 1 is a functional block diagram illustrating a system including an embodiment of a USB doorbell dongle according to an aspect of the present disclosure.

The following detailed description describes the present embodiments with reference to the drawings. In the drawings, reference numbers label elements of the present embodiments. These reference numbers are reproduced below in connection with the discussion of the corresponding drawing features.

The embodiments of the present wireless speaker devices for A/V recording and communication devices, including wireless audio/video recording and communication doorbells, are described below with reference to the figures. These figures, and their written descriptions, indicate that certain components of the apparatus are formed integrally, and certain other components are formed as separate pieces. Those of ordinary skill in the art will appreciate that components shown and described herein as being formed integrally may in alternative embodiments be formed as separate pieces. Those of ordinary skill in the art will further appreciate that components shown and described herein as being formed as separate pieces may in alternative embodiments be formed integrally. Further, as used herein the term integral describes a single unitary piece.

FIG. 1 is a functional block diagram illustrating a system including an embodiment of a USB (Universal Serial Bus) doorbell dongle 13 according to an aspect of the present disclosure. The USB doorbell dongle 13 may be an electronic hardware device designed to fit into a USB port. As shown in FIG. 1, the USB doorbell dongle 13 contains a microcontroller 4, flash memory 6, a speaker 1, LED lights 7, and a communications module 8. Each component inside the USB doorbell dongle 13 performs an individual function which then contributes to an efficient working of the whole system. The USB doorbell dongle 13 may communicate directly or indirectly with a doorbell 12. The doorbell 12 may be a doorbell capable of wireless data transmission. The doorbell 12 may be equipped with a microphone, a speaker, a camera, and/or a button. The doorbell 12 may act as an intercom system, which in turn relays digital audio and/or video to the USB doorbell dongle 13 and/or a smart device 18, allowing a user and a visitor to communicate remotely with each other.

The smart device 18 may be any electronic device capable of receiving and transmitting data via the Internet, capable of transmitting and receiving audio and video communications, and that can operate to some extent autonomously. Examples of the smart device 18 include, but are not limited to, smartphones, tablets, laptops, computers, and VOIP telephone systems. In one non-limiting aspect, the smart device 18 may be an initial point of contact between a visitor (not shown) at the doorbell 12 and a user (not shown), prior to the doorbell 12 connecting to the USB doorbell dongle 13. In this aspect, in the event that the user cannot connect to the doorbell 12 via the smart device 18, data routed by a server 17 may be directed to the USB doorbell dongle 13.

In one aspect, the USB doorbell dongle 13, the smart device 18, and the doorbell 12 communicate via Wi-Fi. In this aspect, the communications module 8 may be an off-the-shelf component, such as the GS2011M module by Gainspan, or it could be another module that adds low power, high speed Wi-Fi and Internet connectivity to a device with a microcontroller and serial host interface. With further reference to FIG. 1, the communications module 8 may send outbound data calls to the server 17 via a network 16, containing data such as sound and identifying information related to the USB doorbell dongle 13. The network 16 may be a telecommunications network that allows computers to exchange data either physically or virtually. The server 17 determines which USB doorbell dongle 13 is associated with the doorbell 12 using the identifying information sent and routes the transmitted signal through the server 17 to the USB doorbell dongle 13. The server 17 is may be a system that responds to requests across a computer network to provide, or help to provide, a network service, such as routing. The doorbell 12 may connect to the network 16 via the communications module 8 to communicate with the USB doorbell dongle 13.

Other data transmission protocols, such as Bluetooth or ZigBee (IEEE 802.15.4) may be incorporated into the communications module 8 to transmit data to mobile devices or any other device capable of receiving wireless data transmissions. In this aspect, data may be transmitted to the microcontroller 4 directly through Bluetooth protocol via the communications module 8, depending on the USB doorbell dongle 13's proximity to the doorbell 12.

Once a wireless connection has been made, the microcontroller 4 may process data delivered from the doorbell 12 to the USB doorbell dongle 13. The microcontroller 4 may be a self-contained processing system embedded in the USB doorbell dongle 13 that handles and distributes commands coming in and out of the device and routes them to the appropriate components. If the doorbell 12 button is pressed by a visitor, the microcontroller 4 may transmit a notifying signal to a user via the USB doorbell dongle 13, such as activating the LED lights 7 and/or emitting an audio ringtone through the speaker 1. The USB doorbell dongle 13 may be equipped with one or more input buttons 3. When pressed by the user, the input button 3 may activate a microphone 9 to allow the user to communicate with the visitor through audio transmission.

Figure 4A:
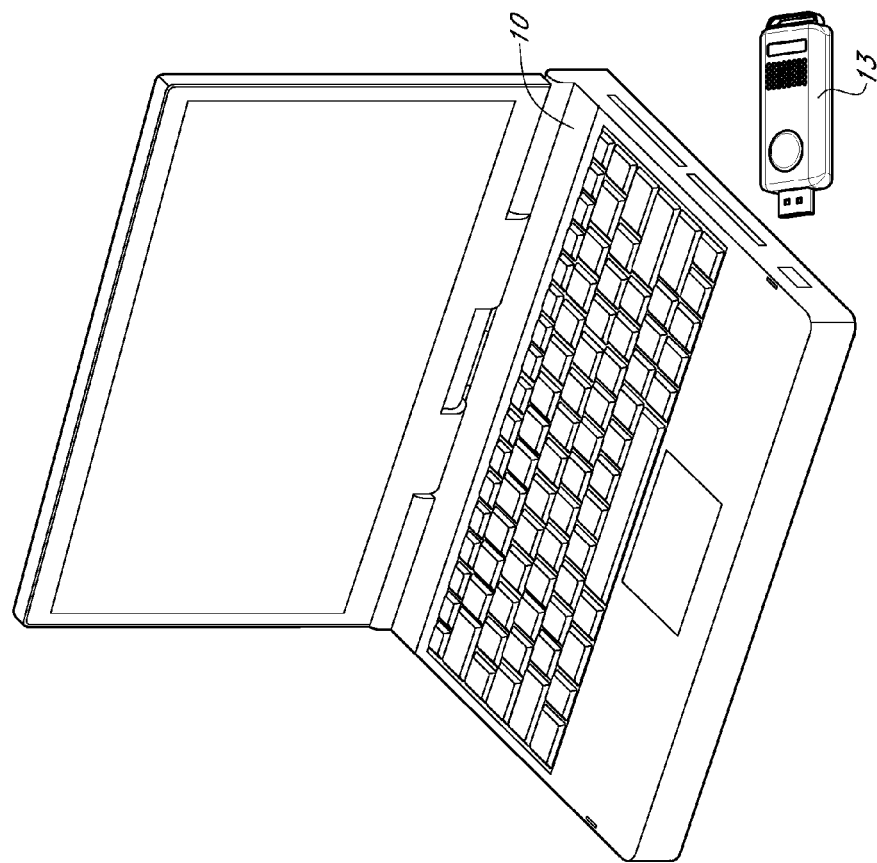
FIG. 4A is a front perspective view of the USB doorbell dongle of FIG. 3 and a computer according to an aspect of present disclosure.
Figure 4B:
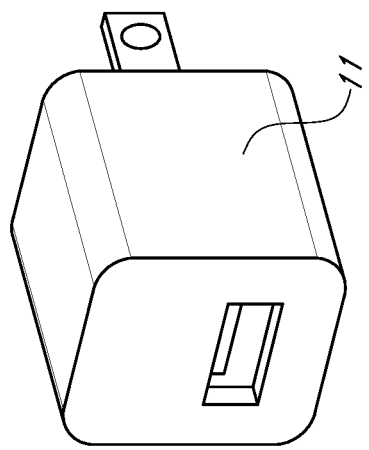
FIG. 4B is a front perspective view of the USB doorbell dongle of FIG. 3 and a USB adapter according to an aspect of present disclosure.
Figure 4B:
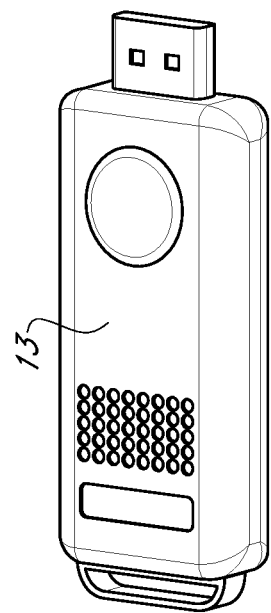

With further reference to FIG. 1, a USB connector 5 may transmit data and/or electrical current from a computer 10 (FIG. 4A) and/or a USB wall adapter 11 (FIG. 4B). Electrical current is transmitted to a power regulator 2, which in turn distributes power to all components within the USB doorbell dongle 13. Any data transmitted via the USB connector 5 from the computer 10 may be stored in the flash memory 6. In one aspect of the present disclosure, a user may store audio ringtones at the flash memory 6, which may be emitted when the doorbell 12 button is pressed.

Figure 2:
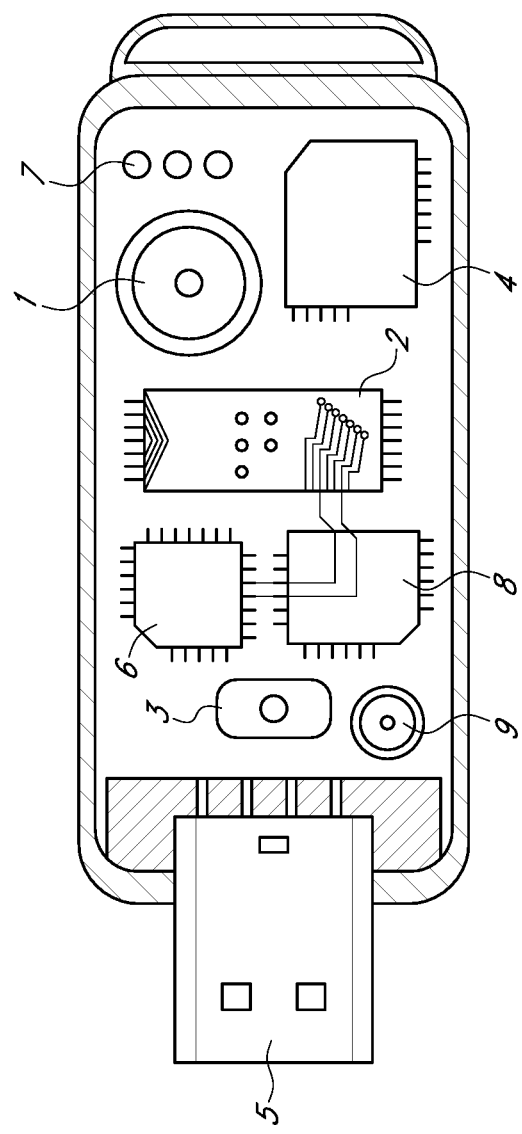
FIG. 2 is a cross sectional view of an embodiment of a USB doorbell dongle according to an aspect of present disclosure.

FIG. 2 shows a cross sectional view of the USB doorbell dongle 13 according to an aspect of present disclosure. The USB doorbell dongle 13 may contain the flash memory 6 in conjunction with the speaker 1, the power regulator 2, the input button 3, the microcontroller 4, the USB connector 5, the LED lights 7, the communications module 8, and the microphone 9. The flash memory 6 embedded inside the USB doorbell dongle 13 may be used to store or transfer the user's data from one device to another device such as the computer 10. The flash memory 6 may also be used to store potential ringtones that the user might select as an audio notification for the doorbell 12. The communications module 8 may include Bluetooth and/or Wi-Fi capability, and may connect to the doorbell 12 depending on the wireless connection available at any given time. In one aspect of the present disclosure, the USB doorbell dongle 13 may have the ability to extend an available Wi-Fi signal to nearby device(s) available within the network 16. In this aspect, the USB doorbell dongle 13 may contain components, (e.g. found in a Wi-Fi router) capable of receiving a wireless signal transmitted from the network 16, amplifying the wireless signal, and then transmitting the boosted signal throughout the user's location or facility. The USB doorbell dongle 13 may include a battery (not shown) to allow operation when electrical power is not available to the device.

Figure 3:
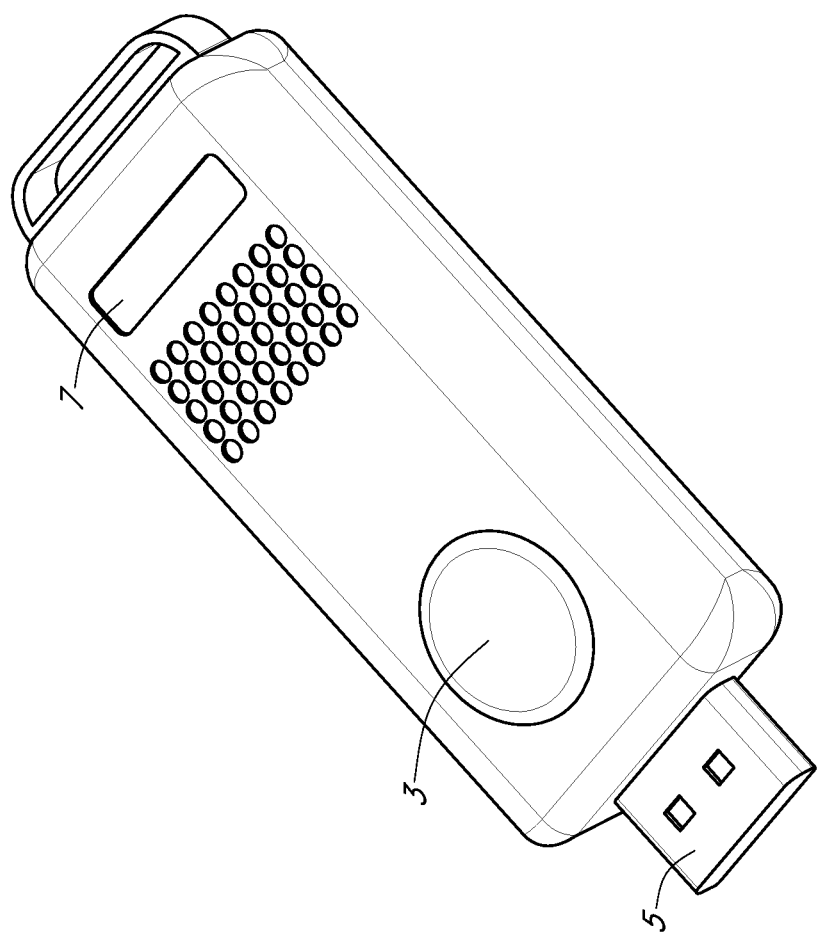
FIG. 3 is a front perspective view of an embodiment of a USB doorbell dongle according to an aspect of present disclosure.

FIG. 3 is a front perspective view of the USB doorbell dongle 13 according to an aspect of present disclosure. The top face of the USB doorbell dongle 13 may feature a perforated pattern that allows for audio to be emitted from the speaker 1. An aperture to allow the LED lights 7 to emit light may be located on a front facing surface of the USB doorbell dongle 13. The LED lights 7 mounted within the USB doorbell dongle 13 may turn on and off or blink continuously depending on the signal transmitted from the doorbell 12. The LED lights 7 may also be illuminated if the USB doorbell dongle 13 is plugged into the computer 10 or the USB wall adapter 11. In this aspect, the illumination of the LED lights 7 may indicate charging or data transfer and may turn off once the user unplugs the USB doorbell dongle 13 from the computer 10 or the USB wall adapter 11.

The input button 3 may be positioned on a front facing surface of the USB doorbell dongle 13. Once the USB doorbell dongle 13 receives a signal from the doorbell 12, the microcontroller 4 may be triggered to inform the user by emitting audio from the speaker 1 and/or illuminating the LED lights 7. The user may press the input button 3 to activate the microphone 9 in order to transmit digital audio from the USB doorbell dongle 13 to the doorbell 12.

FIG. 4A is a front perspective view of the USB doorbell dongle 13 and the computer 10 according to an aspect of present disclosure. The USB doorbell dongle 13 may extract power from the computer 10 as the USB doorbell dongle 13 may be plugged into a USB port of the computer 10. As the USB doorbell dongle 13 may be inserted in the computer 10, the user may also extract data from the computer 10 and store data on the flash memory 6 embedded in the USB doorbell dongle 13, and/or the user may be able to transfer data back and forth between the computer 10 and the USB doorbell dongle 13.

FIG. 4B is a front perspective view of the USB doorbell dongle 13 and the USB wall adapter 11 according to an aspect of present disclosure. The USB doorbell dongle 13 may be plugged into a USB port of the USB wall adapter 11 to extract power from the USB wall adapter 11, which may be plugged in a wall socket. The USB doorbell dongle 13 may be inserted into any device offering a USB port, and that will also provide power to the USB doorbell dongle 13.

Figure 5:
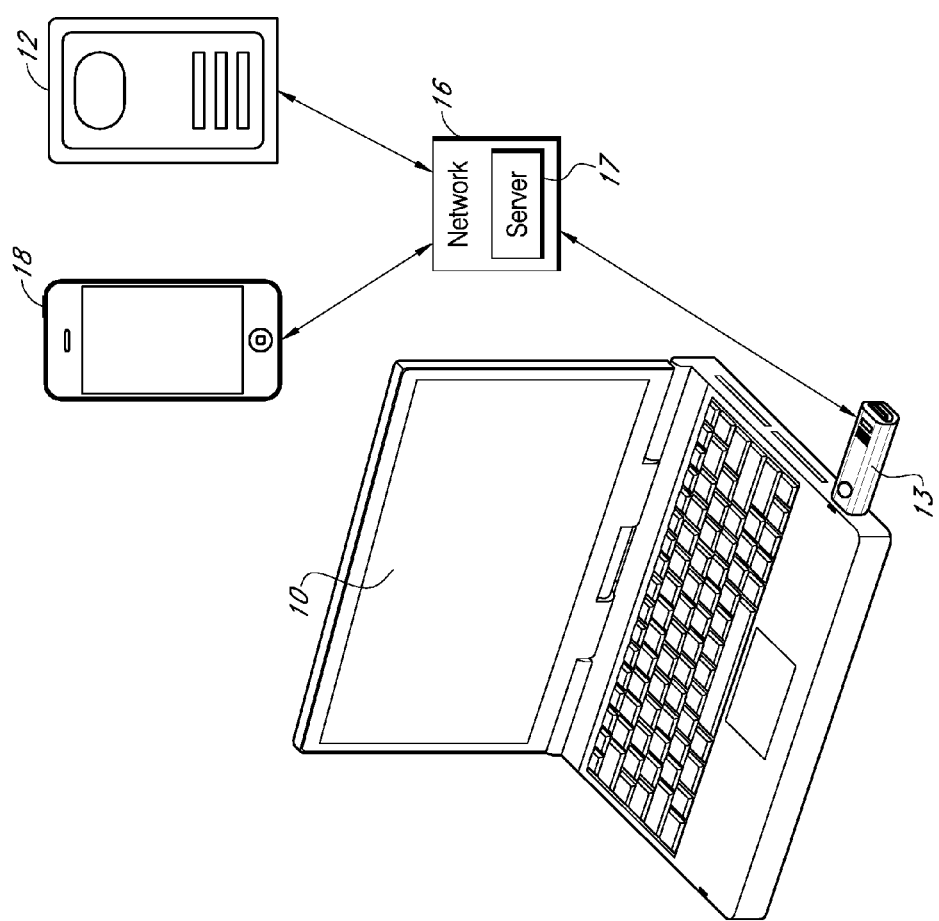
FIG. 5 is a functional block diagram illustrating a system including an embodiment of a USB doorbell dongle according to an aspect of the present disclosure.

FIG. 5 is a functional block diagram illustrating a system including the USB doorbell dongle 13 communicating with the Wi-Fi doorbell 12. In one aspect of the present disclosure, when a notification command is transmitted from the doorbell 12 to the USB doorbell dongle 13 through Wi-Fi or Bluetooth, the user may have the ability to talk to a visitor through the microphone 9 embedded in the USB doorbell dongle 13.

In one aspect, the USB doorbell dongle 13 may communicate with the doorbell 12 via Wi-Fi. The communications module 8 may send an outbound data call to the server 17 located within the network 16, containing data such as sound and identifying information related to the USB doorbell dongle 13. The server 17 may then determine which USB doorbell dongle 13 is associated with the doorbell 12 using the identifying information delivered from the doorbell 12 and may route the transmitted signal through the network 16 to the USB doorbell dongle 13. As mentioned above, the connection may also transmit through Bluetooth protocol via a Bluetooth module embedded in the communications module 8 of the USB doorbell dongle 13 depending on its proximity to the doorbell 12.

Figure 6:
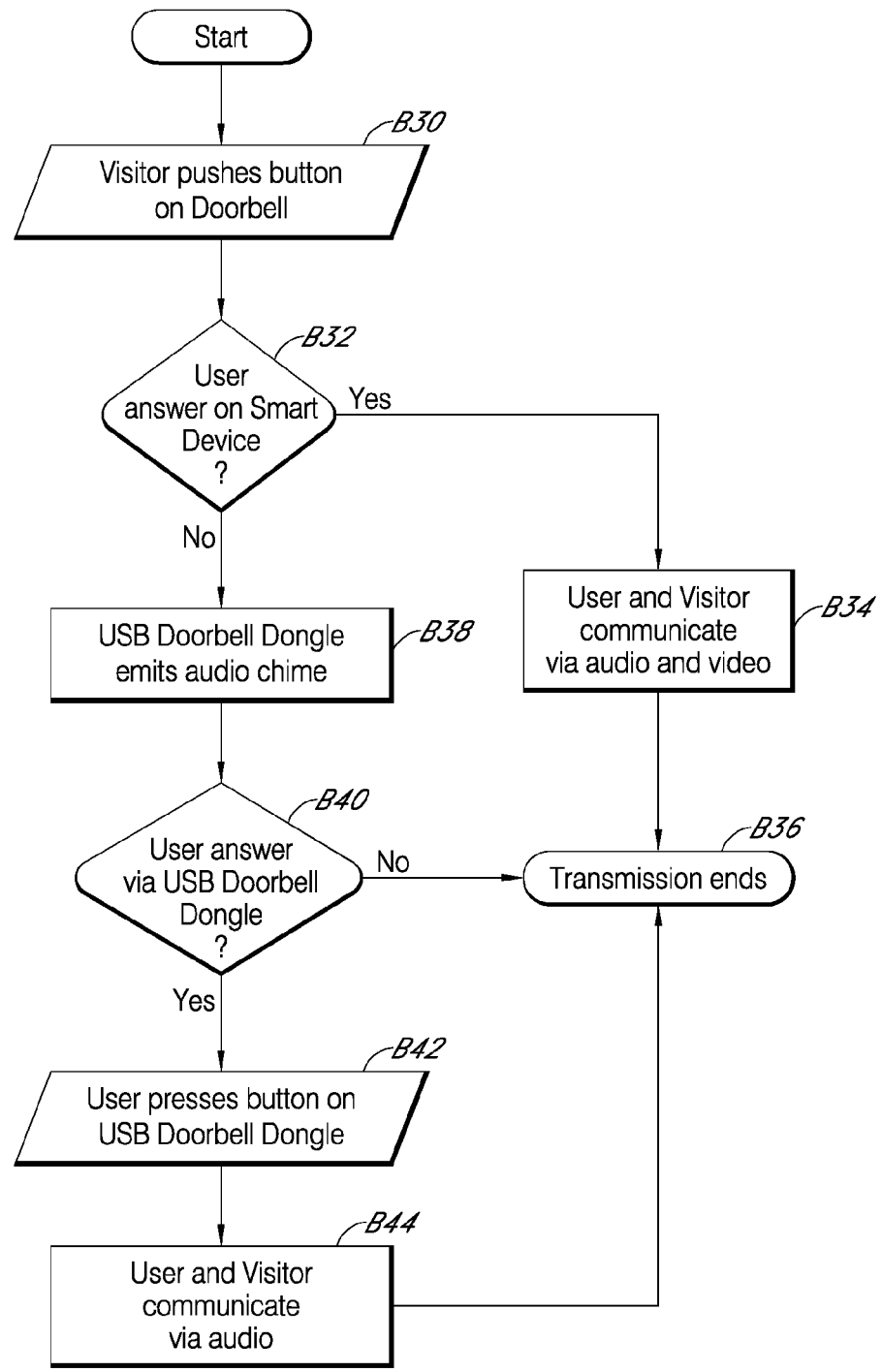
FIG. 6 is a process flow diagram relating to an embodiment of a USB doorbell dongle according to an aspect of the present disclosure.

FIG. 6 is a process flow diagram illustrating example uses and functions associated with the USB doorbell dongle 13 according to an aspect of the present disclosure. A visitor may push a button located on the doorbell 12 at block B30. At block B32, the doorbell 12 transmits data to the network 16 such as video, audio, and identifying information associated to the doorbell 12. The server 17 identifies what smart devices 18, web based applications, USB doorbell dongle 13's, and/or other devices may be associated with doorbell 12. The server 17 may route the appropriate data, such as audio and/or video data, to the appropriate device based on the functions of each device. The user may initially receive a notification on the smart device 18 or another device associated with the doorbell 12. If the request is accepted, (Yes, at block B32), the user and visitor may communicate via audio and video transmissions sent to and from the doorbell 12 at block B34. The transmission may then be terminated at block B36 once the user disconnects or hangs up.

If a connection cannot be made with the smart device 18, (No, at block B32), the server 17 routes data to the USB doorbell dongle 13 at block B38 to emit an audio chime. Reasons such as, but not limited to, a poor network connection, the smart device 18 not being connected to a network, and/or the smart device 18 being powered off may trigger the USB doorbell dongle 13 to emit an audio chime to the user.

If the user is in the presence of the USB doorbell dongle 13 and is capable of answering the request (Yes, at block B40), the user may press the input button 3 located on the USB doorbell dongle 13 at block B42. Pressing the input button 3 located on the USB doorbell dongle 13 at block B42 creates a connection between the doorbell 12 and the USB doorbell dongle 13 via the network 16. The user and a visitor may communicate via audio transmissions sent to and from the doorbell 12 and the USB doorbell dongle 13 at block B44. The transmission may then be terminated at block B36 when the user disconnects by pressing the input button 3.

If the user is not in the presence of the USB doorbell dongle 13, or the USB doorbell dongle 13 is either disconnected from the network 16 or powered off (No, at block B40), the transmission may then be terminated at block B36. The steps described above with respect to FIG. 6 may take place in a different order than as described above. For example, the server 17 may route data to the USB doorbell dongle 13 prior to routing data to the smart device 18.

Figure 7:
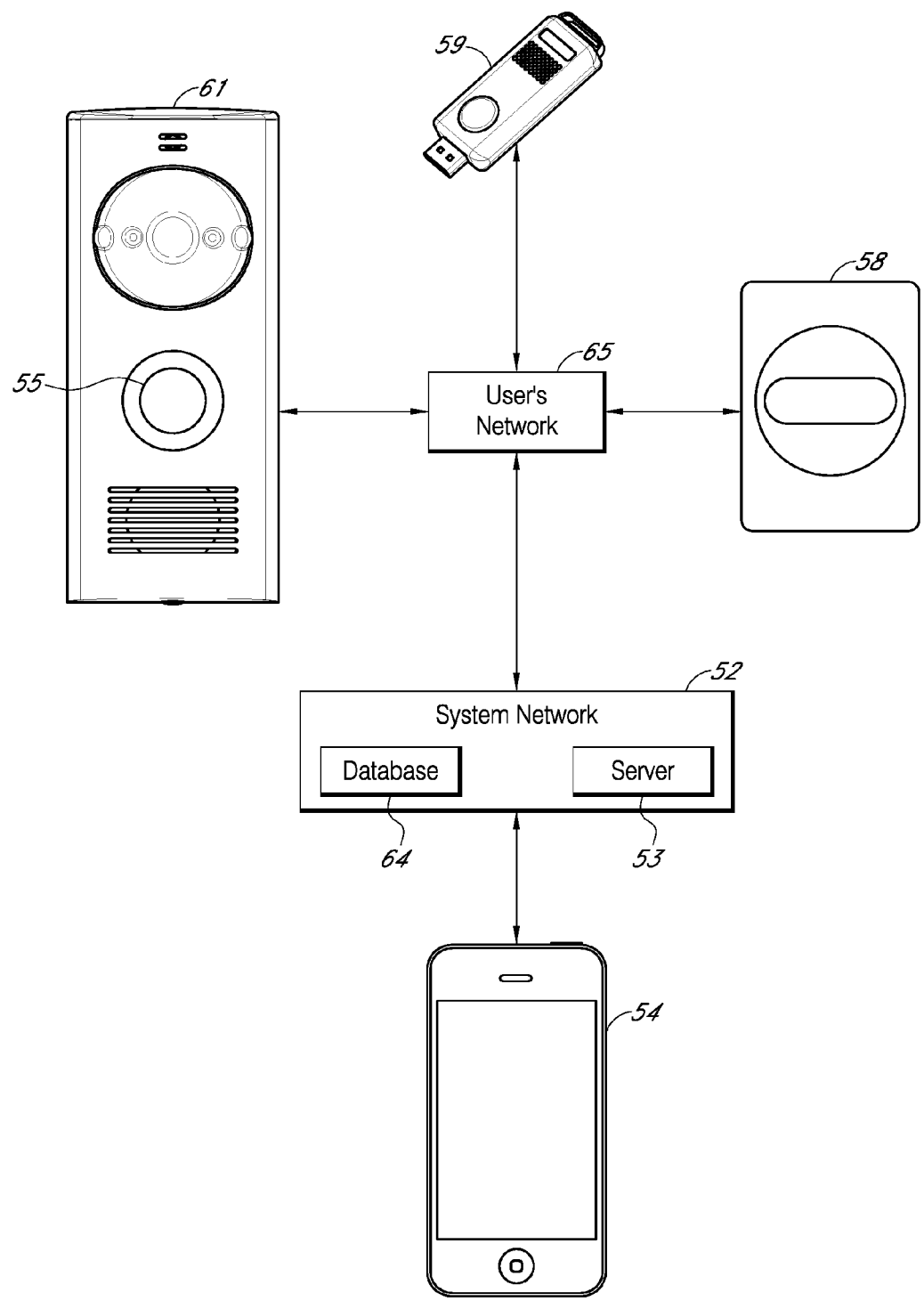
FIG. 7 is a functional block diagram illustrating a system including a wireless speaker device according to an aspect of the present disclosure.

FIG. 7 is a functional block diagram illustrating a system including a wireless speaker device according to an aspect of the present disclosure. Wi-Fi is one method of wireless data exchange according to an aspect of the present disclosure. The devices within the system of FIG. 7 may connect to a user's network 65. The user's network 65 may be a local area network (LAN), an Internet area network (IAN), or a wide area network (WAN) that connects voice and data end points within a wireless network. Once devices within the system are connected to the user's network 65 (unless equipped with 3G, 4G, LTE, etc), then the devices may communicate by sending data to a system network 52. The system network 52 is wireless telecommunications network that allows for the transfer of data to and from Wi-Fi enabled devices. A server 53 may be embedded in or coupled to the system network 52. The server 53 is a system that responds to requests across a computer network to provide, or help to provide, a network service, such as the routing of data according to instructions and user preferences. The devices within the system send data to the system network 52 where the server 53 processes and routes the data to the appropriate device. For example, data from a wireless communication doorbell 61 may be sent to the system network 52, such as identifying information, digital audio, processed visuals, and/or device diagnostics. The server 53 processes the data sent from the wireless communication doorbell 61 and routes it accordingly to the other devices within the system. For instance, the server 53 may process diagnostic data sent from the wireless communication doorbell 61, and the server 53 routes the diagnostic data to inform a user via the smart device 54 if a battery of the wireless communication doorbell 61 is about to die (e.g. 10% battery remaining).

In one aspect of the present disclosure, all devices that communicate within the system described in FIG. 7 may use other wireless communication protocols, such as Bluetooth. Bluetooth is a wireless technology standard for exchanging data over short distances between devices within close proximity to one another. Bluetooth wireless transmission does not require the use of a system network 52 or a server 53 because of the close proximity, while maintaining the capability to transfer data such as identifying information, digital audio, processed visuals, and/or device diagnostics.

In one method and system of the present disclosure, all hardware components within the wireless communication doorbell 61 may live in a state of hibernation until a button 55 of the wireless communication doorbell 61 is pressed by a visitor. In this aspect, all components that draw power from the battery, such as a communications module and/or a camera do not waste battery power when not in use. When the button 55 is pressed, it may activate all components, and when streaming data to the smart device 54 ceases, all components may return to hibernation mode.

In one aspect of the present disclosure, diagnostic data associated with the wireless communication doorbell 61, such as battery life and Internet connectivity, may be relayed to the system network 52 when the communication module is woken up out of hibernation mode. With the diagnostic data provided by the wireless communication doorbell 61, the server 53 may send notifications to the smart device 54, informing the user to charge the battery or reset the Internet connectivity to the wireless communication doorbell 61.

As shown in FIG. 7 and described in further detail below with respect to FIG. 8, the wireless communication doorbell 61 may communicate with third party hardware 58 and/or a third party doorbell chime 59. The third party doorbell chime 59 may be a stand-alone product or component that may emit an audio chime or message, amongst other functions, to a user when the button 55 of the wireless communication doorbell 61 is pressed. The wireless communication doorbell 61 may communicate with the third party doorbell chime 59 directly or indirectly, depending on the transmission capabilities associated with the third party doorbell chime 59. In one aspect, if embedded with a communications module, the third party doorbell chime 59 may communicate with the wireless communication doorbell 61 via the system network 52. In this aspect, the third party doorbell chime 59 may be connected to the user's network 65, along with the wireless communication doorbell 61. In one aspect of the present disclosure, the third party doorbell chime 59 may take the form of a USB dongle 13 (FIG. 1) containing a communications module (e.g. Wi-Fi or Bluetooth) 8, a speaker 1, and/or a microphone 9. In this aspect, the USB dongle 13 may derive power by being plugged into a computer 10 (FIG. 4A) or into a USB adapter 11 (FIG. 4B). If connected over Wi-Fi, data sent from the wireless communication doorbell 61, such as digital audio and/or identifying information, may be routed through the system network 52 to the USB dongle 13. If connected using Bluetooth protocols, the wireless communication doorbell 61 may deliver data, such as digital audio, directly to the USB dongle 13. The USB dongle 13 may alert a user of someone at the door using visual and/or audio cues derived from LED lights 7 (FIG. 1) and/or speakers 1 installed within the USB dongle 13. The user may then be able to communicate with the visitor through the microphone 9 installed on the USB dongle 13. In one aspect of the present disclosure, the USB dongle 13 may act as a Wi-Fi extender, repeater, or booster to provide more or better access to the user's network 65. In this aspect, the USB dongle 13 may contain components (e.g. found in a Wi-Fi router) capable of receiving wireless signals transmitted from the user's network 65, amplifying the wireless signals, and then transmitting the boosted signal throughout user's location or facility.

Figure 8:
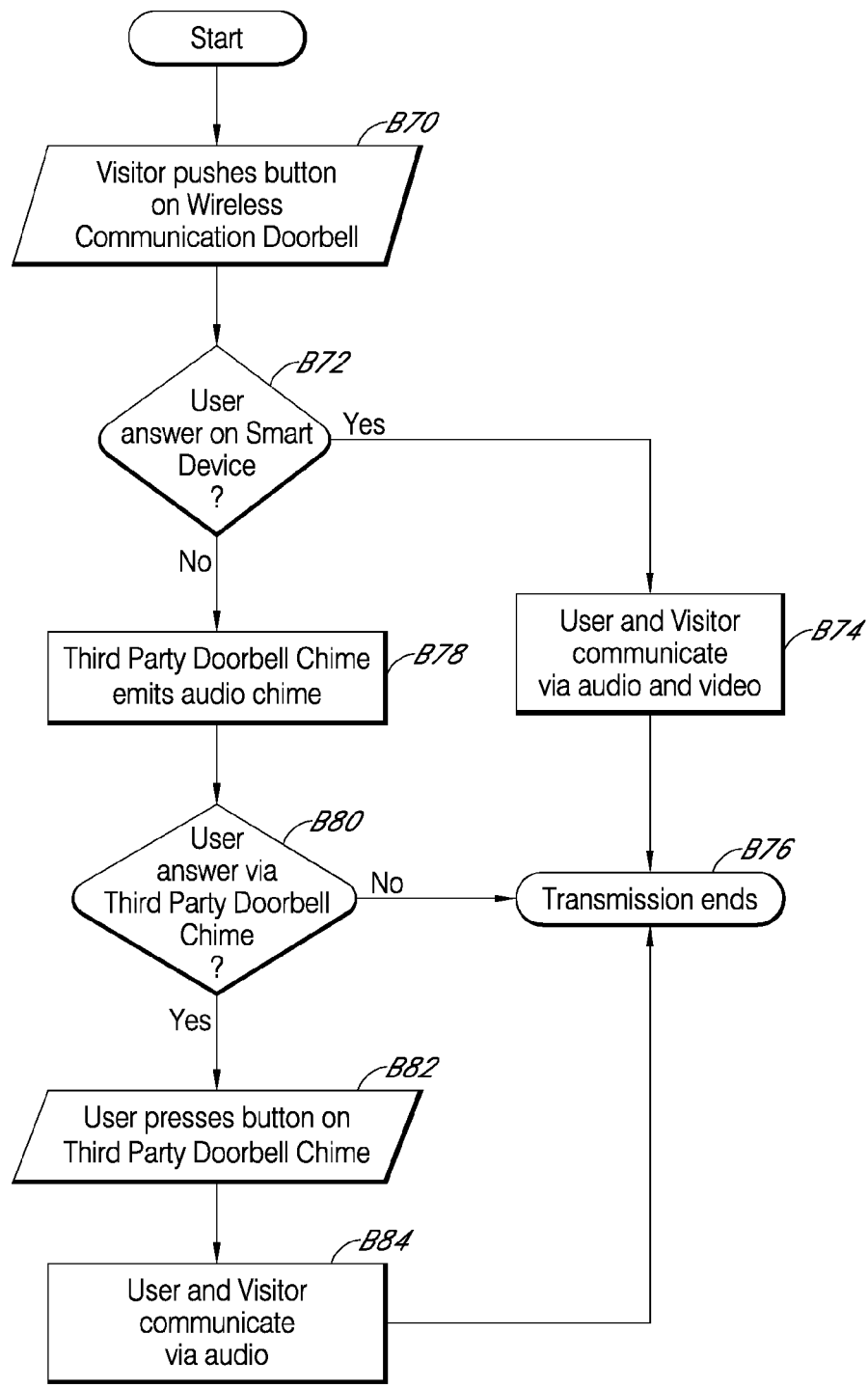
FIG. 8 is a process flow diagram relating to an embodiment of a wireless speaker device according to an aspect of the present disclosure.

FIG. 8 is a process flow diagram relating to an embodiment of a wireless speaker device according to an aspect of the present disclosure. In this aspect, the third party doorbell chime 59 (FIG. 7) may contain a communication module, an input button, a speaker, and a microphone. A visitor may push the button 55 located on the front face of the wireless communication doorbell 61 at block B70, triggering the wireless communication doorbell 61 to transmit data wirelessly to the system network 52.

At block B72, the wireless communication doorbell 61 transmits data to the system network 52 such as audio, video, and/or identifying information associated to the wireless communication doorbell 61. The server 53 identifies what smart devices 54, web based applications, third party doorbell chimes 59, and/or other devices may be associated with the wireless communication doorbell 61. The server 53 may route the appropriate data, such as audio or video data, to the applicable device based on the functions of each device. The user may receive an accept/deny prompt on the smart device 54 or another device associated with the wireless communication doorbell 61. If the request is accepted (Yes, at block B72), the user and the visitor may communicate via audio and video transmissions sent to and from the wireless communication doorbell 61 at block B74. The transmission may then be terminated at block B76 once the user disconnects or hangs up.

If a connection cannot be made with the smart device 54, (No, at block B72), the server 53 routes data to the third party doorbell chime 59 at block B78 to emit an audio chime. Reasons such as, but not limited to, a poor wireless network connection, the smart device 54 not being connected to the user's network 65, the smart device 54 being powered off, or the accept/deny prompt being dismissed or ignored may trigger the third party doorbell chime 59 to emit an audio tone to the user.

If the user is in the presence of the third party doorbell chime 59 and is capable of answering the request, (Yes, at block B80), the user may press the input button located on the third party doorbell chime 59 at block B82. Pressing the input button located on the third party doorbell chime 59 creates a connection between the wireless communication doorbell 61 and the third party doorbell chime 59 via the system network 52. The user and the visitor may communicate via audio transmissions sent between the wireless communication doorbell 61 and the third party doorbell chime 59 at block B82. The transmission may then be terminated at block B76 when the user disconnects by pressing the input button.

If the user is not in the presence of the third party doorbell chime 59, or the third party doorbell chime 59 is either disconnected from the user's network 65 or powered off (No, at block B80) the transmission may then be terminated at block B84. The steps described above with respect to FIG. 8 may take place in a different order than described above. For example, the server 53 may route data to the third party doorbell chime 59 prior to routing data to the smart device 54.

Figure 9:
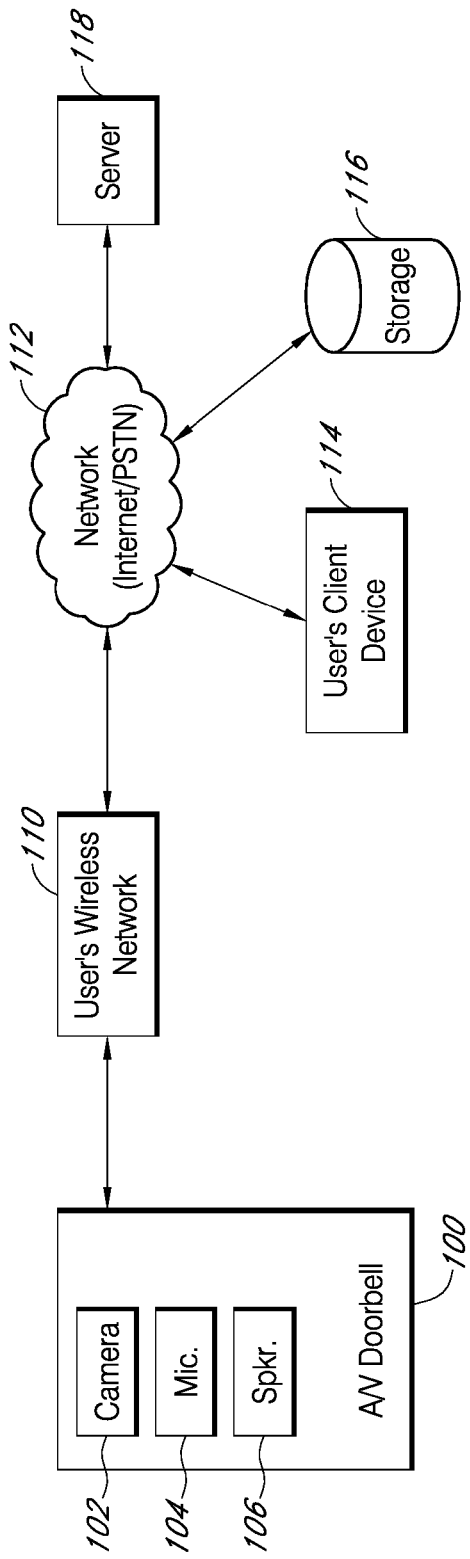
FIG. 9 is a functional block diagram illustrating a system for streaming and storing A/V content captured by a wireless A/V recording and communication doorbell according to the present embodiments.

With reference to FIG. 9, the present embodiments include an audio/video (A/V) recording and communication device, such as a doorbell 100. While the present disclosure provides numerous examples of methods and systems including A/V recording and communication doorbells, the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and functionality of the doorbells described herein, but without the front button and related components.

The wireless A/V recording and communication doorbell 100 is typically located near the entrance to a structure (not shown), such as a dwelling, a business, a storage facility, etc. The wireless A/V recording and communication doorbell 100 includes a camera 102, a microphone 104, and a speaker 106. The camera 102 may comprise, for example, a high definition (HD) video camera, such as one capable of capturing video images at an image display resolution of 720p or better. While not shown, the wireless A/V recording and communication doorbell 100 may also include other hardware and/or components, such as a housing, one or more motion sensors (and/or other types of sensors), a button, etc. The wireless A/V recording and communication doorbell 100 may further include similar componentry and/or or functionality as the wireless communication doorbells described in US Patent Application Publication Nos. 2015/0022620 (application Ser. No. 14/499,828) and 2015/0022618 (application Ser. No. 14/334,922), both of which are incorporated herein by reference in their entireties as if fully set forth.

With further reference to FIG. 9, the wireless A/V recording and communication doorbell 100 communicates with a user's wireless network 110, which may be for example a local area network (LAN), such as a Wi-Fi network compatible with the IEEE 802.11 standard and/or other wireless communication standard(s). The user's wireless network 110 is connected to another network 112, which may comprise, for example, the Internet and/or a public switched telephone network (PSTN). As described below, the wireless A/V recording and communication doorbell 100 may communicate with the user's client device 114 via the wireless network 110 and the network 112. The user's client device 114 may comprise, for example, a mobile telephone (may also be referred to as a cellular telephone), such as a smartphone, a personal digital assistant (PDA), or another communication device. The user's client device 114 comprises a display (not shown) and related components capable of displaying streaming and/or recorded video images. The user's client device 114 may also comprise a speaker and related components capable of broadcasting streaming and/or recorded audio, and may also comprise a microphone. The wireless A/V recording and communication doorbell 100 may also communicate with one or more remote storage device(s) 116 (may be referred to interchangeably as "cloud storage device(s)") and/or one or more servers 118 via the wireless network 110 and the network 112. While FIG. 9 illustrates the storage device 116 and the server 118 as components separate from the network 112, it is to be understood that the storage device 116 and/or the server 118 may be considered to be components of the network 112.

The network 112 may be any wireless network or any wired network, or a combination thereof, configured to operatively couple the above mentioned modules, devices, and systems as shown in FIG. 9. For example, the network 112 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking. In one example embodiment, the network 112 comprises a WAN connected to the user's wireless network 110, which comprises a LAN.

According to one or more aspects of the present embodiments, when a person (may be referred to interchangeably as "visitor") arrives at the wireless A/V recording and communication doorbell 100, the wireless A/V recording and communication doorbell 100 detects the visitor's presence and begins capturing video images within a field of view of the camera 102. The wireless A/V recording and communication doorbell 100 may also capture audio through the microphone 104. The wireless A/V recording and communication doorbell 100 may detect the visitor's presence using a motion sensor, and/or by detecting that the visitor has depressed the button on the wireless A/V recording and communication doorbell 100.

In response to the detection of the visitor, the wireless A/V recording and communication doorbell 100 sends an alert to the user's client device 114 (FIG. 9) via the user's wireless network 110 and the network 112. The wireless A/V recording and communication doorbell 100 also sends streaming video, and may also send streaming audio, to the user's client device 114. If the user answers the alert, two-way audio communication may then occur between the visitor and the user through the wireless A/V recording and communication doorbell 100 and the user's client device 114. The user may view the visitor throughout the duration of the call, but the visitor cannot see the user (unless the wireless A/V recording and communication doorbell 100 includes a display, which it may in some embodiments).

The video images captured by the camera 102 of the wireless A/V recording and communication doorbell 100 (and the audio captured by the microphone 104) may be uploaded to the cloud and recorded on the remote storage device 116 (FIG. 9). In some embodiments, the video and/or audio may be recorded on the remote storage device 116 even if the user chooses to ignore the alert sent to his or her client device 114.

Figure 10:
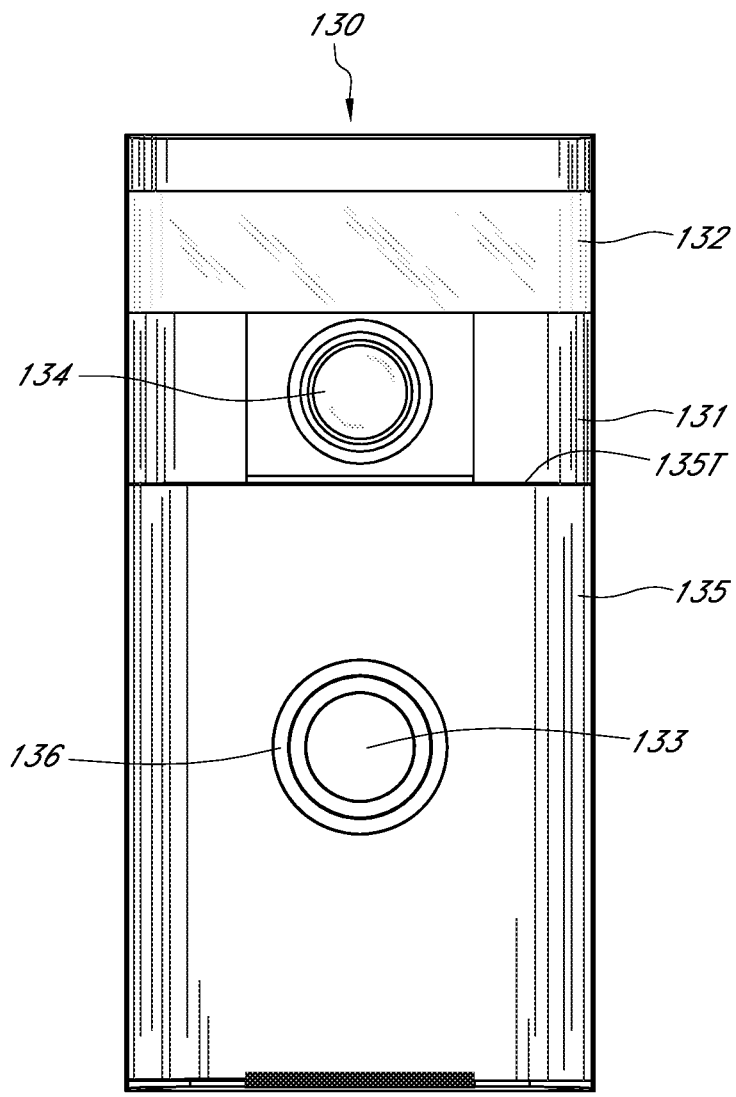
FIG. 10 is a front view of a wireless A/V recording and communication doorbell according to an aspect of the present disclosure.
Figure 11:
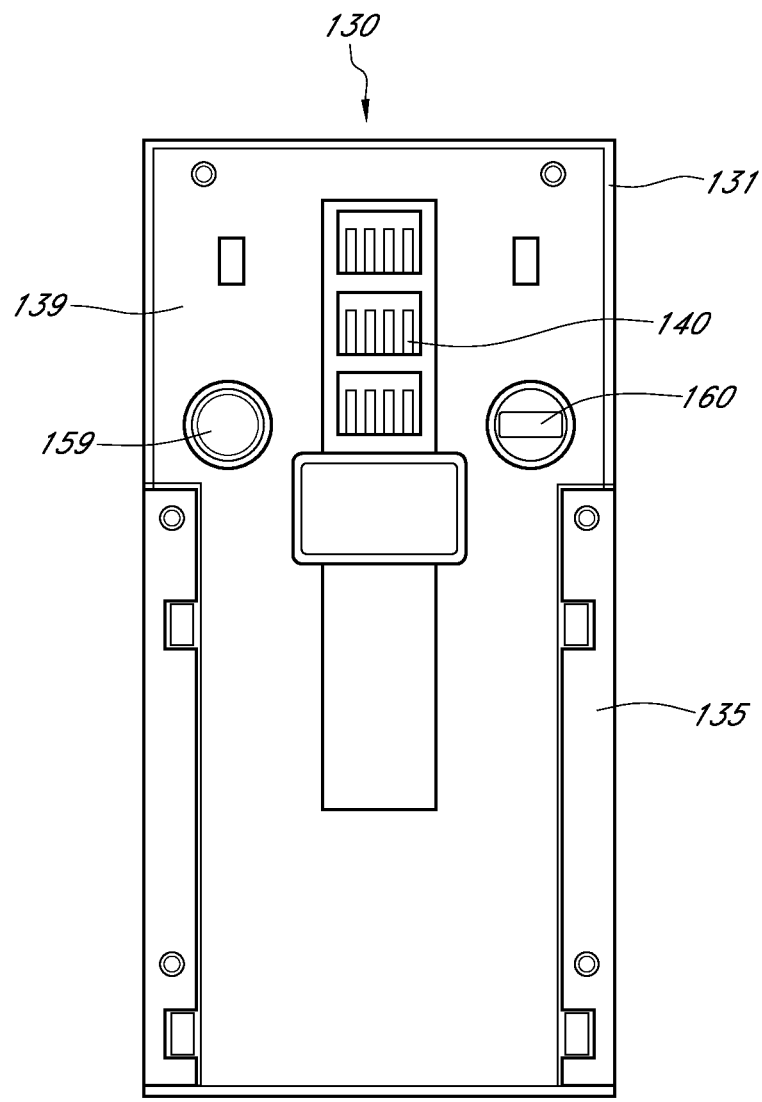
FIG. 11 is a rear view of the wireless A/V recording and communication doorbell of FIG. 10.
Figure 12:
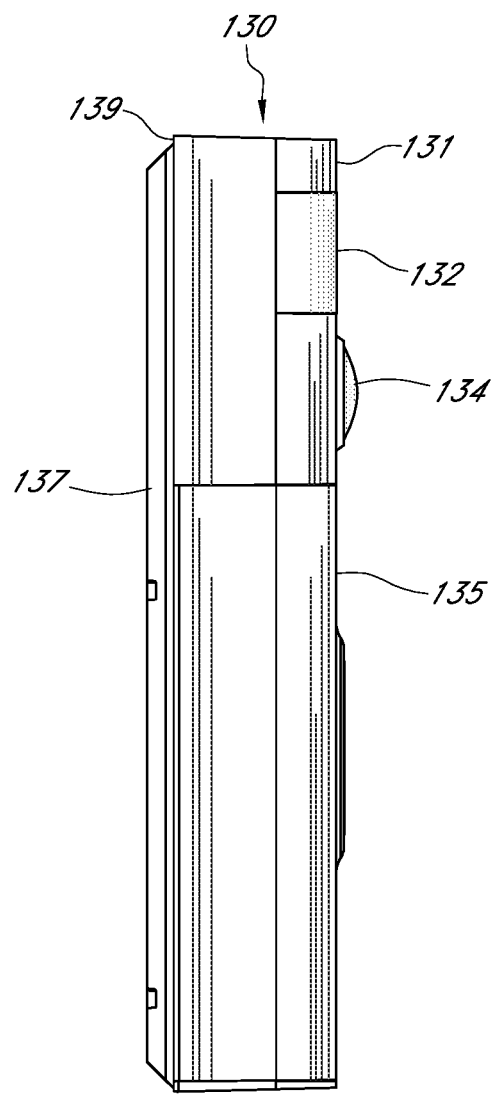
FIG. 12 is a left side view of the wireless A/V recording and communication doorbell of FIG. 10 attached to a mounting bracket according to an aspect of the present disclosure.

FIGS. 10-12 illustrate a wireless audio/video (A/V) communication doorbell 130 according to an aspect of present embodiments. FIG. 10 is a front view, FIG. 11 is a rear view, and FIG. 12 is a left side view of the doorbell 130 coupled with a mounting bracket 137. The doorbell 130 includes a faceplate 135 mounted to a back plate 139 (FIG. 11). With reference to FIG. 12, the faceplate 135 has a substantially flat profile. The faceplate 135 may comprise any suitable material, including, without limitation, metals, such as brushed aluminum or stainless steel, metal alloys, or plastics. The faceplate 135 protects the internal contents of the doorbell 130 and serves as an exterior front surface of the doorbell 130.

With reference to FIG. 10, the faceplate 135 includes a button 133 and a light pipe 136. The button 133 and the light pipe 136 may have various profiles that may or may not match the profile of the faceplate 135. The light pipe 136 may comprise any suitable material, including, without limitation, transparent plastic, that is capable of allowing light produced within the doorbell 130 to pass through. The light may be produced by one or more light-emitting components, such as light-emitting diodes (LED's), contained within the doorbell 130, as further described below. The button 133 may make contact with a button actuator (not shown) located within the doorbell 130 when the button 133 is pressed by a visitor. When pressed, the button 133 may trigger one or more functions of the doorbell 130, as further described below.

With reference to FIGS. 10 and 12, the doorbell 130 further includes an enclosure 131 that engages the faceplate 135. In the illustrated embodiment, the enclosure 131 abuts an upper edge 135T (FIG. 10) of the faceplate 135, but in alternative embodiments one or more gaps between the enclosure 131 and the faceplate 135 may facilitate the passage of sound and/or light through the doorbell 130. The enclosure 131 may comprise any suitable material, but in some embodiments the material of the enclosure 131 preferably permits infrared light to pass through from inside the doorbell 130 to the environment and vice versa. The doorbell 130 further includes a lens 132. In some embodiments, the lens may comprise a Fresnel lens, which may be patterned to deflect incoming light into one or more infrared sensors located within the doorbell 130. The doorbell 130 further includes a camera 134, which captures video data when activated, as described below.

FIG. 11 is a rear view of the doorbell 130, according to an aspect of the present embodiments. As illustrated, the enclosure 131 may extend from the front of the doorbell 130 around to the back thereof and may fit snugly around a lip of the back plate 139. The back plate 139 may comprise any suitable material, including, without limitation, metals, such as brushed aluminum or stainless steel, metal alloys, or plastics. The back plate 139 protects the internal contents of the doorbell 130 and serves as an exterior rear surface of the doorbell 130. The faceplate 135 may extend from the front of the doorbell 130 and at least partially wrap around the back plate 139, thereby allowing a coupled connection between the faceplate 135 and the back plate 139. The back plate 139 may have indentations in its structure to facilitate the coupling.

With further reference to FIG. 11, spring contacts 140 may provide power to the doorbell 130 when mated with other conductive contacts connected to a power source. The spring contacts 140 may comprise any suitable conductive material, including, without limitation, copper, and may be capable of deflecting when contacted by an inward force, for example the insertion of a mating element. The doorbell 130 further comprises a connector 160, such as a micro-USB or other connector, whereby power and/or data may be supplied to and from the components within the doorbell 130. A reset button 159 may be located on the back plate 139, and may make contact with a button actuator (not shown) located within the doorbell 130 when the reset button 159 is pressed. When the reset button 159 is pressed, it may trigger one or more functions, as described below.

FIG. 12 is a left side profile view of the doorbell 130 coupled to the mounting bracket 137, according to an aspect of the present embodiments. The mounting bracket 137 facilitates mounting the doorbell 130 to a surface, such as the exterior of a building, such as a home or office. As illustrated in FIG. 12, the faceplate 135 may extend from the bottom of the doorbell 130 up to just below the camera 134, and connect to the back plate 139 as described above. The lens 132 may extend and curl partially around the side of the doorbell 130. The enclosure 131 may extend and curl around the side and top of the doorbell 130, and may be coupled to the back plate 139 as described above. The camera 134 may protrude slightly through the enclosure 131, thereby giving it a wider field of view. The mounting bracket 137 may couple with the back plate 139 such that they contact each other at various points in a common plane of contact, thereby creating an assembly including the doorbell 130 and the mounting bracket 137. The couplings described in this paragraph, and elsewhere, may be secured by, for example and without limitation, screws, interference fittings, adhesives, or other fasteners. Interference fittings may refer to a type of connection where a material relies on pressure and/or gravity coupled with the material's physical strength to support a connection to a different element.

Figure 13:
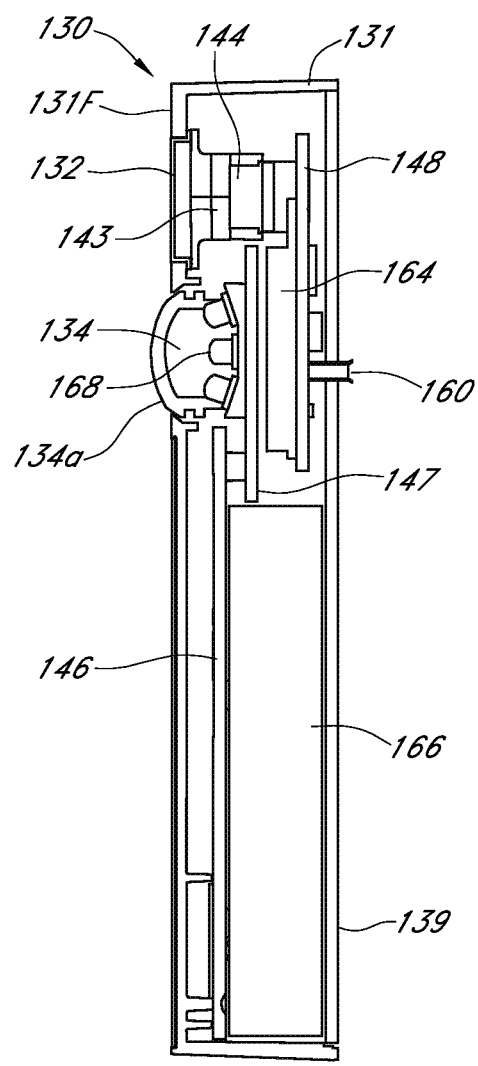
FIG. 13 is cross-sectional right side view of the wireless A/V recording and communication doorbell of FIG. 10.

FIG. 13 is a right side cross-sectional view of the doorbell 130 without the mounting bracket 137. In the illustrated embodiment, the lens 132 is substantially coplanar with the front surface 131F of the enclosure 131. In alternative embodiments, the lens 132 may be recessed within the enclosure 131 or may protrude outward from the enclosure 131. The camera 134 is coupled to a camera printed circuit board (PCB) 147, and a lens 134a of the camera 134 protrudes through an opening in the enclosure 131. The camera lens 134a may be a lens capable of focusing light into the camera 134 so that clear images may be taken.

The camera PCB 147 may be secured within the doorbell with any suitable fasteners, such as screws, or interference connections, adhesives, etc. The camera PCB 147 comprises various components that enable the functionality of the camera 134 of the doorbell 130, as described below. Infrared light-emitting components, such as infrared LED's 168, are coupled to the camera PCB 147 and may be triggered to activate when a light sensor detects a low level of ambient light. When activated, the infrared LED's 168 may emit infrared light through the enclosure 131 and/or the camera 134 out into the ambient environment. The camera 134, which may be configured to detect infrared light, may then capture the light emitted by the infrared LED's 168 as it reflects off objects within the camera's 134 field of view, so that the doorbell 130 can clearly capture images at night (may be referred to as "night vision").

With continued reference to FIG. 13, the doorbell 130 further comprises a front PCB 146, which in the illustrated embodiment resides in a lower portion of the doorbell 130 adjacent a battery 166. The front PCB 146 may be secured within the doorbell 130 with any suitable fasteners, such as screws, or interference connections, adhesives, etc. The front PCB 146 comprises various components that enable the functionality of the audio and light components, as further described below. The battery 166 may provide power to the doorbell 130 components while receiving power from the spring contacts 140, thereby engaging in a trickle-charge method of power consumption and supply. Alternatively, the doorbell 130 may draw power directly from the spring contacts 140 while relying on the battery 166 only when the spring contacts 140 are not providing the power necessary for all functions.

With continued reference to FIG. 13, the doorbell 130 further comprises a power PCB 148, which in the illustrated embodiment resides behind the camera PCB 147. The power PCB 148 may be secured within the doorbell 130 with any suitable fasteners, such as screws, or interference connections, adhesives, etc. The power PCB 148 comprises various components that enable the functionality of the power and device-control components, as further described below.

With continued reference to FIG. 13, the doorbell 130 further comprises a communication module 164 coupled to the power PCB 148. The communication module 164 facilitates communication with client devices in one or more remote locations, as further described below. The connector 160 may protrude outward from the power PCB 148 and extend through a hole in the back plate 139. The doorbell 130 further comprises passive infrared (PIR) sensors 144, which are secured on or within a PIR sensor holder 143, and the assembly resides behind the lens 132. The PIR sensor holder 143 may be secured to the doorbell 130 with any suitable fasteners, such as screws, or interference connections, adhesives, etc. The PIR sensors 144 may be any type of sensor capable of detecting and communicating the presence of a heat source within their field of view. Further, alternative embodiments may comprise one or more motion sensors either in place of or in addition to the PIR sensors 144. The motion sensors may be configured to detect motion using any methodology, such as a methodology that does not rely on detecting the presence of a heat source within a field of view.

Figure 14:
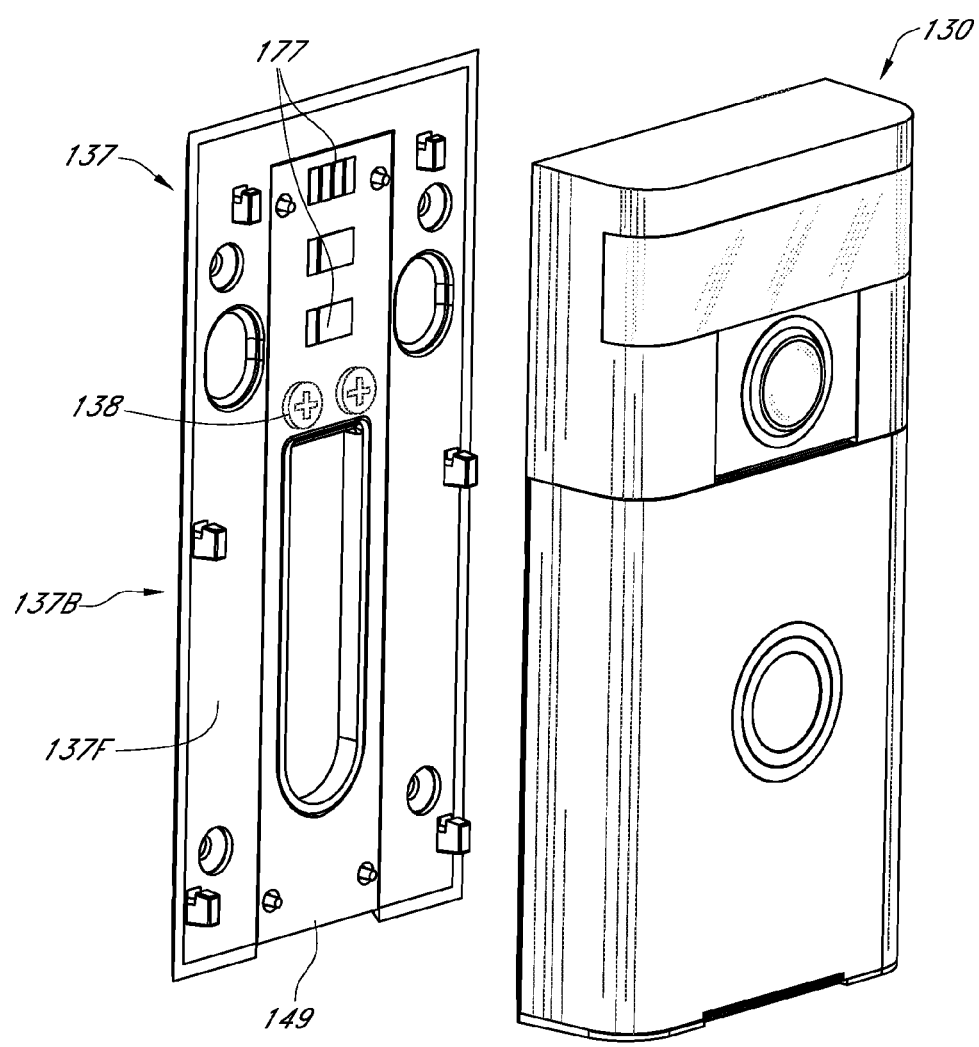
FIG. 14 is an exploded view of the wireless A/V recording and communication doorbell and the mounting bracket of FIG. 12.

FIG. 14 is an exploded view of the doorbell 130 and the mounting bracket 137 according to an aspect of the present embodiments. The mounting bracket 137 is configured to be mounted to a mounting surface (not shown) of a structure, such as a home or an office. FIG. 14 shows the front side 137F of the mounting bracket 137. The mounting bracket 137 is configured to be mounted to the mounting surface such that the back side 137B thereof faces the mounting surface. In certain embodiments the mounting bracket 137 may be mounted to surfaces of various composition, including, without limitation, wood, concrete, stucco, brick, vinyl siding, aluminum siding, etc., with any suitable fasteners, such as screws, or interference connections, adhesives, etc. The doorbell 130 may be coupled to the mounting bracket 137 with any suitable fasteners, such as screws, or interference connections, adhesives, etc.

With continued reference to FIG. 14, the illustrated embodiment of the mounting bracket 137 includes the terminal screws 138. The terminal screws 138 are configured to receive electrical wires adjacent the mounting surface of the structure upon which the mounting bracket 137 is mounted, so that the doorbell 130 may receive electrical power from the structure's electrical system. The terminal screws 138 are electrically connected to electrical contacts 177 of the mounting bracket. If power is supplied to the terminal screws 138, then the electrical contacts 177 also receive power through the terminal screws 138. The electrical contacts 177 may comprise any suitable conductive material, including, without limitation, copper, and may protrude slightly from the face of the mounting bracket 137 so that they may mate with the spring contacts 140 located on the back plate 139.

Figure 15:
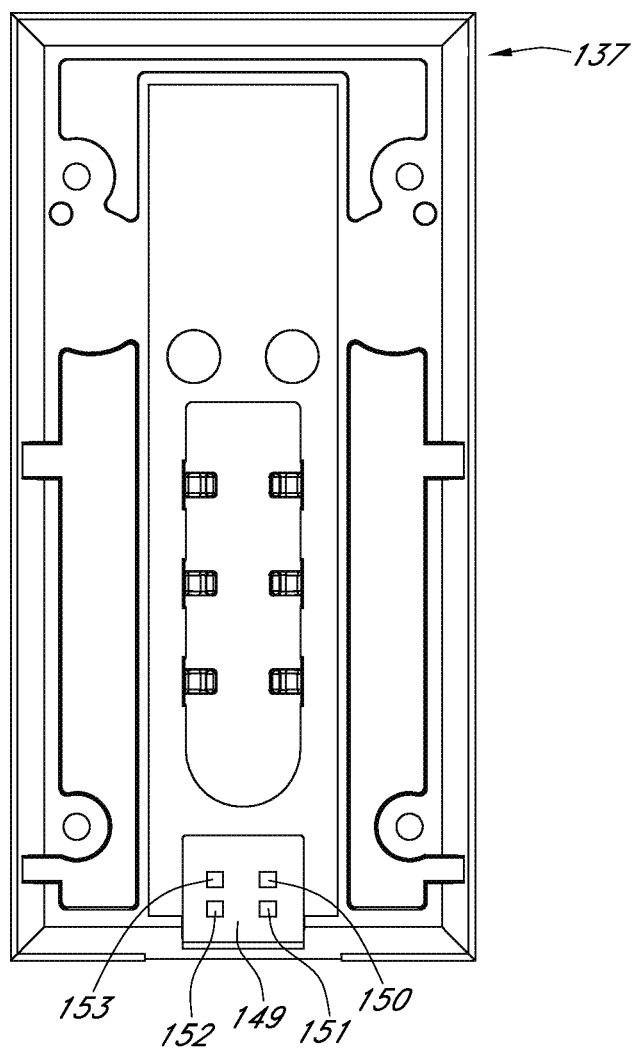
FIG. 15 is a rear view of the mounting bracket of FIG. 12.

With reference to FIGS. 14 and 15 (which is a rear view of the mounting bracket 137), the mounting bracket 137 further comprises a bracket PCB 149. With reference to FIG. 15, the bracket PCB 149 is situated outside the doorbell 130, and is therefore configured for various sensors that measure ambient conditions, such as an accelerometer 150, a barometer 151, a humidity sensor 152, and a temperature sensor 153. The functions of these components are discussed in more detail below. The bracket PCB 149 may be secured to the mounting bracket 137 with any suitable fasteners, such as screws, or interference connections, adhesives, etc.

Figure 16A:
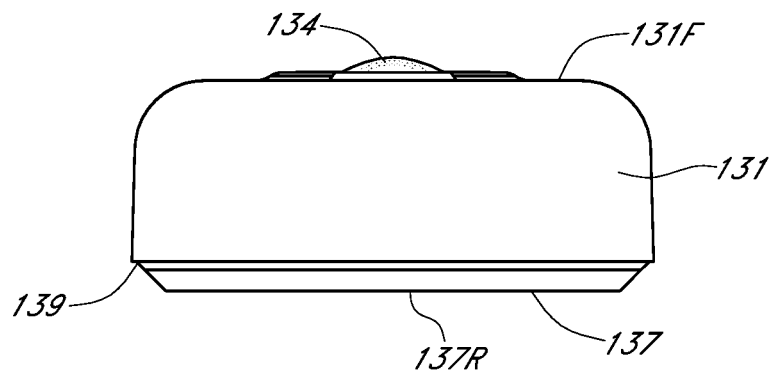
FIGS. 16A and 16B are top and bottom views, respectively, of the wireless A/V recording and communication doorbell and the mounting bracket of FIG. 12.
Figure 16B:
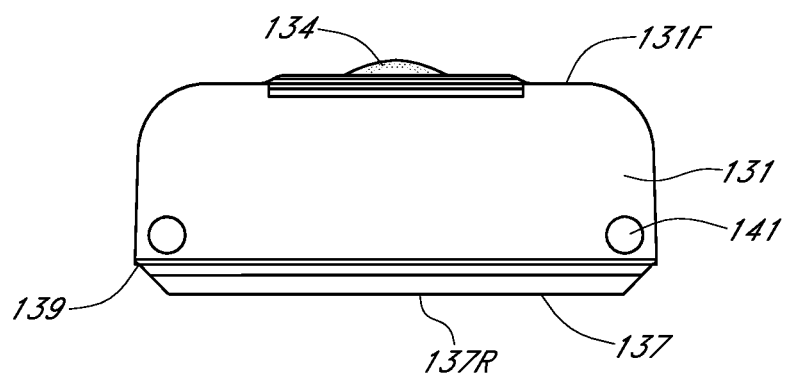
Figure 17A:
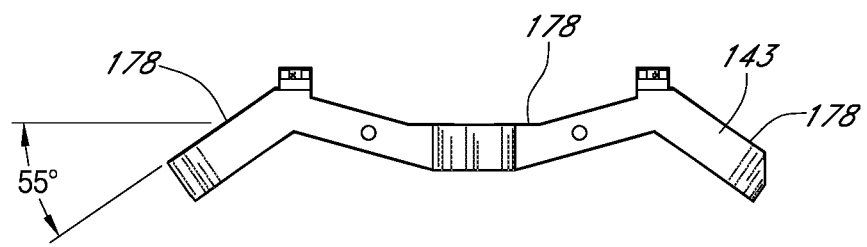
FIGS. 17A and 17B are top and front views, respectively, of a passive infrared sensor holder of the wireless A/V recording and communication doorbell of FIG. 10.
Figure 17B:
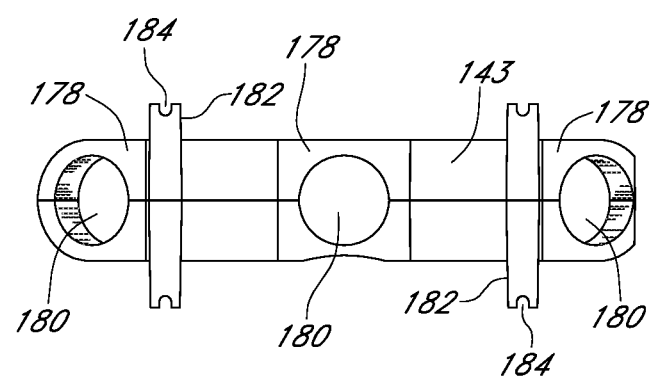

FIGS. 16A and 16B are top and bottom views, respectively, of the doorbell 130. As described above, the enclosure 131 may extend from the front face 131F of the doorbell 130 to the back, where it contacts and snugly surrounds the back plate 139. The camera 134 may protrude slightly beyond the front face 131F of the enclosure 131, thereby giving the camera 134 a wider field of view. The mounting bracket 137 may include a substantially flat rear surface 137R, such that the doorbell 130 and the mounting bracket 137 assembly may sit flush against the surface to which they are mounted. With reference to FIG. 10B, the lower end of the enclosure 131 may include security screw apertures 141 configured to receive screws or other fasteners.

FIG. 11A is a top view of the PIR sensor holder 143. The PIR sensor holder 143 may comprise any suitable material, including, without limitation, metals, metal alloys, or plastics. The PIR sensor holder 143 is configured to mount the PIR sensors 144 behind the lens 132 such that the PIR sensors 144 face out through the lens 132 at varying angles, thereby creating a wide field of view for the PIR sensors 144, and dividing the field of view into zones, as further described below. With further reference to FIG. 11A, the PIR sensor holder 143 includes one or more faces 178 within or on which the PIR sensors 144 may be mounted. In the illustrated embodiment, the PIR sensor holder 143 includes three faces 178, with each of two outer faces 178 angled at 55° with respect to a center one of the faces 178. In alternative embodiments, the angle formed by adjacent ones of the faces 178 may be increased or decreased as desired to alter the field of view of the PIR sensors 144.

FIG. 11B is a front view of the PIR sensor holder 143. In the illustrated embodiment, each of the faces 178 includes a through hole 180 in which the PIR sensors 144 may be mounted. First and second brackets 182, spaced from one another, extend transversely across the PIR sensor holder 143. Each of the brackets 182 includes notches 184 at either end. The brackets 182 may be used to secure the PIR sensor holder 143 within the doorbell 130. In alternative embodiments, the through holes 180 in the faces 178 may be omitted. For example, the PIR sensors 144 may be mounted directly to the faces 178 without the through holes 180. Generally, the faces 178 may be comprise any structure configured to locate and secure the PIR sensors 144 in place.

Figure 18A:
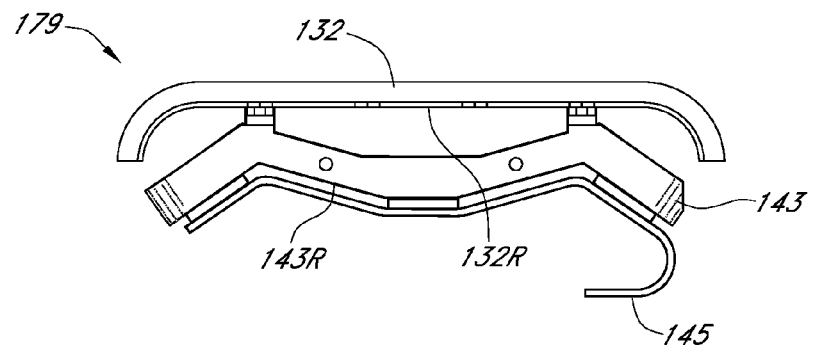
FIGS. 18A and 18B are top and front views, respectively, of a passive infrared sensor holder assembly of the wireless A/V recording and communication doorbell of FIG. 10.
Figure 18B:
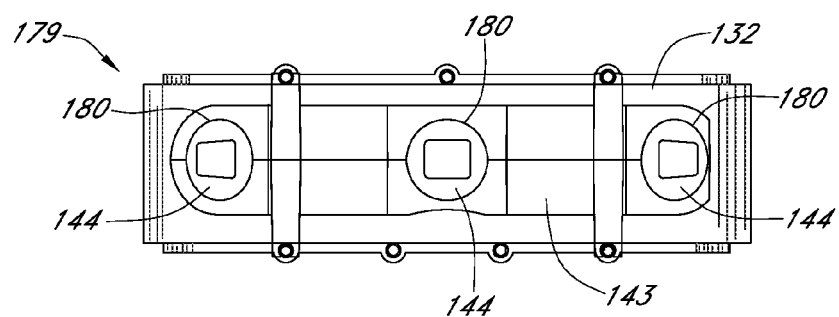

FIGS. 18A and 18B are top and front views, respectively, of a PIR sensor assembly 179, including the PIR sensor holder 143, the lens 132, and a flexible power circuit 145. The PIR sensor holder 143 may be secured to a rear face 132R of the lens 132, as shown, with the brackets 182 abutting the rear face 132R of the lens 132. The flexible power circuit 145, which may be any material or component capable of delivering power and/or data to and from the PIR sensors 144, is secured to a rear face 143R of the PIR sensor holder 143, and may be contoured to match the angular shape of the PIR sensor holder 143. The flexible power circuit 145 may connect to, draw power from, and/or transmit data to and/or from, the power PCB 148 (FIG. 13).

Figure 19:
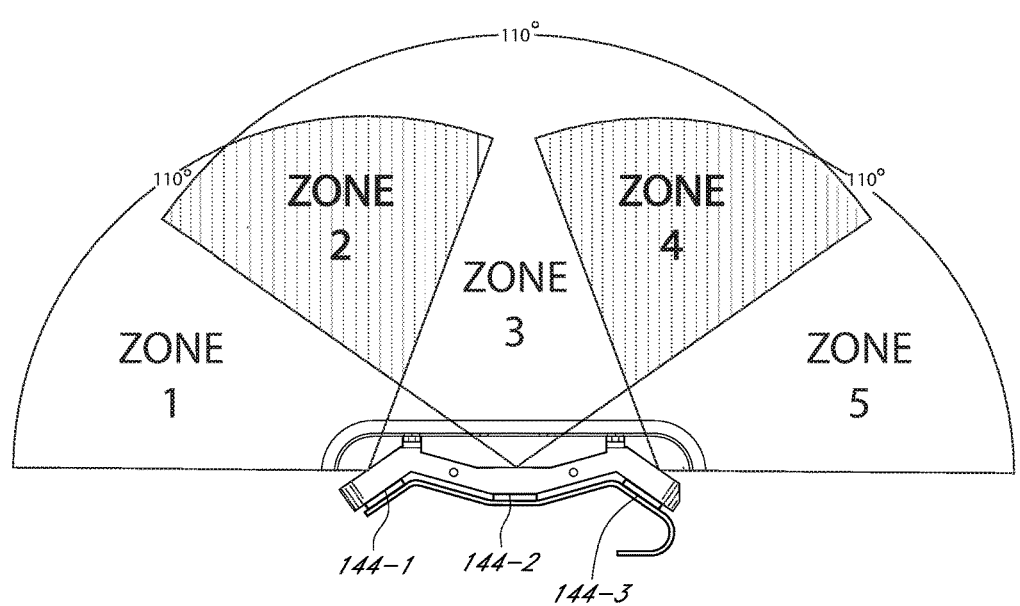
FIG. 19 is a top view of the passive infrared sensor assembly of FIG. 16A and a field of view thereof according to an aspect of the present disclosure.

FIG. 19 is a top view of the PIR sensor assembly 179 illustrating the fields of view of the PIR sensors 144. Each PIR sensor 144 includes a field of view, referred to as a "zone," that traces an angle extending outward from the respective PIR sensor 144. Zone 1 is the area that is visible only to Passive Infrared Sensor 144-1. Zone 2 is the area that is visible only to the PIR sensors 144-1 and 144-2. Zone 3 is the area that is visible only to Passive Infrared Sensor 144-2. Zone 4 is the area that is visible only to the PIR sensors 144-2 and 144-3. Zone 5 is the area that is visible only to Passive Infrared Sensor 144-3. The doorbell 130 may be capable of determining the direction that an object is moving based upon which zones are triggered in a time sequence. In the illustrated embodiment, each zone extends across an angle of 110°. In alternative embodiments, each zone may extend across a different angle, such as one greater than or less than 110°.

Figure 20:
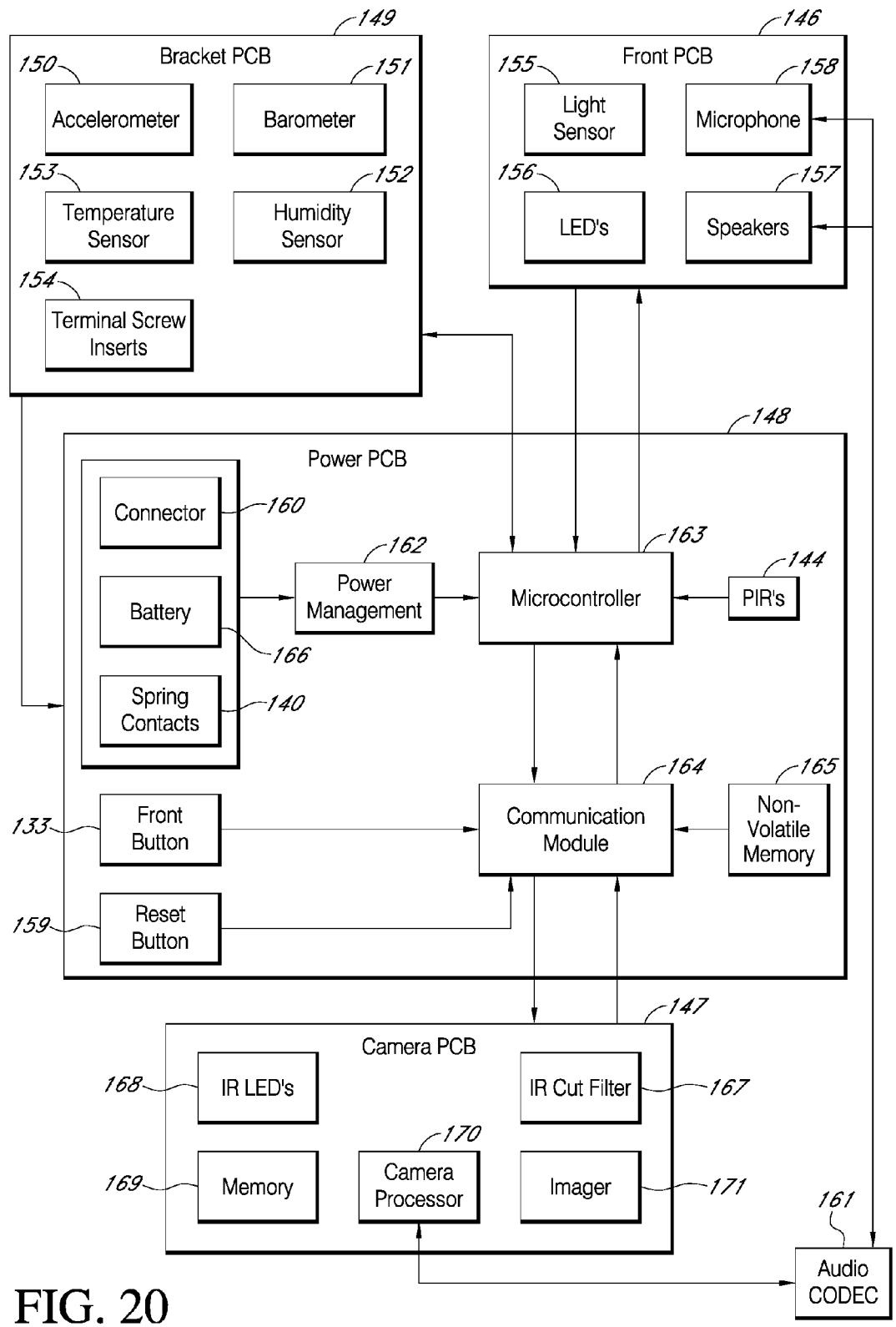
FIG. 20 a functional block diagram of the components of the wireless A/V recording and communication doorbell of FIG. 10.

FIG. 20 is a functional block diagram of the components within or in communication with the doorbell 130, according to an aspect of the present embodiments. As described above, the bracket PCB 149 may comprise an accelerometer 150, a barometer 151, a humidity sensor 152, and a temperature sensor 153. The accelerometer 150 may be one or more sensors capable of sensing motion and/or acceleration. The barometer 151 may be one or more sensors capable of determining the atmospheric pressure of the surrounding environment in which the bracket PCB 149 may be located. The humidity sensor 152 may be one or more sensors capable of determining the amount of moisture present in the atmospheric environment in which the bracket PCB 149 may be located. The temperature sensor 153 may be one or more sensors capable of determining the temperature of the ambient environment in which the bracket PCB 149 may be located. As described above, the bracket PCB 149 may be located outside the housing of the doorbell 130 so as to reduce interference from heat, pressure, moisture, and/or other stimuli generated by the internal components of the doorbell 130.

With further reference to FIG. 20, the bracket PCB 149 may further comprise terminal screw inserts 154, which may be configured to receive the terminal screws 138 and transmit power to the electrical contacts 177 on the mounting bracket 137 (FIG. 14). The bracket PCB 149 may be electrically and/or mechanically coupled to the power PCB 148 through the terminal screws 138, the terminal screw inserts 154, the spring contacts 140, and the electrical contacts 177. The terminal screws 138 may receive electrical wires located at the surface to which the doorbell 130 is mounted, such as the wall of a building, so that the doorbell can receive electrical power from the building's electrical system. Upon the terminal screws 138 being secured within the terminal screw inserts 154, power may be transferred to the bracket PCB 149, and to all of the components associated therewith, including the electrical contacts 177. The electrical contacts 177 may transfer electrical power to the power PCB 148 by mating with the spring contacts 140.

With further reference to FIG. 20, the front PCB 146 may comprise a light sensor 155, one or more light-emitting components, such as LED's 156, one or more speakers 157, and a microphone 158. The light sensor 155 may be one or more sensors capable of detecting the level of ambient light of the surrounding environment in which the doorbell 130 may be located. LED's 156 may be one or more light-emitting diodes capable of producing visible light when supplied with power. The speakers 157 may be any electromechanical device capable of producing sound in response to an electrical signal input. The microphone 158 may be an acoustic-to-electric transducer or sensor capable of converting sound waves into an electrical signal. When activated, the LED's 156 may illuminate the light pipe 136 (FIG. 10). The front PCB 146 and all components thereof may be electrically coupled to the power PCB 148, thereby allowing data and/or power to be transferred to and from the power PCB 148 and the front PCB 146.

The speakers 157 and the microphone 158 may be coupled to the camera processor 170 through an audio CODEC 161. For example, the transfer of digital audio from the user's client device 114 and the speakers 157 and the microphone 158 may be compressed and decompressed using the audio CODEC 161, coupled to the camera processor 170. Once compressed by audio CODEC 161, digital audio data may be sent through the communication module 164 to the network 112, routed by one or more servers 118, and delivered to the user's client device 114. When the user speaks, after being transferred through the network 112, digital audio data is decompressed by audio CODEC 161 and emitted to the visitor via the speakers 157.

With further reference to FIG. 20, the power PCB 148 may comprise a power management module 162, a microcontroller 163, the communication module 164, and power PCB non-volatile memory 165. In certain embodiments, the power management module 162 may comprise an integrated circuit capable of arbitrating between multiple voltage rails, thereby selecting the source of power for the doorbell 130. The battery 166, the spring contacts 140, and/or the connector 160 may each provide power to the power management module 162. The power management module 162 may have separate power rails dedicated to the battery 166, the spring contacts 140, and the connector 160. In one aspect of the present disclosure, the power management module 162 may continuously draw power from the battery 166 to power the doorbell 130, while at the same time routing power from the spring contacts 140 and/or the connector 160 to the battery 166, thereby allowing the battery 166 to maintain a substantially constant level of charge. Alternatively, the power management module 162 may continuously draw power from the spring contacts 140 and/or the connector 160 to power the doorbell 130, while only drawing from the battery 166 when the power from the spring contacts 140 and/or the connector 160 is low or insufficient. The power management module 162 may also serve as a conduit for data between the connector 160 and the microcontroller 163.

With further reference to FIG. 20, in certain embodiments the microcontroller 163 may comprise an integrated circuit including a processor core, memory, and programmable input/output peripherals. The microcontroller 163 may receive input signals, such as data and/or power, from the PIR sensors 144, the bracket PCB 149, the power management module 162, the light sensor 155, the microphone 158, and/or the communication module 164, and may perform various functions as further described below. When the microcontroller 163 is triggered by the PIR sensors 144, the microcontroller 163 may be triggered to perform one or more functions, such as those described below with reference to FIG. 22. When the light sensor 155 detects a low level of ambient light, the light sensor 155 may trigger the microcontroller 163 to enable "night vision," as further described below. The microcontroller 163 may also act as a conduit for data communicated between various components and the communication module 164.

With further reference to FIG. 20, the communication module 164 may comprise an integrated circuit including a processor core, memory, and programmable input/output peripherals. The communication module 164 may also be configured to transmit data wirelessly to a remote network device, and may include one or more transceivers (not shown). The wireless communication may comprise one or more wireless networks, such as, without limitation, Wi-Fi, cellular, Bluetooth, and/or satellite networks. The communication module 164 may receive inputs, such as power and/or data, from the camera PCB 147, the microcontroller 163, the button 133, the reset button 159, and/or the power PCB non-volatile memory 165. When the button 133 is pressed, the communication module 164 may be triggered to perform one or more functions, such as those described below with reference to FIG. 21. When the reset button 159 is pressed, the communication module 164 may be triggered to erase any data stored at the power PCB non-volatile memory 165 and/or at the camera PCB memory 169. The communication module 164 may also act as a conduit for data communicated between various components and the microcontroller 163. The power PCB non-volatile memory 165 may comprise flash memory configured to store and/or transmit data. For example, in certain embodiments the power PCB non-volatile memory 165 may comprise serial peripheral interface (SPI) flash memory.

With further reference to FIG. 20, the camera PCB 147 may comprise components that facilitate the operation of the camera 134. For example, an imager 171 may comprise a video recording sensor and/or a camera chip. In one aspect of the present disclosure, the imager 171 may comprise a complementary metal-oxide semiconductor (CMOS) array, and may be capable of recording high definition (720p or better) video files. A camera processor 170 may comprise an encoding and compression chip. In some embodiments, the camera processor 170 may comprise a bridge processor. The camera processor 170 may process video recorded by the imager 171 and audio recorded by the microphone 158, and may transform this data into a form suitable for wireless transfer by the communication module 164 to a network. The camera PCB memory 169 may comprise volatile memory that may be used when data is being buffered or encoded by the camera processor 170. For example, in certain embodiments the camera PCB memory 169 may comprise synchronous dynamic random access memory (SD RAM). IR LED's 168 may comprise light-emitting diodes capable of radiating infrared light. IR cut filter 167 may comprise a system that, when triggered, configures the imager 171 to see primarily infrared light as opposed to visible light. When the light sensor 155 detects a low level of ambient light (which may comprise a level that impedes the performance of the imager 171 in the visible spectrum), the IR LED's 168 may shine infrared light through the doorbell 130 enclosure out to the environment, and the IR cut filter 167 may enable the imager 171 to see this infrared light as it is reflected or refracted off of objects within the field of view of the doorbell. This process may provide the doorbell 130 with the "night vision" function mentioned above.

Figure 21:
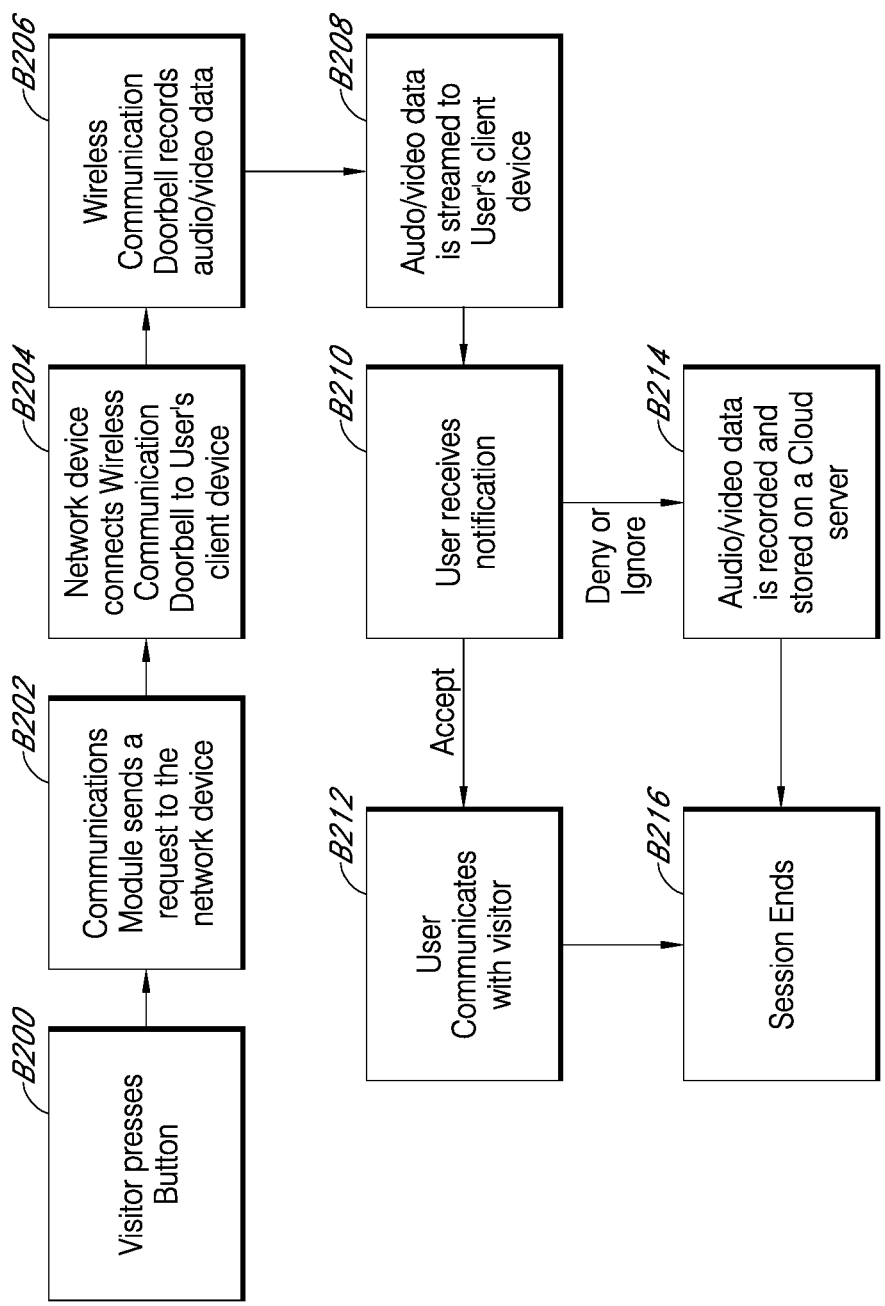
FIG. 21 is a flowchart illustrating a process for a wireless A/V recording and communication doorbell according to an aspect of the present disclosure.

FIG. 21 is a flowchart illustrating one embodiment of a process according to an aspect of the present disclosure. At block B200, a visitor presses the button 133 on the doorbell 130. At block B202, the communication module 164 sends a request to a network device. Once the network device receives the request, at block B204 the network device may connect the doorbell 130 to the user's client device 114 through the user's wireless network 110 and the network 112. In block B206, the doorbell 130 may record available audio and/or video data using the camera 134, the microphone 158, and/or any other sensor available. At block B208, the audio and/or video data is transmitted to the user's client device 114. At block B210, the user may receive a notification on his or her client device 114 prompting him or her to either accept or deny. If the user denies the notification, then the process advances to block B214, where the audio and/or video data is recorded and stored at a cloud server. The session then ends at block B216 and the connection between the doorbell 130 and the user's client device 114 is terminated. If, however, the user elects to accept the notification, then at block B212 the user communicates with the visitor through the user's client device 114 while being provided audio and/or video data captured by the camera 134, the microphone 158, and/or other sensors. At the end of the call, the user may terminate the connection between the user's client device 114 and the doorbell 130 and the session ends at block B216. In some embodiments, the audio and/or video data may be recorded and stored at a cloud server (block B214) even if the user accepts the notification and communicates with the visitor through the user's client device 114.

Figure 22:
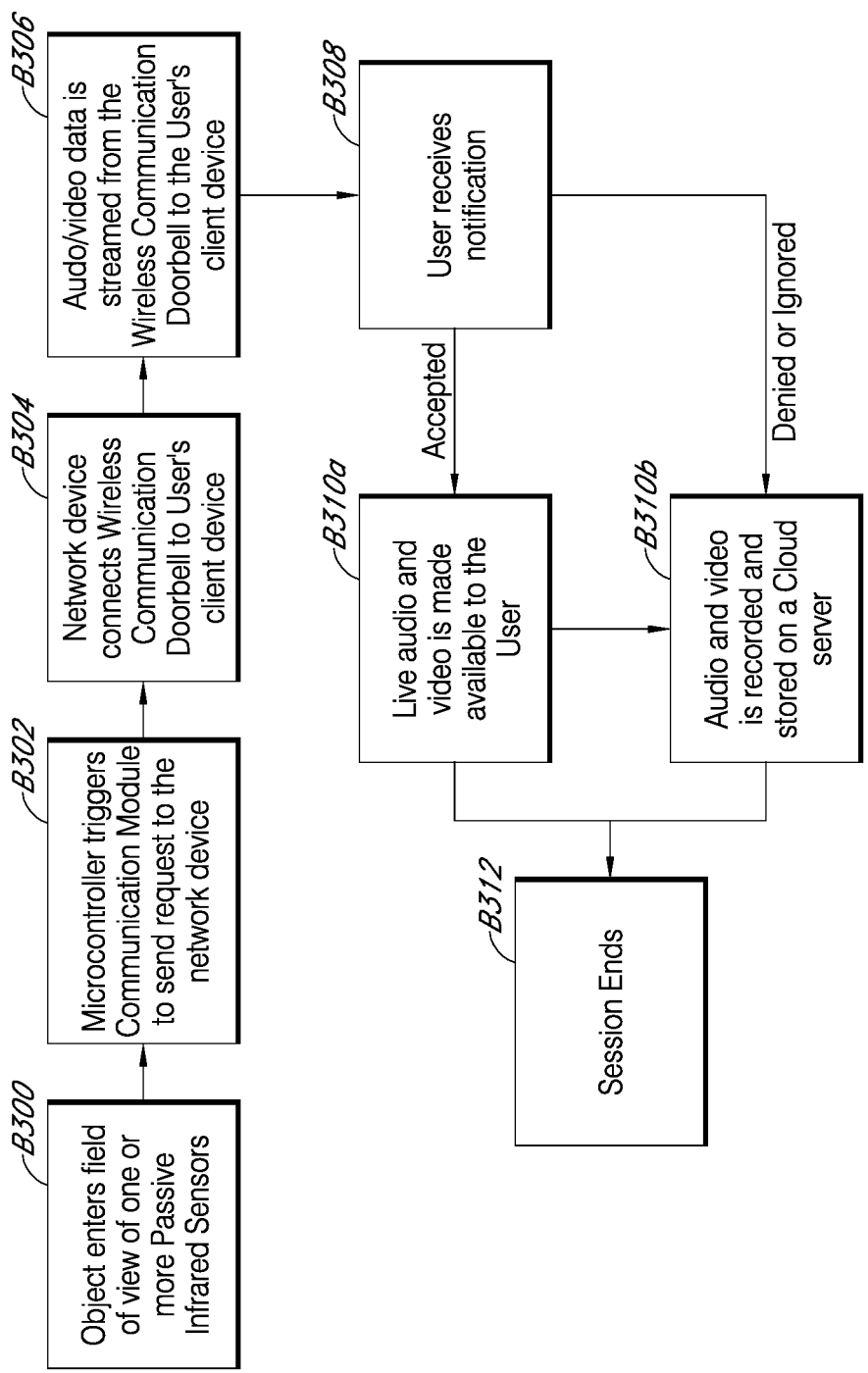
FIG. 22 is a flowchart illustrating another process for a wireless A/V recording and communication doorbell according to an aspect of the present disclosure.

FIG. 22 is a flowchart illustrating another embodiment of a process according to an aspect of the present disclosure. At block B300, an object may move into the field of view of one or more of the PIR sensors 144. At block B302, the PIR sensors 144 may trigger the microcontroller 163, which may then trigger the communication module 164 to send a request to a network device. At block B304, the network device may connect the doorbell 130 to the user's client device 114 through the user's wireless network 110 and the network 112. At block B306, the doorbell 130 may record available audio and/or video data using the camera 134, the microphone 158, and/or any other available sensor, and stream the data to the user's client device 114. At block B308, the user may receive a notification prompting the user to either accept or deny the notification. If the notification is accepted, then at block B310a the live audio/video data may be displayed on the user's client device 114, thereby allowing the user surveillance from the perspective of the doorbell 130. When the user is satisfied with this function, the user may sever the connection at block B312, whereby the session ends. If, however, at block B308 the user denies the notification, or ignores the notification and a specified time interval elapses, then the connection between the doorbell 130 and the user's client device 114 is terminated and the audio/video data is recorded and stored at a cloud server at block B310b, such that the user may view the audio/video data later at their convenience. The doorbell 130 may be configured to record for a specified period of time in the event the notification in block B308 is denied or ignored. If such a time period is set, the doorbell 130 may record data for that period of time before ceasing operation at block B312 thereby ending the session. In some embodiments, the audio and/or video data may be recorded and stored at a cloud server (block B310b) even if the user accepts the notification and communicates with the visitor through the user's client device 114.

Figure 23:
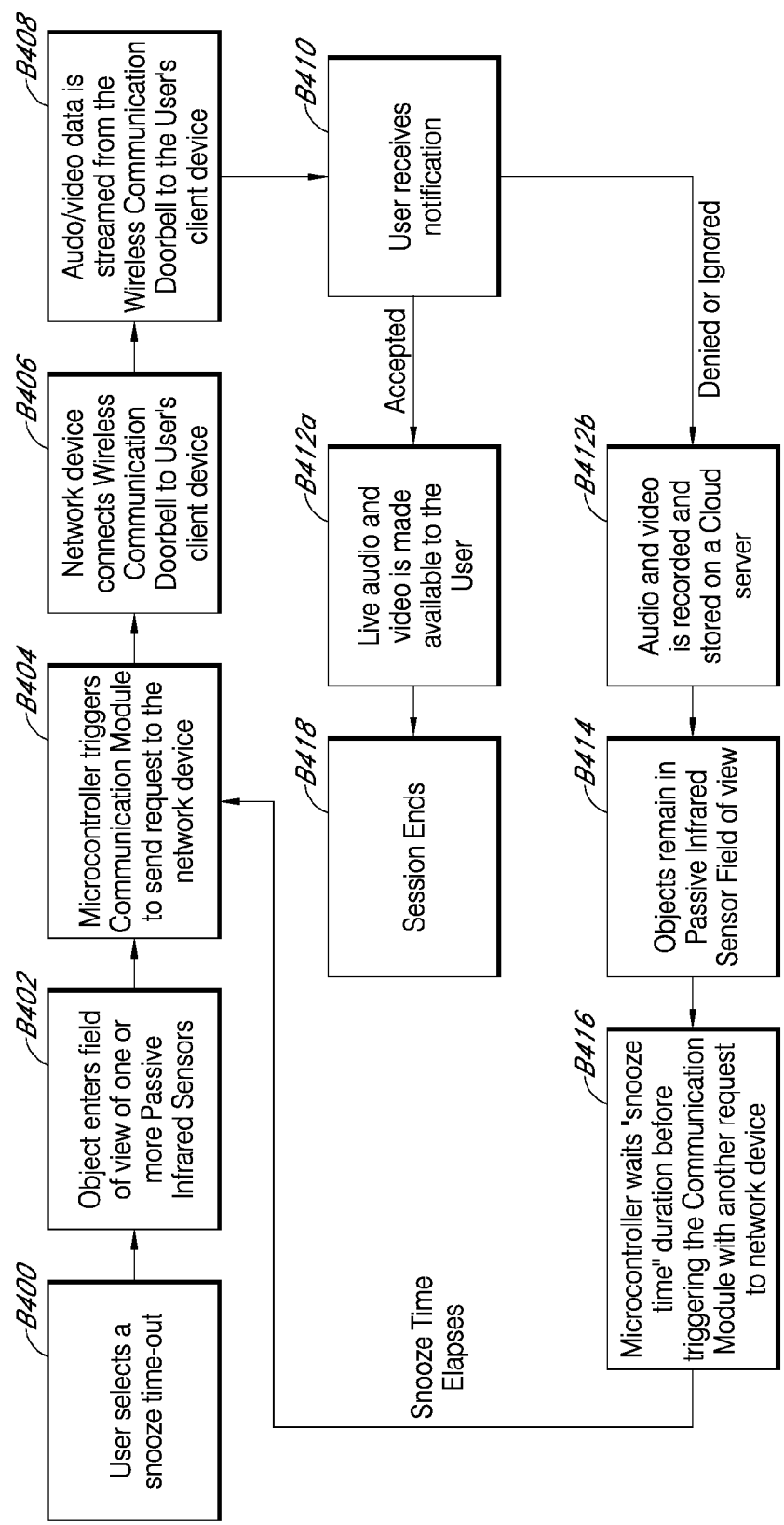
FIG. 23 is a flowchart illustrating another process for a wireless A/V recording and communication doorbell according to an aspect of the present disclosure.

FIG. 23 is a flowchart illustrating another embodiment of a process according to an aspect of the present disclosure. At block B400, the user may select a "snooze time-out," which is a time period during which the doorbell 130 may deactivate or otherwise not respond to stimuli (such as light, sound, or heat signatures) after an operation is performed, e.g. a notification is either accepted or denied/ignored. For example, the user may set a snooze time-out of 15 minutes. At block B402, an object moves into the field of view of one or more of the PIR sensors 144. At block B404, the microcontroller 163 may trigger the communication module 164 to send a request to a network device. In block B406, the network device may connect the doorbell 130 to the user's client device 114 through the user's wireless network 110 and the network 112. At block B408, audio/video data captured by the doorbell 130 may be streamed to the user's client device 114. At block B410, the user may receive a notification prompting the user to either accept or deny/ignore the request. If the request is denied or ignored, then at block B412b audio/video data may be recorded and stored at a cloud server. After the doorbell 130 finishes recording, the objects may remain in the PIR sensor 144 field of view at block B414. In block B416, the microcontroller 163 waits for the "snooze time" to elapse, e.g. 15 minutes, before triggering the communication module 164 to submit another request to the network device. After the snooze time, e.g. 15 minutes, elapses, the process moves back to block B404 and progresses as described above. The cycle may continue like this until the user accepts the notification request at block B410. The process then moves to block B412a, where live audio and/or video data is displayed on the user's client device 114, thereby allowing the user surveillance from the perspective of the doorbell 130. At the user's request, the connection may be severed and the session ends at block B418. At this point the user may elect for the process to revert back to block B416, whereby there may be no further response until the snooze time, e.g. 15 minutes, has elapsed from the end of the previous session, or the user may elect for the process to return to block B402 and receive a notification the next time an object is perceived by one or more of the PIR sensors 144. In some embodiments, the audio and/or video data may be recorded and stored at a cloud server (block B412b) even if the user accepts the notification and communicates with the visitor through the user's client device 114.

As discussed above, the present disclosure provides numerous examples of methods and systems including A/V recording and communication doorbells, but the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and functionality of the doorbell 130, but without the front button 133, the button actuator, and/or the light pipe 136. An example A/V recording and communication security camera may further omit other components, such as, for example, the bracket PCB 149 and its components.

The present embodiments include a wireless speaker device configured for use with a wireless A/V recording and communication device, such as a doorbell. The wireless speaker device, which includes a speaker, may plug into a standard wall outlet and connect to the user's local area network (LAN), such as a Wi-Fi network. The LAN is connected to a wide area network (WAN), such as the Internet and/or a public switched telephone network (PSTN). When the wireless A/V recording and communication device detects a visitor, it sends a signal, via the LAN, to at least one device in the WAN, such as a server and/or a service. In response, the at least one device in the WAN sends a signal, via the LAN, to the wireless speaker device. The signal to the wireless speaker device includes a command for the wireless speaker device to emit a tone through its speaker. The wireless speaker device then emits a tone through its speaker to alert the user that a visitor is at the wireless A/V recording and communication device.

Figure 24:
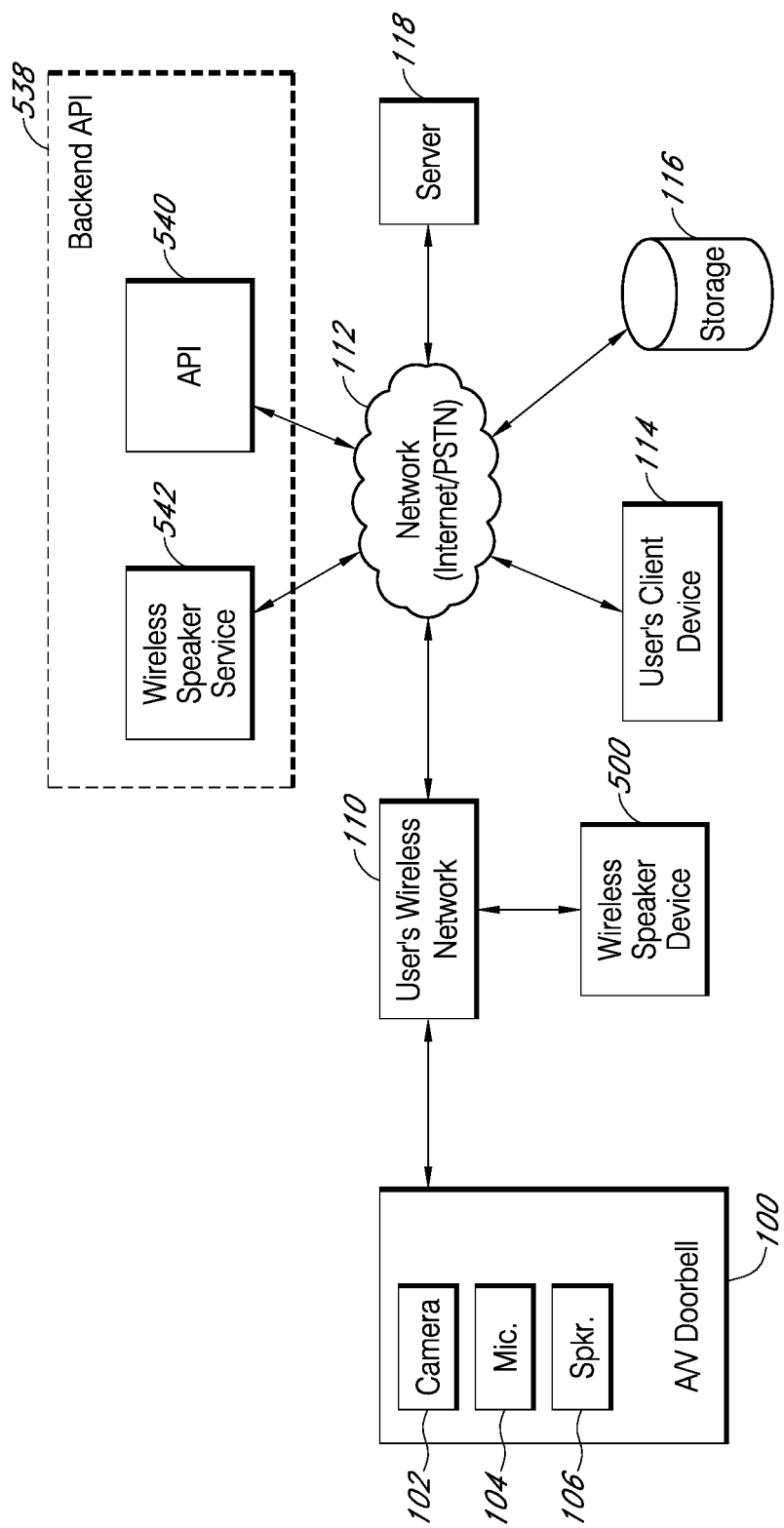
FIG. 24 is a functional block diagram illustrating a wireless A/V recording and communication doorbell system including a wireless speaker device for wireless A/V recording and communication devices according to the present embodiments.

FIGS. 24-29 illustrate various aspects of the present embodiments of a wireless speaker device for wireless A/V recording and communication devices. FIG. 24, for example, is a functional block diagram illustrating a wireless A/V recording and communication doorbell system including a wireless speaker device for wireless A/V recording and communication devices according to the present embodiments. The system includes many of the same components as the system shown in FIG. 1, including the wireless A/V recording and communication doorbell 100, the user's wireless network 110, the network 112, the user's client device 114, the remote storage device(s) 116, and the server(s) 118. The wireless A/V recording and communication doorbell 100 may be similar or identical to the wireless A/V recording and communication doorbell 130 described above with reference to FIGS. 10-23. As described above, the wireless A/V recording and communication doorbell 100 may, in other embodiments, comprise another type of wireless A/V recording and communication device, such as a security camera. The user's wireless network 110 may comprise a local area network (LAN), such as a Wi-Fi network compatible with the IEEE 802.11 standard and/or other wireless communication standard(s). The network 112 may comprise a wide area network (WAN), such as the Internet and/or a public switched telephone network (PSTN).

Figure 25:
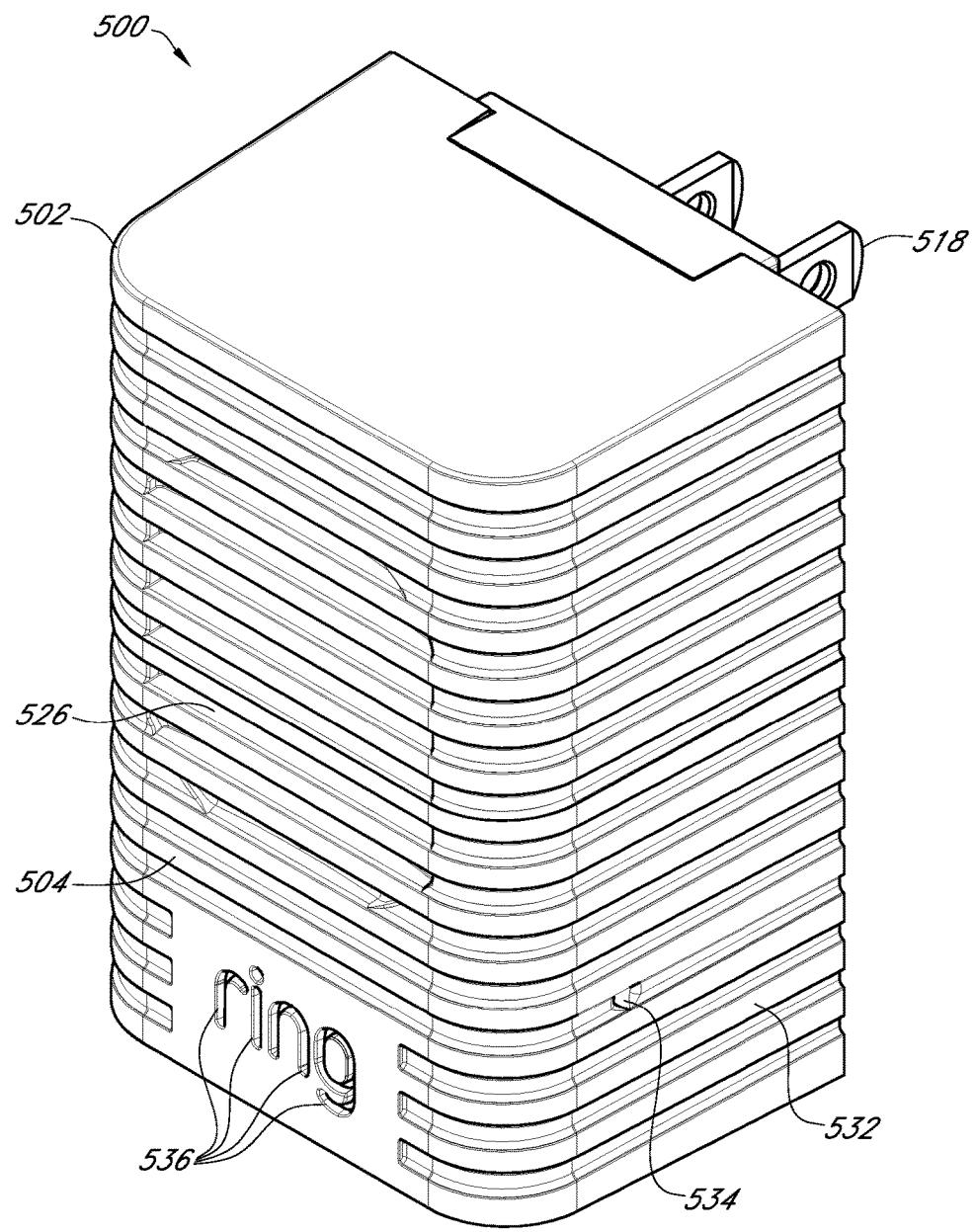
FIG. 25 is a front perspective view of a wireless speaker device for wireless A/V recording and communication devices according to the present embodiments.
Figure 26:
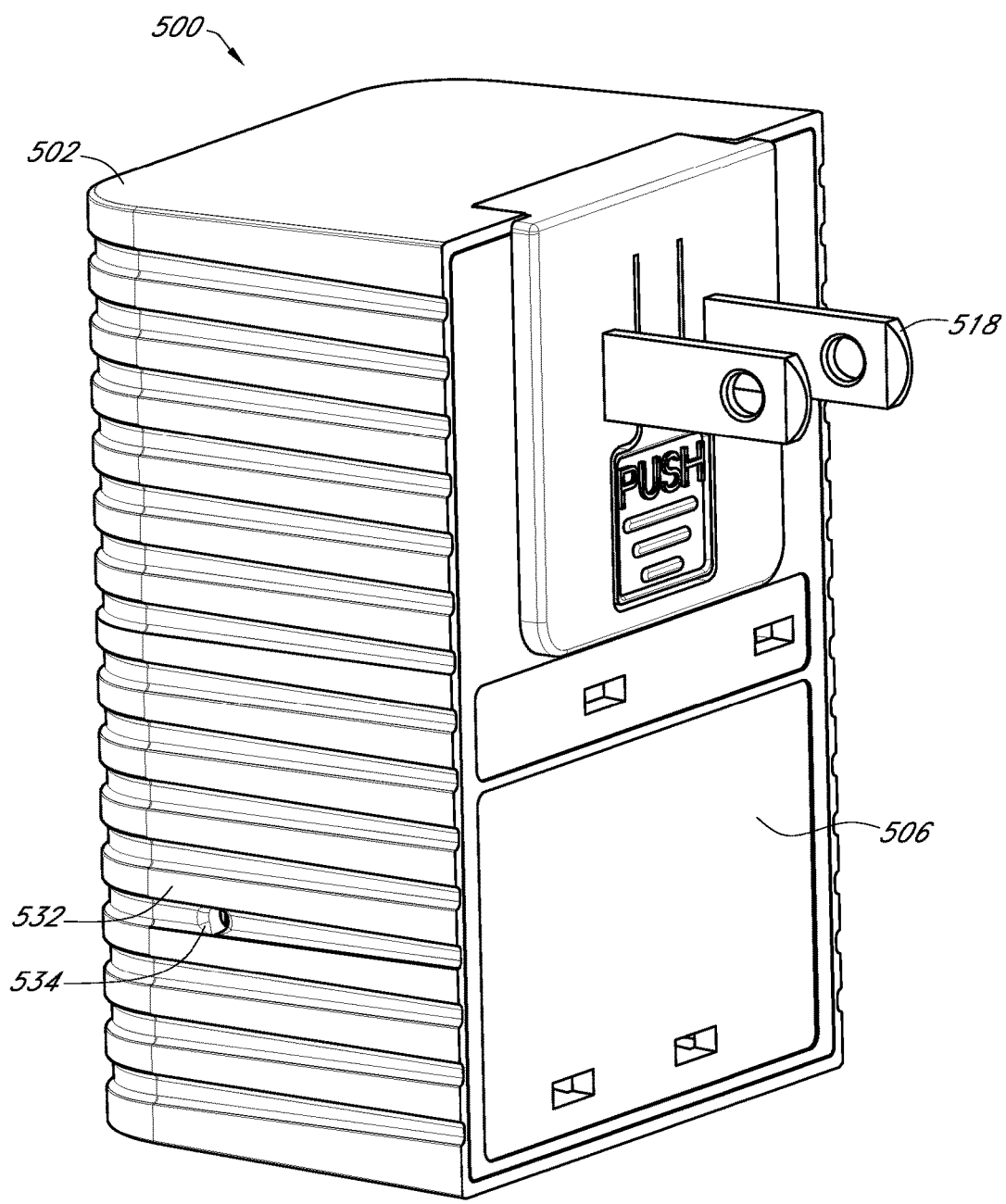
FIG. 26 is a rear perspective view of the wireless speaker device of FIG. 25.
Figure 27:
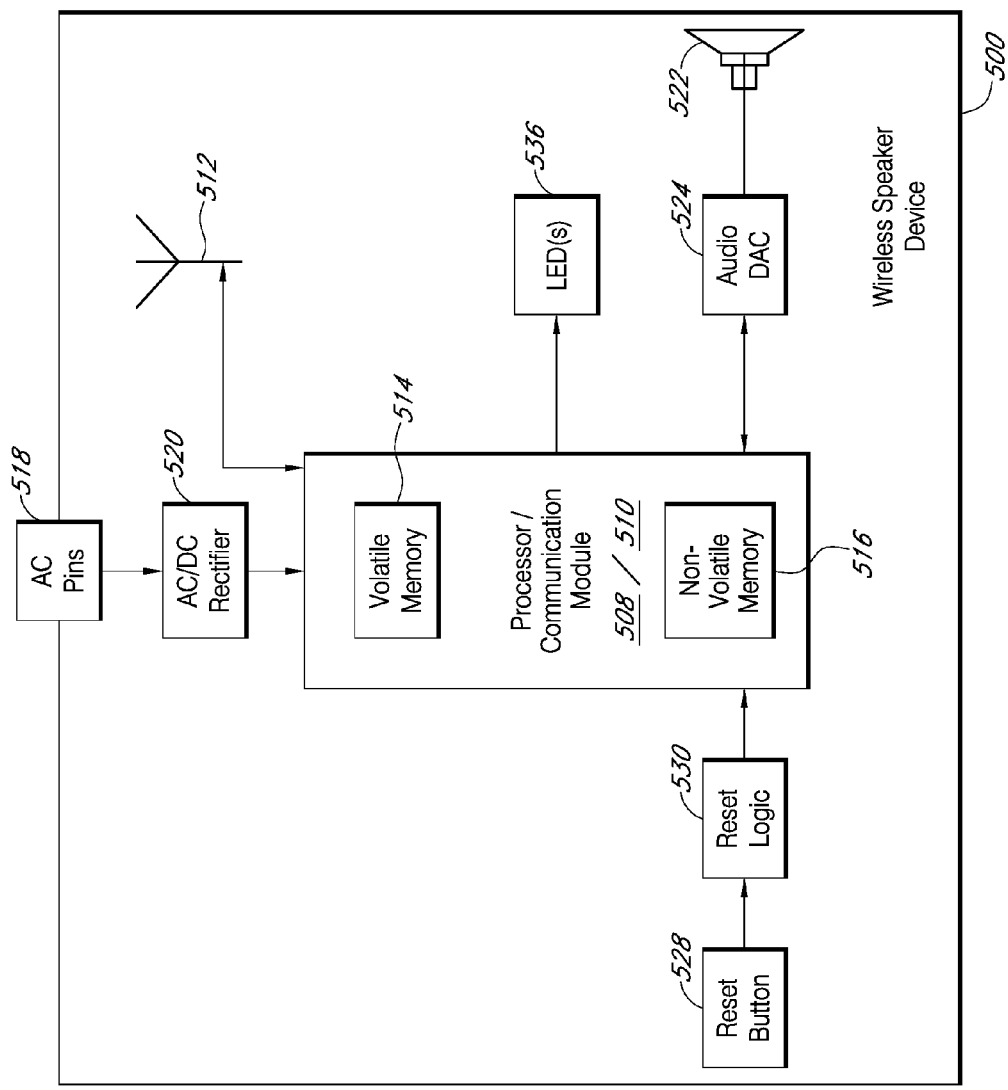
FIG. 27 is a functional block diagram of the wireless speaker device of FIGS. 23 and 24.

The system of FIG. 24 further comprises a wireless speaker device 500. FIGS. 25 and 26 are front and rear perspective views, respectively, of an example embodiment of the wireless speaker device 500, and FIG. 27 is a functional block diagram of an example embodiment of the wireless speaker device 500. With reference to FIGS. 25 and 26, the wireless speaker device 500 comprises a housing 502 having a front side 504 (FIG. 25) and a rear side 506 (FIG. 26). In the illustrated embodiment, the housing 502 is shaped substantially as a rectangular parallelepiped, but this shape is just one example and is not limiting. The housing 502 is closed on all sides and surrounds an interior space in which various components of the wireless speaker device 500 are located, as described below with reference to FIG. 27. The housing 502 may be constructed of any suitable material that is preferably durable and non-conductive (electrically), such as various types of plastics (e.g. polycarbonate, acrylonitrile butadiene styrene (ABS), polyethylene, etc.).

With reference to FIG. 27, the wireless speaker device 500 comprises a processor 508 and a communication module 510. The processor 508 and the communication module 510 are illustrated as a single component in FIG. 27, but in alternative embodiments the processor 508 and the communication module 510 may comprise separate components. The communication module 510 includes an antenna 512 and may include one or more transceivers (not shown) for sending and receiving wireless signals over the user's wireless network 110. The communication module 510 may also be configured to transmit data wirelessly to and/or receive data wirelessly from one or more devices independently of the user's wireless network 110, such as via a direct connection to another wireless device. In one example, the wireless speaker device 500 may communicate with the user's client device 114 via a Bluetooth (or other short-range wireless protocol) connection.

In alternative embodiments, the wireless speaker device 500 may be configured for a wired connection to the user's wireless network 110 and/or the network 112. For example, the wireless speaker device 500 may include one or more ports (not shown) for receiving a connector of a cable, such as an Ethernet cable. In such embodiments, the wireless speaker device 500 may connect to the router of the user's wireless network 110, or to any other network device, via the cable. In embodiments configured for receiving an Ethernet cable, the wireless speaker device 500 may be powered via Power over Ethernet (PoE), in which electrical power may be passed, along with data, via the connected Ethernet cable. In such embodiments, the AC pins 518 may be omitted. Alternatively, the wireless speaker device 500 may be powered via both the AC pins 518 and a PoE connection.

The processor 508 may perform data processing and various other functions, as described below. The processor 508 may comprise an integrated circuit including a processor core (not shown), volatile memory 514, non-volatile memory 516, and/or programmable input/output peripherals (not shown). The volatile memory 514 may comprise, for example, DDR3 (double data rate type three synchronous dynamic random-access memory). The non-volatile memory 516 may comprise, for example, NAND flash memory. In the embodiment illustrated in FIG. 27, the volatile memory 514 and the non-volatile memory 516 are illustrated within the box representing the processor 508. It is to be understood, however, that the embodiment illustrated in FIG. 27 is merely an example, and in some embodiments the volatile memory 514 and/or the non-volatile memory 516 are not necessarily physically incorporated with the processor 508. The volatile memory 514 and/or the non-volatile memory 516, regardless of their physical location, may be shared by one or more other components (in addition to the processor 508) of the present wireless speaker device 500.

With continued reference to FIG. 27, the wireless speaker device 500 further comprises a pair of AC (alternating current) pins 518, enabling the wireless speaker device 500 to be plugged into a standard wall outlet. With reference to FIG. 26, the AC pins 518 extend outward from the rear side 506 of the housing 502. With reference to FIG. 27, the wireless speaker device 500 further comprises an AC/DC rectifier 520, which converts AC mains power to DC (direct current), which is then delivered to the processor 508 for powering the wireless speaker device 500. Some embodiments may also include a DC-to-DC converter (not shown) between the rectifier 520 and the processor 508. The DC-to-DC converter may receive as an input a first voltage from the rectifier 520 and produce as an output a second voltage that is received as an input by the processor 508.

With continued reference to FIG. 27, the wireless speaker device 500 further comprises a speaker 522 operatively connected to the processor 508 through a digital-to-analog audio converter 524. With reference to FIG. 25, the front side 504 of the housing 502 includes at least one opening 526 that facilitates the passage of sound from the speaker 522 located within the housing 502 to the surrounding environment. With reference to FIG. 27, the wireless speaker device 500 further comprises a reset button 528 and reset logic 530, which enable the user to reset the processor 508 and/or the communication module 510 in the event of a malfunction. With reference to FIGS. 25 and 26, a side 532 of the housing 502 includes a small opening 534 that provides access to the reset button 528. By inserting a slender object, such as a paper clip, through the small opening 534, the user can depress the reset button 528 to initiate the reset process.

With reference to FIG. 27, the wireless speaker device 500 further comprises LEDs 536 (or another type of illumination device) operatively connected to the processor 508. With reference to FIG. 25, the LEDs 536 may be located on the front side 504 of the housing 502. The LEDs 536 provide a visual indicator to the user of the current operative state of wireless speaker device 500. For example, when the wireless speaker device 500 is plugged in to a wall outlet, the LEDs 536 may be illuminated, and when the wireless speaker device 500 sounds to alert the user to a visitor at the front door, the LEDs 536 may blink on and off according to a set pattern. Blinking or flashing of the LEDs 536 may be particularly advantageous for users who are hard of hearing, for example, and who may not hear sounds from the wireless speaker device 500 when a visitor is at the front door.

With reference to FIG. 24, the wireless A/V recording and communication doorbell system may further comprise a backend API 538 including an API 540 and a wireless speaker service 542. While FIG. 24 illustrates the backend API 538, the API 540, and the wireless speaker service 542 as components separate from the network 112, it is to be understood that the backend API 538, the API 540, and/or the wireless speaker service 542 may be considered to be components of the network 112. These components are described with reference to FIG. 28, which is a functional block diagram illustrating a system 544 for communicating among a wireless A/V recording and communication device, such as the wireless A/V recording and communication doorbell 100/130, a local area network, such as the user's wireless network 110, a wide area network, such as the network 112, and a wireless speaker device, such as the wireless speaker device 500, according to the present embodiments.

Figure 28:
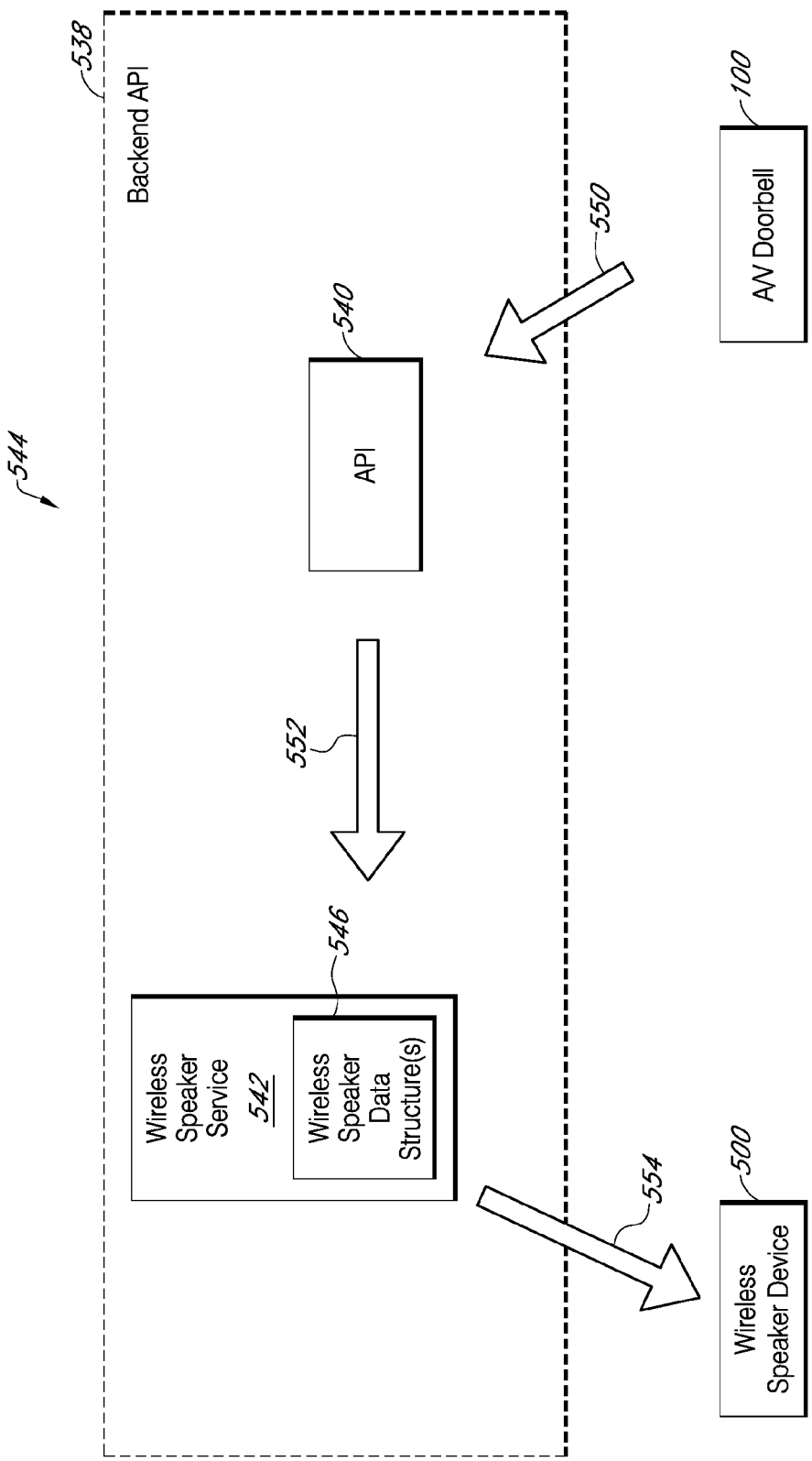
FIG. 28 is a functional block diagram illustrating a system for communicating among a wireless A/V recording and communication device, a local area network, a wide area network, and a wireless speaker device, according to the present embodiments.

The system of FIG. 28 may comprise a backend API, such as the backend API 538, including one or more components. A backend API (application programming interface) may comprise, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A backend API may, for example, comprise many such applications, each of which communicate with one another using their public APIs. In some embodiments, the API backend may hold the bulk of the user data and offer the user management capabilities, leaving the clients to have very limited state.

The backend API 538 illustrated FIG. 28 may include one or more APIs, such as the API 540. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming graphical user interface (GUI) components. For example, an API can facilitate integration of new features into existing applications (a so-called "plug-in API"). An API can also assist otherwise distinct applications with sharing data, which can help to integrate and enhance the functionalities of the applications.

The backend API 538 illustrated in FIG. 28 may further include one or more services (also referred to as network services), such as the wireless speaker service 542. A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

The backend API 538 illustrated in FIG. 28 includes a wireless speaker service, such as the wireless speaker service 542. The wireless speaker service 542 may comprise one or more wireless speaker data structures 546 storing information about a plurality of wireless speaker devices, such as the wireless speaker device 500. For example, the information may include information about each wireless speaker device and at least one associated wireless A/V recording and communication device, such as the wireless A/V recording and communication device 100. The wireless speaker service 542 may access the information in the wireless speaker data structure(s) 546 when needed to determine which wireless speaker device(s) is/are associated with a wireless A/V recording and communication device that sends a visitor detection signal 550 to the backend API 538, as further described below. The wireless speaker service 542 may also maintain the information in the wireless speaker data structure(s) 546 and update the information in the wireless speaker data structure(s) 546 when new wireless speaker devices are activated, when existing wireless speaker devices are deactivated, and/or when associations between existing wireless speaker devices and wireless A/V recording and communication devices are changed. In some embodiments, the wireless speaker service 542 may have a persistent connection with the wireless speaker device 500. A persistent connection advantageously reduces latency between the wireless speaker service 542 and the wireless speaker device 500, as further described below.

To use the present wireless speaker device 500 in connection with a wireless A/V recording and communication doorbell, the user plugs the AC pins 518 of the wireless speaker device 500 into a standard wall outlet, and then connects the wireless speaker device 500 to his or her wireless network 110 (FIG. 24). The user may then be guided through a setup process in which the wireless speaker device 500 is associated with the user's doorbell 100, and the association is stored in a data structure so that when a visitor presses the doorbell button 133 the system knows which wireless speaker device 500 to activate. For example, the setup process may include an application executing on the user's client device 114. After the wireless speaker device 500 is successfully connected to the wireless network 110, a prompt may be displayed on the user's client device 114. The prompt may request the user to select a wireless A/V recording and communication device, such as a doorbell or a security camera, to associate to the wireless speaker device 500. When the user makes a selection, the user's client device 114 may send a signal, via the wireless network 110 and the network 112, to the backend API 538, and the wireless speaker service 542 may update the information in the wireless speaker data structure(s) 546 so that the wireless speaker device 500 is associated with the user-selected wireless A/V recording and communication device. Later, when motion events and/or button-press events are initiated by the user-selected wireless A/V recording and communication device, the wireless speaker service 542 sends a signal to the associated wireless speaker device 500 and the wireless speaker device 500 emits a tone, as further described below.

The user's wireless A/V recording and communication doorbell 100 is also connected to the wireless network 110. As described in detail below, when a visitor is detected at the wireless A/V recording and communication doorbell 100, the doorbell 100 sends a signal to the API 540 (the WAN), via the wireless network 110 (the LAN). The API 540 then sends a signal to the wireless speaker service 542, which sends a signal to the wireless speaker device 500, via the LAN. The wireless speaker device 500 then emits a tone to alert any person(s) within earshot of the wireless speaker device 500 that a visitor has been detected at the wireless A/V recording and communication doorbell 100. As described above, in some embodiments, the wireless speaker service 542 may have a persistent connection with the wireless speaker device 500 A persistent connection advantageously reduces latency between the wireless speaker service 542 and the wireless speaker device 500, so that when the wireless speaker service 542 sends the tone signal 554 to the wireless speaker device 500 there is little if any delay between the tone signal 554 being sent and the wireless speaker device 500 emitting a tone from its speaker 522. For example, because of the persistent connection, there is no need for the wireless speaker device 500 to re-establish itself on the wireless speaker service 542 before the tone signal 554 can be received by the wireless speaker device 500.

Figure 29:
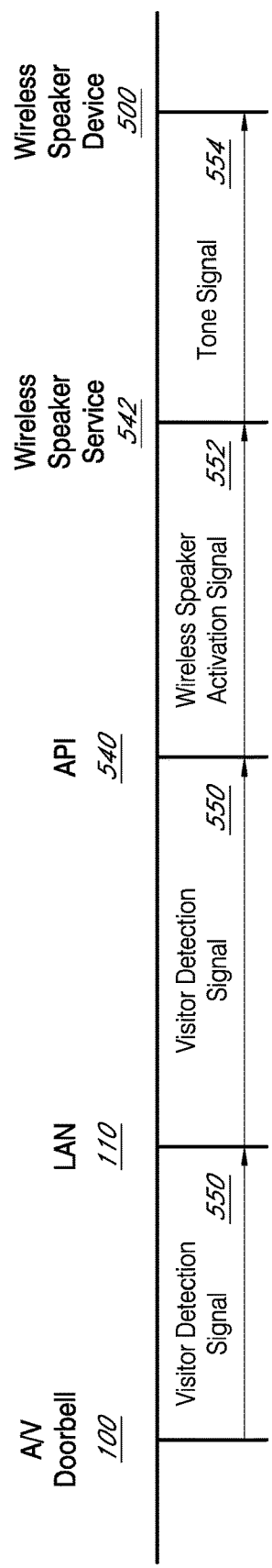
FIG. 29 is a sequence diagram illustrating one embodiment of a process for generating a visitor-announce tone in a system including a wireless A/V recording and communication device, a local area network, a wide area network, and a wireless speaker device.

In the system of FIG. 28, and with reference to FIG. 29, the wireless A/V recording and communication doorbell 100 may detect a visitor within the field of view of the doorbell 100. For example, the wireless A/V recording and communication doorbell 100 may detect the visitor's presence by detecting motion using the camera 102, 134 and/or the motion sensor(s) 144, and/or by detecting that the visitor has depressed the button 133 on the A/V recording and communication doorbell 100/130. In response to detecting the visitor, the wireless A/V recording and communication doorbell 100 may send a visitor detection signal 550 (FIG. 29) to the API 540, and the API 540 may receive the visitor detection signal 550 from the wireless A/V recording and communication doorbell 100. The visitor detection signal 550 may include information about the visitor-detection event, such as whether the visitor was detected via sensed motion or via a button press. With reference to FIGS. 24 and 29, the wireless A/V recording and communication doorbell 100 sends the visitor detection signal 550 to the API 540 via the user's wireless network 110, which may be a LAN, and the network 112, which may be a WAN.

With reference to FIGS. 28 and 29, the API 540 may transmit to the wireless speaker service 542 a wireless speaker activation signal 552 in response to receiving the visitor detection signal 550 from the wireless A/V recording and communication doorbell 100, and the wireless speaker service 542 may receive the wireless speaker activation signal 552 from the API 540. In response to receiving the wireless speaker activation signal 552 from the API 540, the wireless speaker service 542 may access the wireless speaker data structure(s) 546 and determine, based on identifying information in the wireless speaker activation signal 552, at least one wireless speaker device 500, such as the wireless speaker device 500, with which the wireless A/V recording and communication doorbell 100 that sent the visitor detection signal 550 is associated. The wireless speaker service 542 may then send a tone signal 554 to the at least one wireless speaker device 500 that was determined from the wireless speaker data structure(s) 546, and the at least one wireless speaker device 500 may receive the tone signal 554 from the wireless speaker service 542. The tone signal 554 includes a command to the at least one wireless speaker device 500 to emit a tone from the speaker 522 of the at least one wireless speaker device 500. Thus, in response to receiving the tone signal 554 from the wireless speaker service 542, the at least one wireless speaker device 500 may emit a tone from its speaker 522 to notify any person(s) within earshot of the speaker 522 that a visitor has been detected at the wireless A/V recording and communication doorbell 100.

As described above, in some embodiments the wireless speaker service 542 may have a persistent connection with the wireless speaker device 500. A persistent connection advantageously reduces latency between the wireless speaker service 542 and the wireless speaker device 500, so that when the wireless speaker service 542 sends the tone signal 554 to the wireless speaker device 500 there is little if any delay between the tone signal 554 being sent and the wireless speaker device 500 emitting a tone from its speaker 522. For example, because of the persistent connection, there is no need for the wireless speaker device 500 to re-establish itself on the wireless speaker service 542 before the tone signal 554 can be received by the wireless speaker device 500.

As described above, the present embodiments advantageously provide a wireless speaker device configured for use with a wireless A/V recording and communication device, such as a doorbell. The wireless speaker device, which includes a speaker, may plug into a standard wall outlet and connect to the user's local area network (LAN), such as a Wi-Fi network. The LAN is connected to a wide area network (WAN), such as the Internet and/or a public switched telephone network (PSTN). When the wireless A/V recording and communication device detects a visitor, it sends a signal, via the LAN, to at least one device in the WAN, such as a server and/or a service. In response, the at least one device in the WAN sends a signal, via the LAN, to the wireless speaker device. The signal to the wireless speaker device includes a command for the wireless speaker device to emit a tone through its speaker. The wireless speaker device then emits a tone through its speaker to alert the user that a visitor is at the wireless A/V recording and communication device.

In some embodiments, the wireless speaker activation signal 552 and/or the tone signal 554 may include information about a type of tone to be emitted by the speaker 522 of the wireless speaker device 500. For example, the type of tone may depend on the type of visitor detection that initiated the process. If the visitor was detected via motion, a first type of tone may be emitted by the speaker 522, and the wireless speaker activation signal 552 and/or the tone signal 554 may include a command to the wireless speaker device 500 to emit the first type of tone. If the visitor was detected via a button press, a second type of tone may be emitted by the speaker 522, and the wireless speaker activation signal 552 and/or the tone signal 554 may include a command to the wireless speaker device 500 to emit the second type of tone. Tones of various types may be stored at the non-volatile memory 516 of the wireless speaker device 500. Any number of different tones may be stored at the wireless speaker device 500. The first and second types described above are merely non-limiting examples.

In some embodiments, the tone emitted by the speaker 522 of the wireless speaker device 500 may be configurable by the user. For example, an application executing on the user's client device 114 may display a menu from which the user may select from a plurality of different tones. The tones may be stored on the wireless speaker device 500 at the point of manufacture. Alternatively, or in addition, tones may be downloaded to and stored on the wireless speaker device 500, such as at the non-volatile memory 516. For example, the user may access tones stored at one or more servers in the network 112, such as at the backend API 538, using the client device 114. The user may select one or more tones from the network 112 and download them to the wireless speaker device 500 via the wireless network 110 and the processor/communication module 508/510. Alternatively, or in addition, the user may transfer tones from the client device 114 to the wireless speaker device 500 via the wireless network 110 and the processor/communication module 508/510.

In some embodiments, the tone emitted by the speaker 522 of the wireless speaker device 500 may vary depending on which one of a plurality of different wireless A/V recording and communication devices generated the visitor detection signal 550. For example, the wireless speaker device 500 may be associated with more than one wireless A/V recording and communication device. Then, the wireless speaker device 500 may emit a first type of tone when the visitor detection signal 550 is generated by a first wireless A/V recording and communication device associated with the wireless speaker device 500, and the wireless speaker device 500 may emit a second type of tone when the visitor detection signal 550 is generated by a second wireless A/V recording and communication device associated with the wireless speaker device 500. The wireless speaker device 500 may be associated with any number of wireless A/V recording and communication devices. The first and second associated wireless A/V recording and communication devices described above are merely non-limiting examples.

In alternative embodiments, the wireless speaker device 500 may include a motion sensor (not shown). When the motion sensor of the wireless speaker device 500 detects motion, the wireless speaker device 500 may send a signal to the backend API 538. The signal may be similar to the visitor detection signal 550 described above. In response to receiving the signal from the wireless speaker device 500, the backend API 538 may send a signal to one or more connected devices to alert a user that motion was detected by the wireless speaker device 500. For example, the backend API 538 may send a signal to the user's client device 114.

In alternative embodiments, the wireless speaker device 500 may include a microphone (not shown). In such embodiments, the user may communicate with the visitor through the wireless speaker device 500 and the wireless A/V recording and communication device, using the microphone and the speaker 522 of the wireless speaker device 500.

In some embodiments, the wireless speaker device 500 may be capable of playing streaming audio from another wireless device. For example, the wireless speaker device 500 may receive a wireless audio signal from the user's client device 114 via a Bluetooth connection, and the wireless speaker device 500 may play the audio via the speaker 522.

Figure 30:
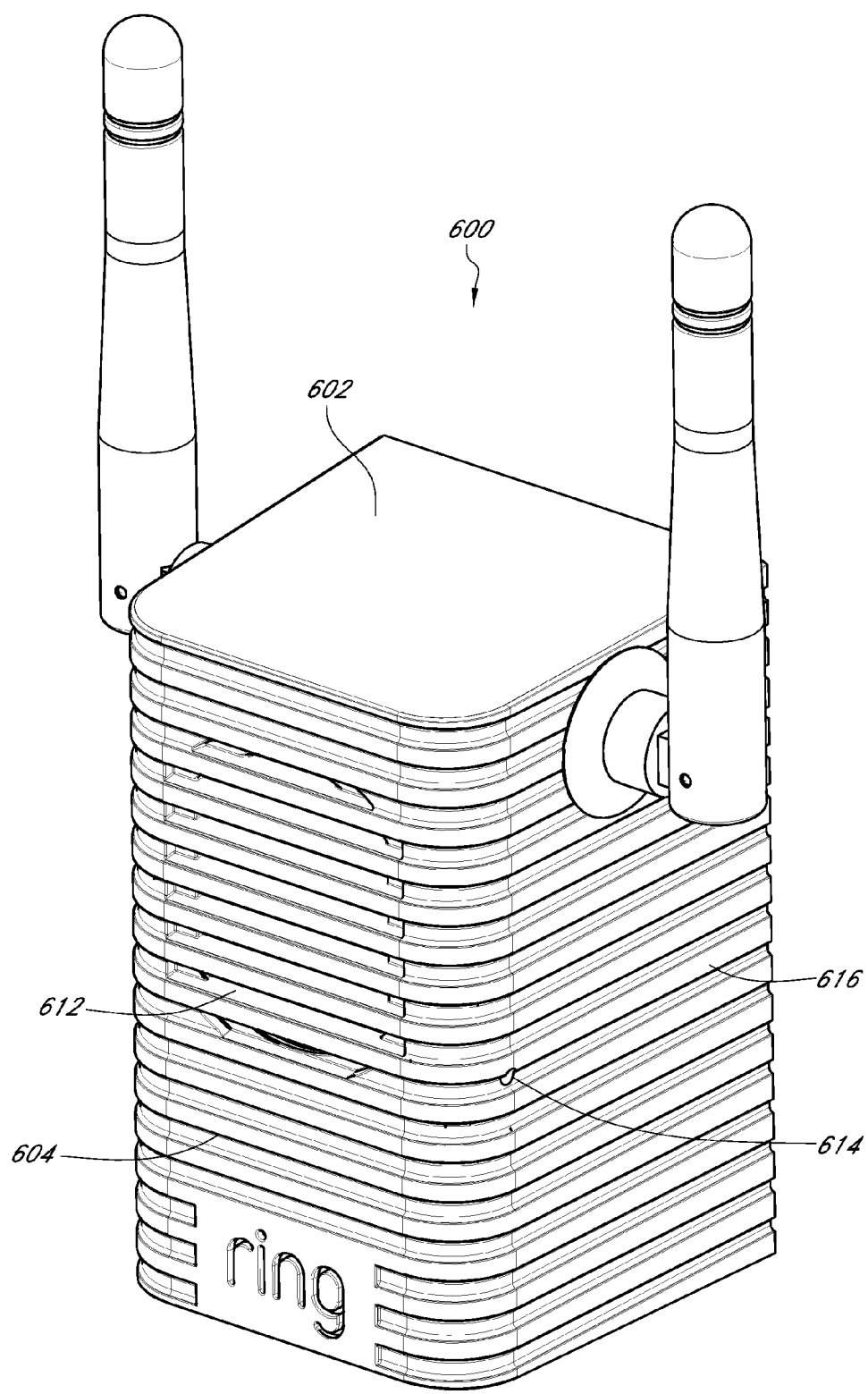
FIG. 30 is a front perspective view of another embodiment of a wireless speaker device for wireless A/V recording and communication devices according to the present disclosure.
Figure 31:
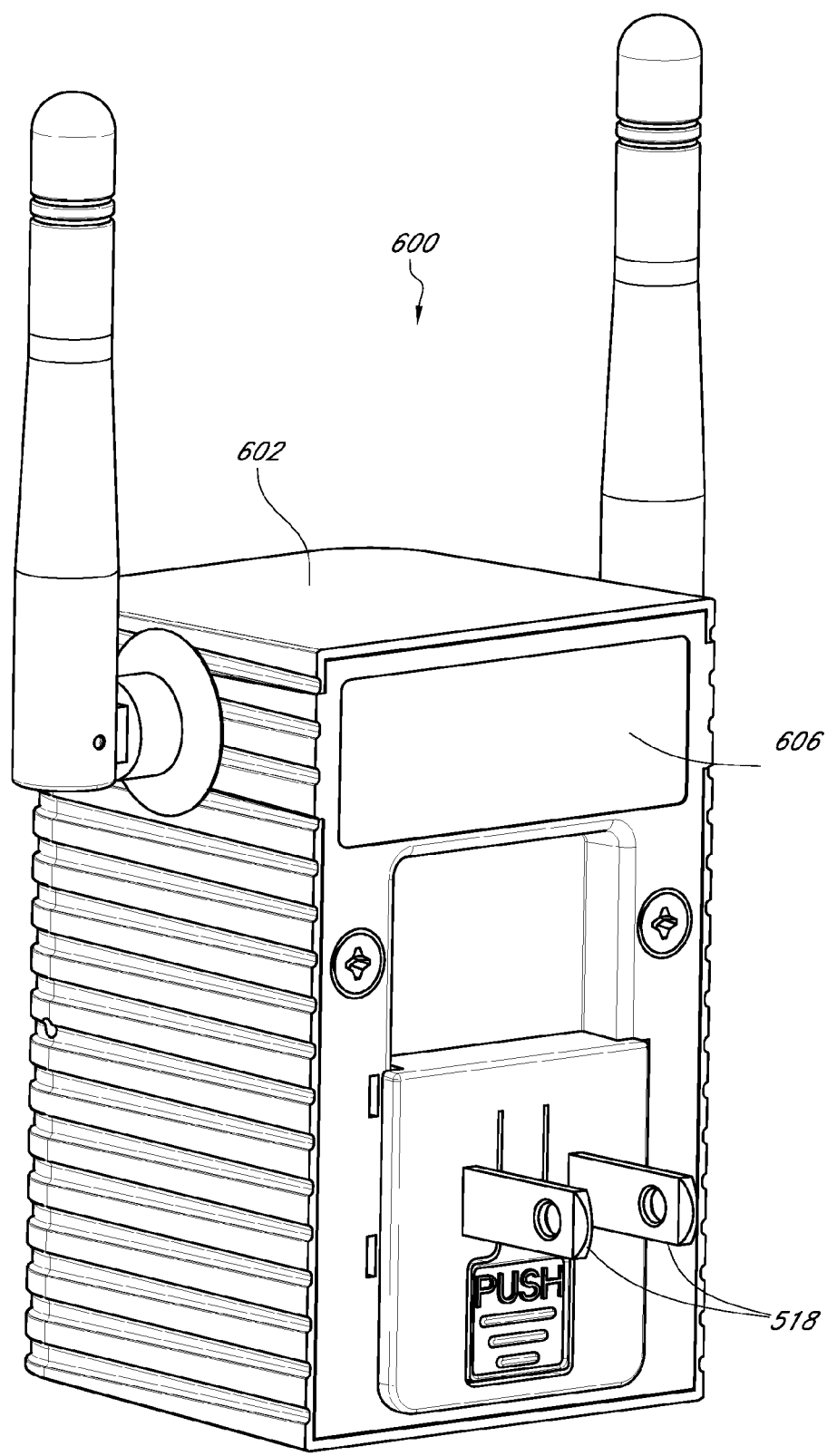
FIG. 31 is a rear perspective view of the wireless speaker device of FIG. 30.
Figure 32:
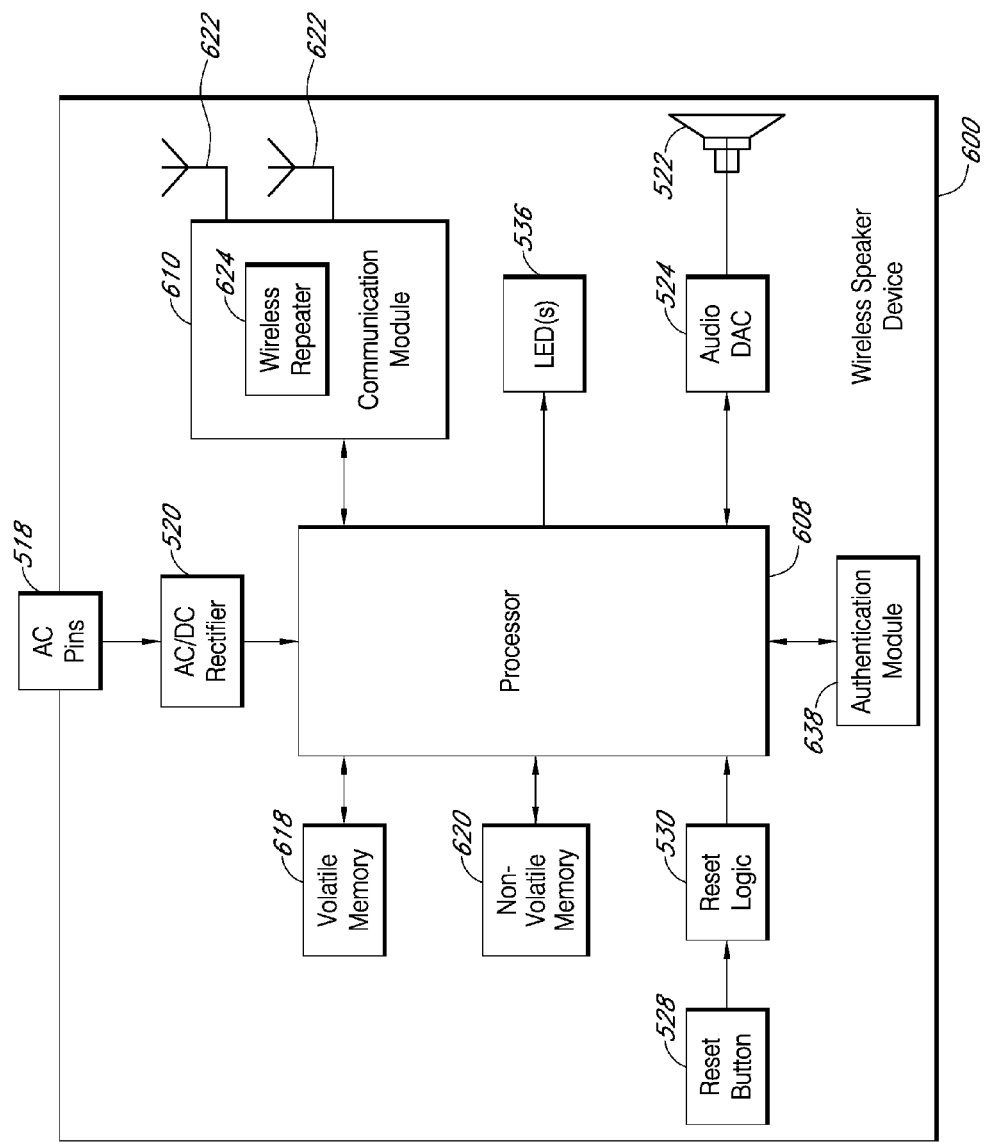
FIG. 32 is a functional block diagram of the wireless speaker device of FIGS. 30 and 31.

FIGS. 30 and 31 are front and rear perspective views, respectively, of another example embodiment of a wireless speaker device 600, and FIG. 32 is a functional block diagram of the wireless speaker device 600 of FIGS. 30 and 31. The wireless speaker device 600 of FIGS. 30-32 includes several components that are similar in structure and/or function to the corresponding components of FIGS. 25-27 including, with reference to FIGS. 30-32, a housing 602 having a front side 604 (FIG. 30) and a rear side 606 (FIG. 31), a processor 608 (FIG. 32), a communication module 610, a pair of AC (alternating current) pins 518, an AC/DC rectifier 520, a speaker 522, a digital-to-analog audio converter 524, at least one opening 612 in the front side 604 of the housing 602 that facilitates the passage of sound from the speaker 522 located within the housing 602 to the surrounding environment, a reset button 528, reset logic 530, a small opening 614 in a side 616 of the housing 602 that provides access to the reset button 528, and LEDs 536. Again, many of these components are similar in structure and/or function to the components of FIGS. 25-27. Accordingly, the description below focuses on the aspects of these components that are different from the components of FIGS. 25-27.

In contrast to the embodiment shown in FIG. 27, in the embodiment shown in FIG. 32 the processor 608 and the communication module 610 are illustrated as separate components, and the volatile memory 618 and the non-volatile memory 620 are illustrated separately from both the processor 608 and the communication module 610. The communication module 610 includes first and second antennas 622 (also shown in FIGS. 30 and 31), and may include one or more transceivers (not shown), for sending and receiving wireless signals over the user's wireless network 110. The communication module 610 may also be configured to transmit data wirelessly to and/or receive data wirelessly from one or more devices independently of the user's wireless network 110, such as via a direct connection to another wireless device. In one example, the wireless speaker device 600 may communicate with another wireless device, such as the user's client device 114, via a Bluetooth (or other short-range wireless protocol) connection, depending upon the proximity of the wireless speaker device 600 to the other wireless device. The communication module 610 may thus include component(s), such as one or more chips (integrated circuits), enabling the wireless speaker device 600 to communicate wirelessly through various data transmission protocols, such as Wi-Fi (IEEE 802.11), Bluetooth, ZigBee (IEEE 802.15.4), or any other protocol.

In alternative embodiments, the wireless speaker device 600 may be configured for a wired connection to the user's wireless network 110 and/or the network 112. For example, the wireless speaker device 600 may include one or more ports (not shown) for receiving a connector of a cable, such as an Ethernet cable. In such embodiments, the wireless speaker device 600 may connect to the router of the user's wireless network 110, or to any other network device, via the cable. In embodiments configured for receiving an Ethernet cable, the wireless speaker device 600 may be powered via Power over Ethernet (PoE), in which electrical power may be passed, along with data, via the connected Ethernet cable. In such embodiments, the AC pins 518 may be omitted. Alternatively, the wireless speaker device 600 may be powered via both the AC pins 518 and a PoE connection.

With further reference to FIG. 32, the processor 608 may perform data processing and various other functions, as described below. The processor 608 may comprise an integrated circuit including a processor core (not shown) and/or programmable input/output peripherals (not shown). The processor 608 may access volatile memory 618 and/or non-volatile memory 620. The volatile memory 618 may comprise, for example, DDR3 (double data rate type three synchronous dynamic random-access memory). The non-volatile memory 620 may comprise, for example, NAND flash memory. In the embodiment illustrated in FIG. 32, the volatile memory 618 and the non-volatile memory 620 are illustrated as components separate from the processor 608. It is to be understood, however, that the embodiment illustrated in FIG. 32 is merely an example, and in some embodiments the volatile memory 618 and/or the non-volatile memory 620 are not necessarily physically separated from the processor 608. The volatile memory 618 and/or the non-volatile memory 620, regardless of their physical location, may be shared by one or more other components (in addition to the processor 608) of the present wireless speaker device 600.

With continued reference to FIG. 32, the communication module 610 of the wireless speaker device 600 may further comprise a wireless repeater 624 (may also be referred to as a wireless range extender). The wireless repeater 624 is configured to receive a wireless signal from a wireless router (or another network device) in the user's wireless network 110 and rebroadcast the signal. Wireless devices that are not within the broadcast range of the wireless router, or that only weakly receive the wireless signal from the wireless router, may receive the rebroadcast signal from the wireless speaker device 600, and may thus connect to the user's wireless network 110 through the wireless speaker device 600. In some embodiments, the wireless repeater 624 may include one or more transceiver modules (not shown) capable of transmitting and receiving data, and using, for example, one or more protocols and/or technologies, such as Wi-Fi (IEEE 802.11), WiMAX (IEEE 802.16), or any other protocol and/or technology.

As described above, the communication module 610 includes first and second antennas 622 (FIGS. 30-32), and may include one or more transceivers (not shown), for sending and receiving wireless signals. The first and second antennas 622 enable the wireless speaker device 600 to communicate wirelessly via multiple-input and multiple-output (MIMO). MIMO is a technique for multiplying the capacity of a radio link using multiple transmit and receive antennas to exploit multipath propagation. As shown in FIGS. 31 and 32, the first and second antennas 622 may extend from opposite sides of the housing 602 of the wireless speaker device 600. The illustrated configuration is, however, just one example and is not limiting. The first and second antennas 622 may be fixed or movable with respect to the housing 602. For example, the first and second antennas 622 may be pivotable about an axis that extends through the housing 602 perpendicularly to both antennas 622.

The communication module 610 may also be configured to transmit data wirelessly to and/or receive data wirelessly from one or more devices independently of the user's wireless network 110, such as via a direct wireless connection to another wireless device. In one example, the wireless speaker device 600 may communicate with another wireless device, such as the user's client device 114, via a Bluetooth (or other short-range wireless protocol) connection, depending upon the proximity of the wireless speaker device 600 to the other wireless device. The communication module 610 may thus include one or more module(s) or component(s), such as one or more chips (integrated circuits), enabling the wireless speaker device 600 to communicate wirelessly through various data transmission protocols, such as Wi-Fi (IEEE 802.11), Bluetooth, ZigBee (IEEE 802.15.4), or any other protocol.

In various embodiments, the wireless speaker device 600 may be used to wirelessly control one or more other wireless devices. A non-exhaustive and non-limiting list of example wirelessly controllable devices includes: electronic locks, alarms, alarm monitoring systems, security systems, garage door openers, electric gates, automated security gates, televisions, cameras, video streaming devices, video recording and video receiving devices, digital video recorders, digital video streaming devices, wireless enabled electric plug outlets, lighting systems, lights, light sensors and switches, light switches, lighting control panels, light bulbs, fixtures for light bulbs, or any other type of wirelessly controllable device or component.

Figure 33:
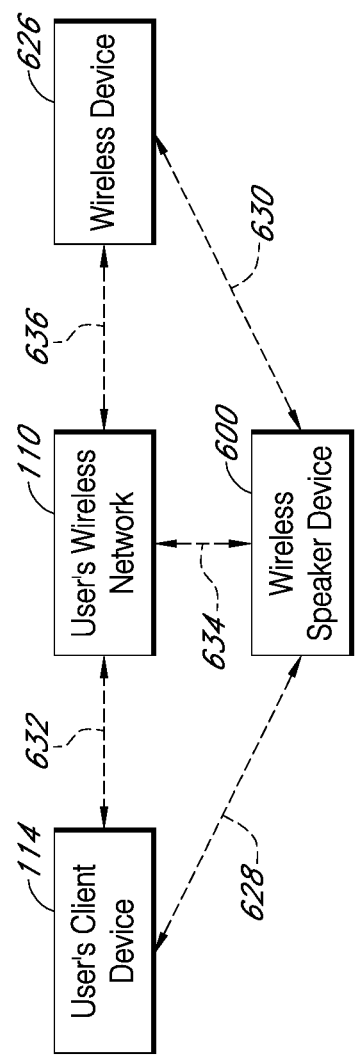
FIG. 33 is a functional block diagram illustrating a system including a wireless speaker device for wireless A/V recording and communication devices according to the present embodiments.

In various embodiments, other devices may be wirelessly controlled through the wireless speaker device 600 with signals sent over the user's wireless network 110, or with signals sent directly between the wireless speaker device 600 and one or more other wireless devices, or with any combination of such signals. For example, with reference to FIG. 33, an application executing on the user's client device 114 may enable the user to control another wireless device 626 with signals sent between the user's client device 114 and the other wireless device 626 via the wireless speaker device 600. In one example, the user's client device 114 and the wireless speaker device 600 may send signals 628 directly to one another, such as through a Bluetooth connection (or another wireless technology standard for exchanging data over short distances between devices in close proximity to one another), and the wireless speaker device 600 and the other wireless device 626 may send signals 630 directly to one another, such as through a Bluetooth connection (or another wireless technology standard for exchanging data over short distances between devices in close proximity to one another). In another example, the user's client device 114 and the wireless speaker device 600 may send signals 632, 634 to one another via the user's wireless network 110, such as a Wi-Fi network (or another wireless technology standard), and the wireless speaker device 600 and the other wireless device 626 may send signals 636, 634 to one another via the user's wireless network 110. In yet another example, the user's client device 114, the wireless speaker device 600, and the other wireless device 626 may send signals to one another via a mix of these signals 628, 630, 632, 634, 636. For example, the user's client device 114 and the wireless speaker device 600 may communicate directly with one another via signals 628 while the wireless speaker device 600 and the other wireless device 626 may communicate with one another via signals 634, 636 sent over the user's wireless network 110. Alternatively, the user's client device 114 and the wireless speaker device 600 may communicate with one another via signals 632, 634 sent over the user's wireless network 110 while the wireless speaker device 600 and the other wireless device 626 may communicate directly with one another via signals 630.

With reference to FIG. 32, the wireless speaker device 600 may further comprise one or more authentication modules 638. The authentication module 638 may comprise an integrated circuit configured to authenticate functionality between the wireless speaker device 600 and one or more other electronic devices. In one non-limiting example, the authentication module 638 may comprise an Mfi ("Made for iPhone/iPod/iPad") chip configured to authenticate functionality between the wireless speaker device 600 and one or more other electronic devices made by Apple Inc.

Figure 34:
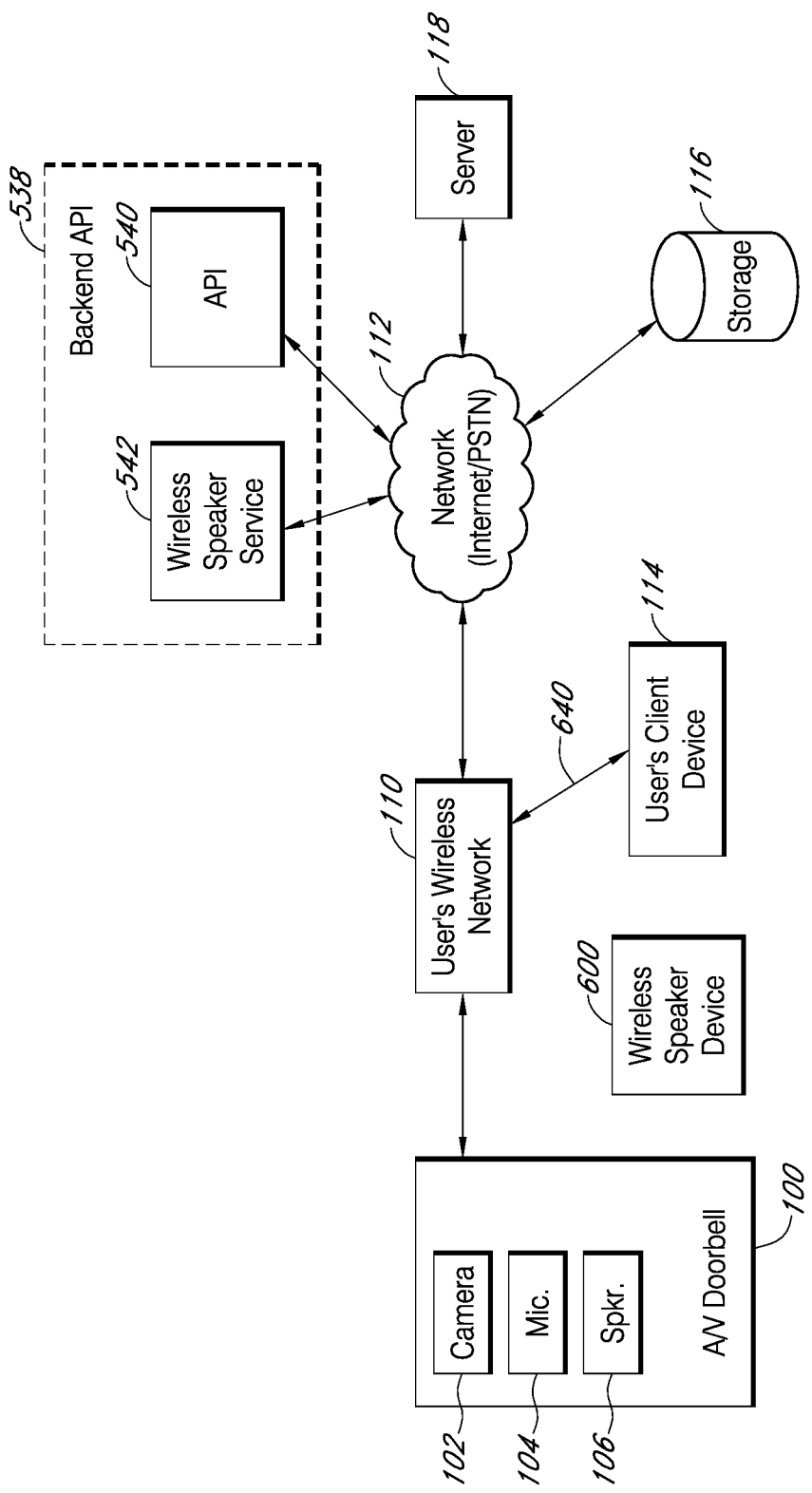
FIGS. 34-37 are functional block diagrams illustrating embodiments of processes for connecting the present wireless speaker device to a wireless network and for connecting one or more wireless devices to the present wireless speaker device according to the present disclosure.

FIGS. 34-37 illustrate embodiments of processes for connecting the present wireless speaker device 600 to a wireless network and for connecting one or more wireless devices to the present wireless speaker device 600 according to the present disclosure. With reference to FIG. 34, the user's client device 114 may initially be connected to the user's wireless network 110 (as indicated by the double-headed arrow 640), while the wireless speaker device 600 is not connected to any other device or network, and may be powered off. In some embodiments, a process for connecting the wireless speaker device 600 to the user's wireless network 110 may be facilitated by an application executing on the user's client device 114. While other processes for connecting the wireless speaker device 600 to the user's wireless network 110 may not involve an application executing on the user's client device 114, for clarity the following description will reference such an application.

The application executing on the user's client device 114 may prompt the user to power on the wireless speaker device 600. Subsequently, the wireless speaker device 600 may be powered on, such as by plugging the AC pins 518 into a standard wall outlet. The wireless speaker device 600 may then be in AP (access point) mode, in which it broadcasts a wireless provisioning beacon. The provisioning beacon is a broadcast wireless signal that indicates to other wireless devices that the wireless speaker device 600 is a wireless access point. The provisioning beacon includes identifying information, such as an SSID (Service Set Identifier). The provisioning beacon may also indicate that the security of the wireless access point is open (no password required to connect to the wireless access point).

Figure 35:
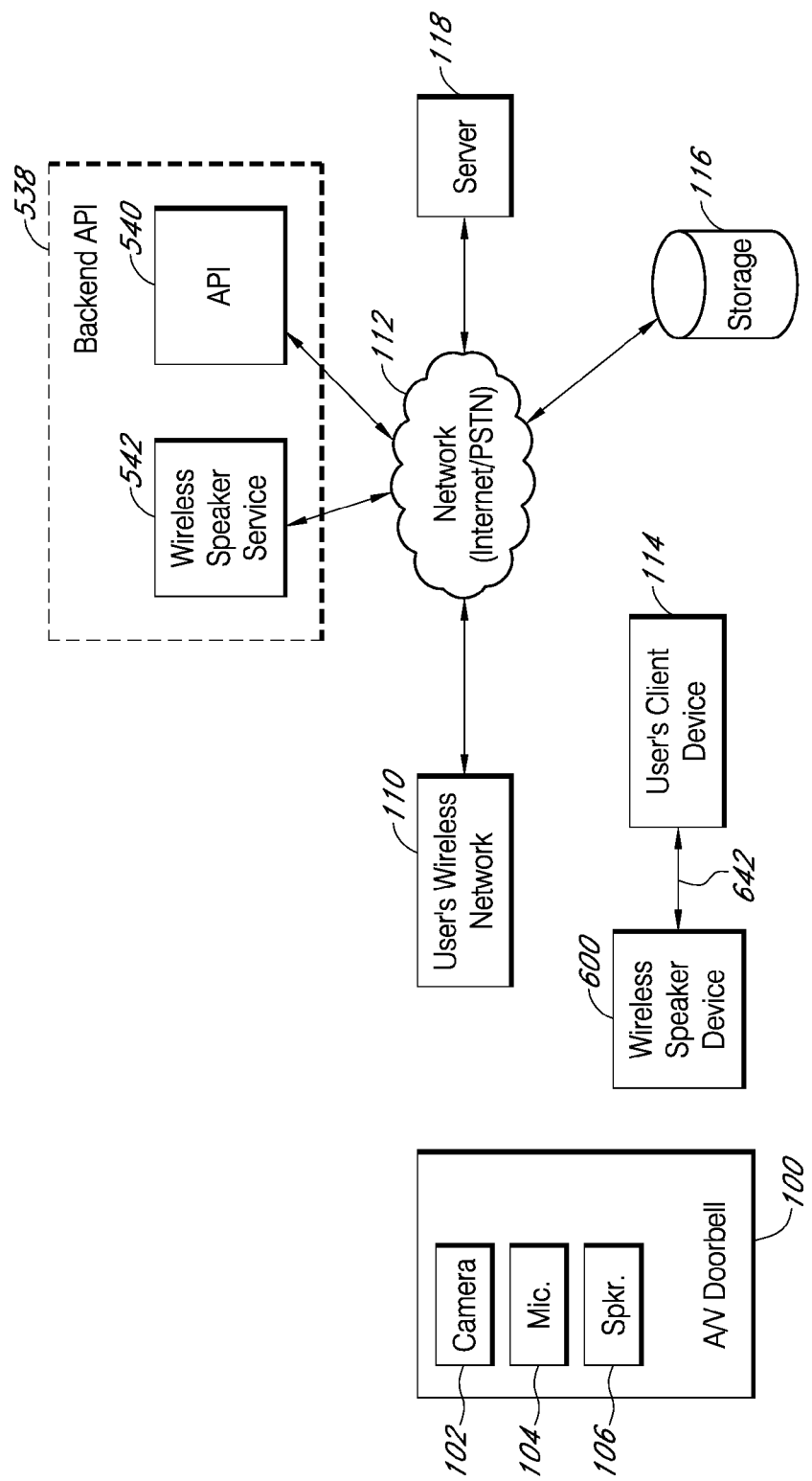

The application executing on the user's client device 114 may prompt the user to exit the application, disconnect the user's client device 114 from the user's wireless network 110, and connect the user's client device 114 to the wireless access point of the wireless speaker device 600. With reference to FIG. 35, the user's client device 114 may then disconnect from the user's wireless network 110 and connect to the wireless access point of the wireless speaker device 600 (as indicated by the double-headed arrow 642). The user's client device 114 may then transmit to the wireless speaker device 600 credentials for a network device, such as a wireless router, in the user's wireless network 110. Because the user's client device 114 was previously connected to the user's wireless network 110, it may have stored in its memory (or storage) credentials for the wireless router (or another network device). The credentials for the network device may include an identifier for the network device, such as an SSID, and/or a password if a password is required to connect to the network device.

Figure 36:
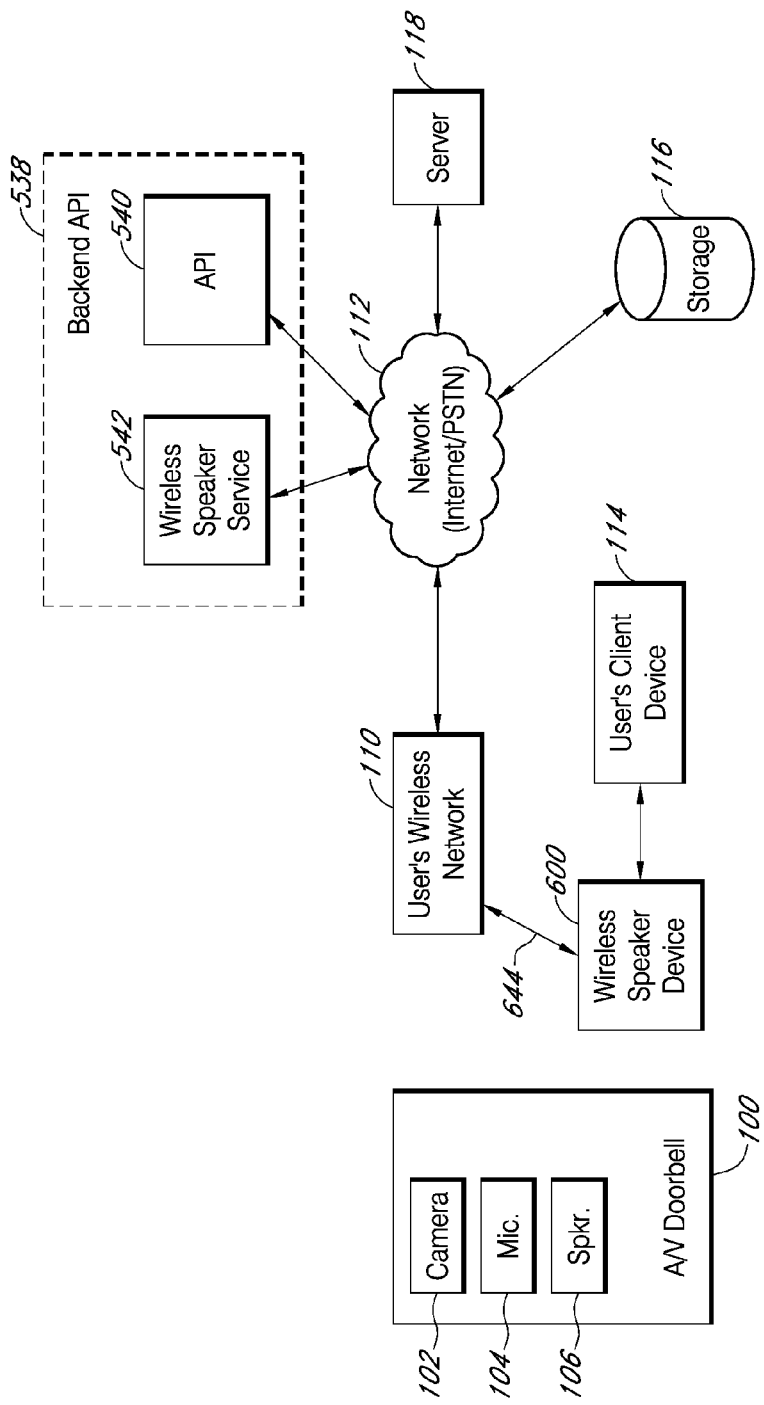

With reference to FIG. 36, the wireless speaker device 600 may then connect to the network device in the user's wireless network 110 (as indicated by the double-headed arrow 644) using the credentials provided by the user's client device 114. The wireless speaker device 600 may then communicate with the backend API 538 via the user's wireless network 110 and/or the network 112. The backend API 538 may generate credentials for the wireless speaker device 600, and transmit the generated credentials to the wireless speaker device 600. The credentials may facilitate the wireless speaker device 600 operating as a wireless repeater 624 (and wireless access point) after the provisioning beacon is disabled, as described below. The credentials for the wireless speaker device 600 may include an identifier for the wireless speaker device 600, such as an SSID, and/or a password that other devices will be required to provide to connect to the wireless speaker device 600 after the wireless speaker device 600 transitions to repeater mode, as described below. The password may comprise any suitable security protocol, such as Wi-Fi Protected Access (WPA), Wi-Fi Protected Access II (WPA2), Wired Equivalent Privacy (WEP), or any other security protocol.

Figure 37:
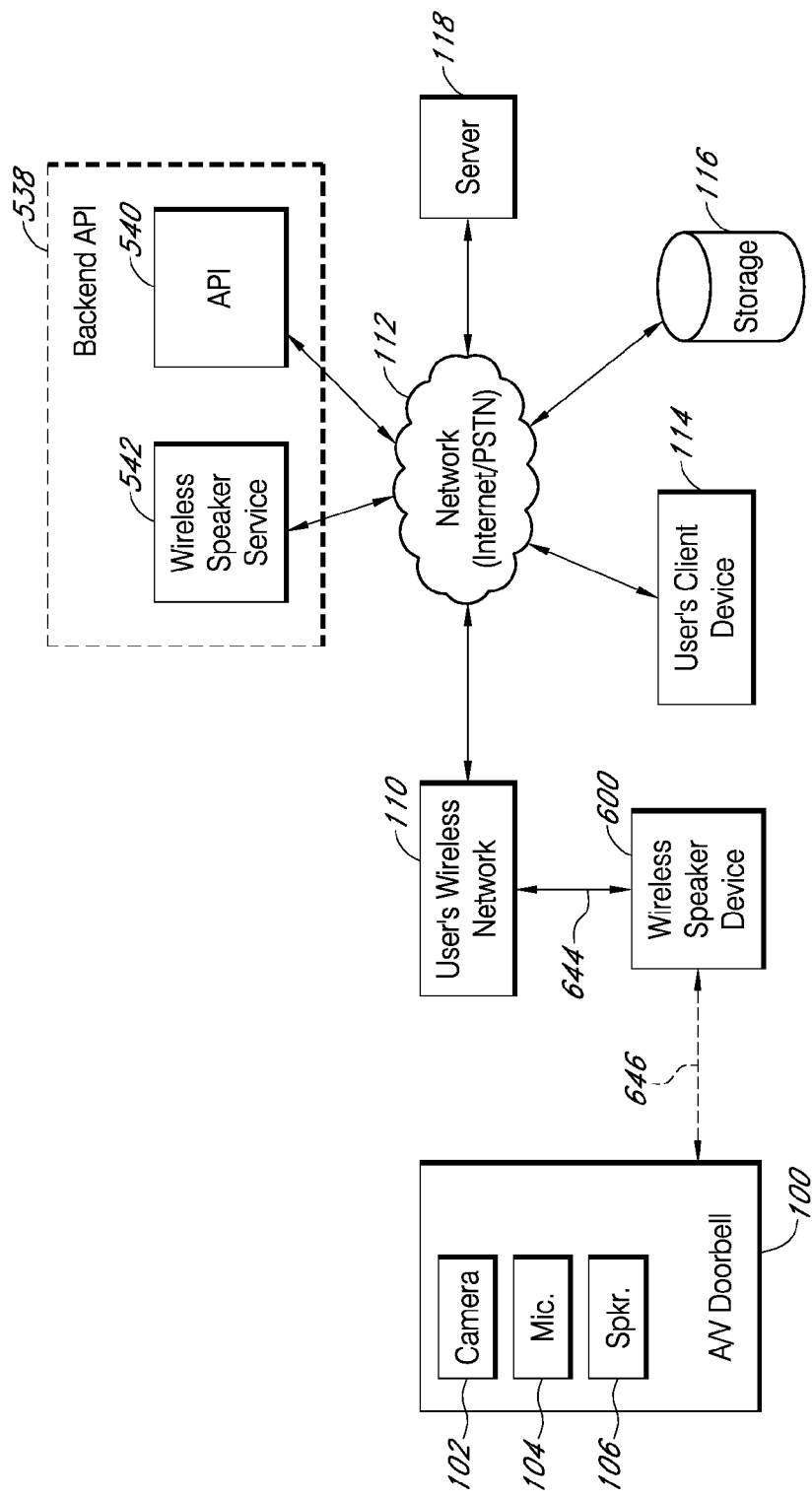

After the wireless speaker device 600 receives credentials from the backend API 538, the wireless speaker device 600 may disable the provisioning beacon and transition to repeater mode. With reference to FIG. 37, in repeater mode, the wireless speaker device 600 is connected to the wireless access point (e.g., router) in the user's wireless network 110 (as indicated by the double-headed arrow 644), and also provides a wireless access point for other wireless devices. In this configuration, the wireless speaker device 600 may maintain a station (may also be referred to as a wireless client or a node) connection with the wireless access point (e.g., router) in the user's wireless network 110, and also provide a wireless access point for other wireless devices. For example, as shown in FIG. 37, the wireless A/V recording and communication doorbell 100 may connect to the wireless access point provided by the wireless speaker device 600 (as indicated by the dashed double-headed arrow 646). The wireless A/V recording and communication doorbell 100 may connect to the user's wireless network 110 via the wireless speaker device 600 if, for example, the wireless speaker device 600 provides a stronger signal to the wireless A/V recording and communication doorbell 100 as compared to the signal provided by the wireless access point (e.g., router) in the user's wireless network 110. In repeater mode, the wireless speaker device 600 may periodically broadcast beacon frames to announce the presence of the wireless access point provided by the wireless speaker device 600.

As described above, the backend API 538 may generate credentials for the wireless speaker device 600 and transmit the generated credentials to the wireless speaker device 600. In some embodiments, the identifier (e.g., SSID) generated for the wireless speaker device 600 may be unique for each user, which could advantageously prevent neighboring users from using each other's bandwidth. In some embodiments, though, multiple wireless speaker devices 600 belonging to the same user may receive the same (or similar) credentials. Thus, if a given user has more than one wireless speaker device 600, the backend API 538 may recognize that the user has more than one wireless speaker device 600 and may generate credentials for the newly connected wireless speaker device 600 that are similar in one or more respects to the credentials of the user's existing wireless speaker device(s) 600. For example, if two or more wireless speaker devices 600 have the same identifier and/or password, then the wireless speaker devices 600 may form a roaming network in which the two or more wireless speaker devices 600 provide multiple wireless access points having the same (or similar) credentials. In a roaming network, wireless devices may connect to any of the wireless access points that have the same (or similar) credentials, so that a given wireless device may, for example, connect to whichever wireless access point provides the strongest signal to that wireless device at its current location. If the wireless device moves from a first location to a second location, and a first wireless access point provides the strongest signal at the first location, but a second wireless access point provides the strongest signal at the second location, the wireless device may easily switch from the first wireless access point to the second wireless access point without any need for user intervention, because the first and second wireless access points have the same (or similar) credentials. The roaming network thus enables each wireless device to enjoy the best available wireless signal at any given location in the roaming network, and to easily transition from one wireless access point to another as one or more conditions, such as the location of the wireless device, change.

In some embodiments, the roaming network may not include the wireless access point (e.g., router) in the user's wireless network 110, at least because the wireless access point (e.g., router) in the user's wireless network 110 may have a different identifier (e.g., SSID) and/or password than the wireless speaker device(s) 600 in the roaming network. In some embodiments, however, the wireless access point (e.g., router) in the user's wireless network 110 may be available to wireless devices as an alternate wireless access point. For example, the credentials of the wireless access point (e.g., router) in the user's wireless network 110, if different from the credentials of the wireless speaker device(s) 600 in the roaming network, may be provided to the wireless devices that connect to the roaming network. In such embodiments, the wireless access point (e.g., router) in the user's wireless network 110 may be available to such wireless devices as an alternate access point in the event the access point(s) of the wireless speaker device(s) 600 is/are not available.

In some embodiments, the identifier generated for the wireless speaker device 600 may be a function of an identifier (e.g., SSID) associated with the wireless access point (e.g., router) in the user's wireless network 110 to which the wireless speaker device 600 is connected. For example, the identifier generated for the wireless speaker device 600 may be the same as the identifier (e.g., SSID) associated with the wireless access point (e.g., router) in the user's wireless network 110 to which the wireless speaker device 600 is connected. In another example, the identifier generated for the wireless speaker device 600 may be similar to, but not the same as, the identifier (e.g., SSID) associated with the wireless access point (e.g., router) in the user's wireless network 110 to which the wireless speaker device 600 is connected. In such embodiments, different devices and/or locations in the user's wireless network 110 may be differentiated from one another.

In some embodiments, the password generated for the wireless speaker device 600, and corresponding to the identifier generated for the wireless speaker device 600, may be randomly generated by the backend API 538. Also in some embodiments, whether the password generated by the backend API 538 for the wireless speaker device 600 is randomly generated or not, the password may not be accessible to the user. This aspect may facilitate authenticating other wireless devices that attempt to connect to the wireless speaker device 600 when it is operating as a wireless repeater 624. For example, when another wireless device attempts to connect to the wireless speaker device 600 (when it is operating as a wireless repeater 624), the wireless speaker device 600 may receive an identifier from the wireless device that is attempting to connect to the wireless speaker device 600. Based on the identifier, which may be, for example, an SSID, a MAC (media access control) address, etc., the wireless speaker device 600 may connect the other wireless device or may deny a connection to the other wireless device. For example, and without limitation, the wireless speaker device 600 (and/or a network device, such as the backend API 538) may compare the identifier from the wireless device that is attempting to connect to the wireless speaker device 600 to a list of known identifiers. If the identifier from the wireless device that is attempting to connect to the wireless speaker device 600 is on the list of known identifiers, then the wireless device may be allowed to connect to the wireless speaker device 600. In another example, the wireless speaker device 600 (and/or a network device, such as the backend API 538) may look for a known character or sequence of characters in the identifier from the wireless device that is attempting to connect to the wireless speaker device 600. If the known character or sequence of characters is present in the identifier from the wireless device, then the wireless device may be allowed to connect to the wireless speaker device 600.

In alternative embodiments, a process for authenticating another wireless device attempting to connect to the wireless speaker device 600 may include a handshake. For example, the wireless speaker device 600 may send an authentication request to the other wireless device and permit the other wireless device to connect only if the other wireless device sends an expected response to the wireless speaker device 600. If the wireless speaker device 600 successfully authenticates and connects the other wireless device, then the wireless speaker device 600 may transmit to the other wireless device the password that was generated by the backend API 538 for the wireless speaker device 600. By requiring authentication before other wireless devices are permitted to connect to the wireless speaker device 600, the present embodiments advantageously enhance security. Further, the present embodiments advantageously provide this increased security without requiring any user intervention, thus enhancing the user experience.

Figure 38:
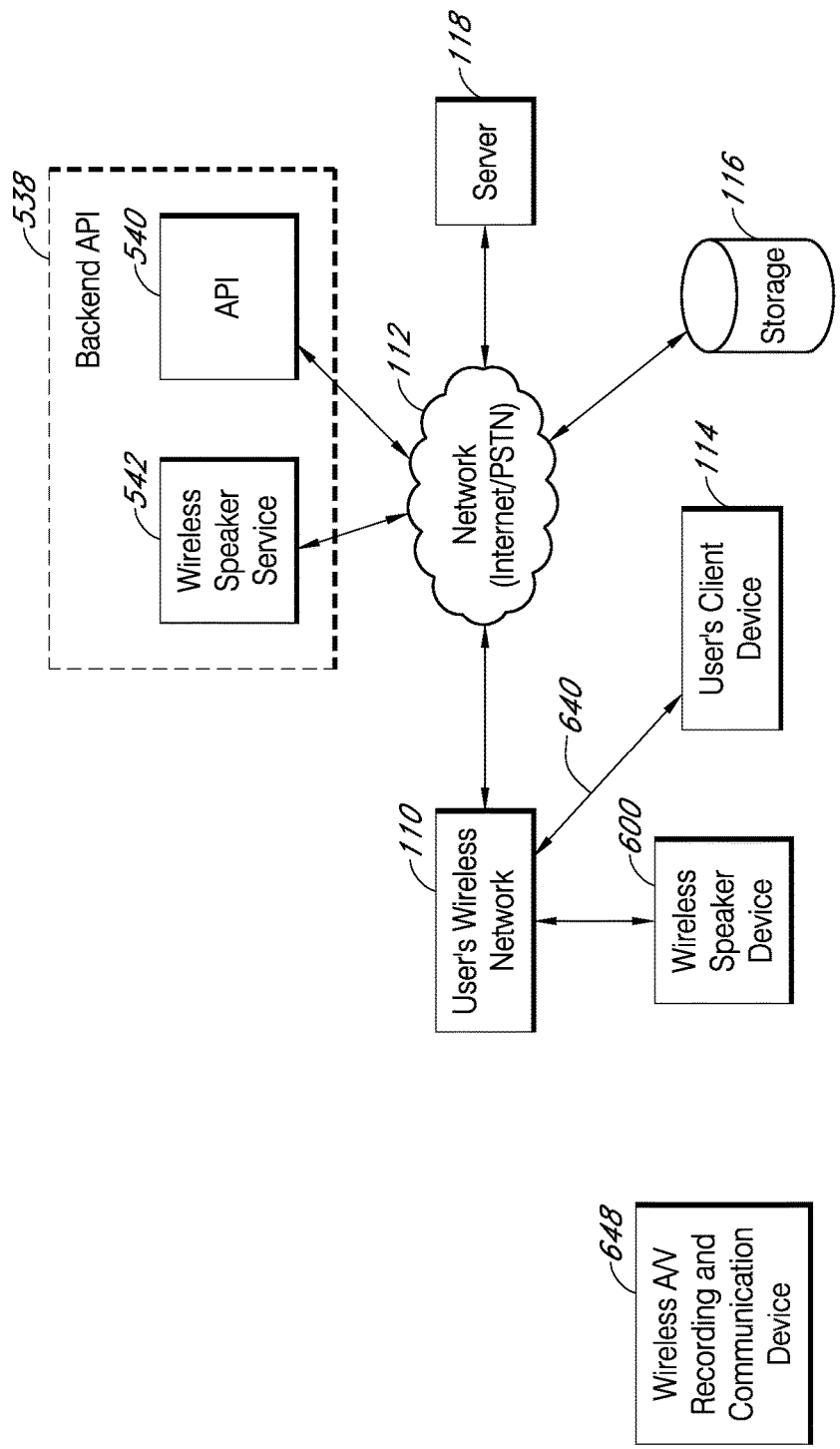
FIGS. 38-40 are functional block diagrams illustrating an embodiment of a process for connecting one or more wireless devices to the present wireless speaker device according to the present disclosure.
Figure 39:
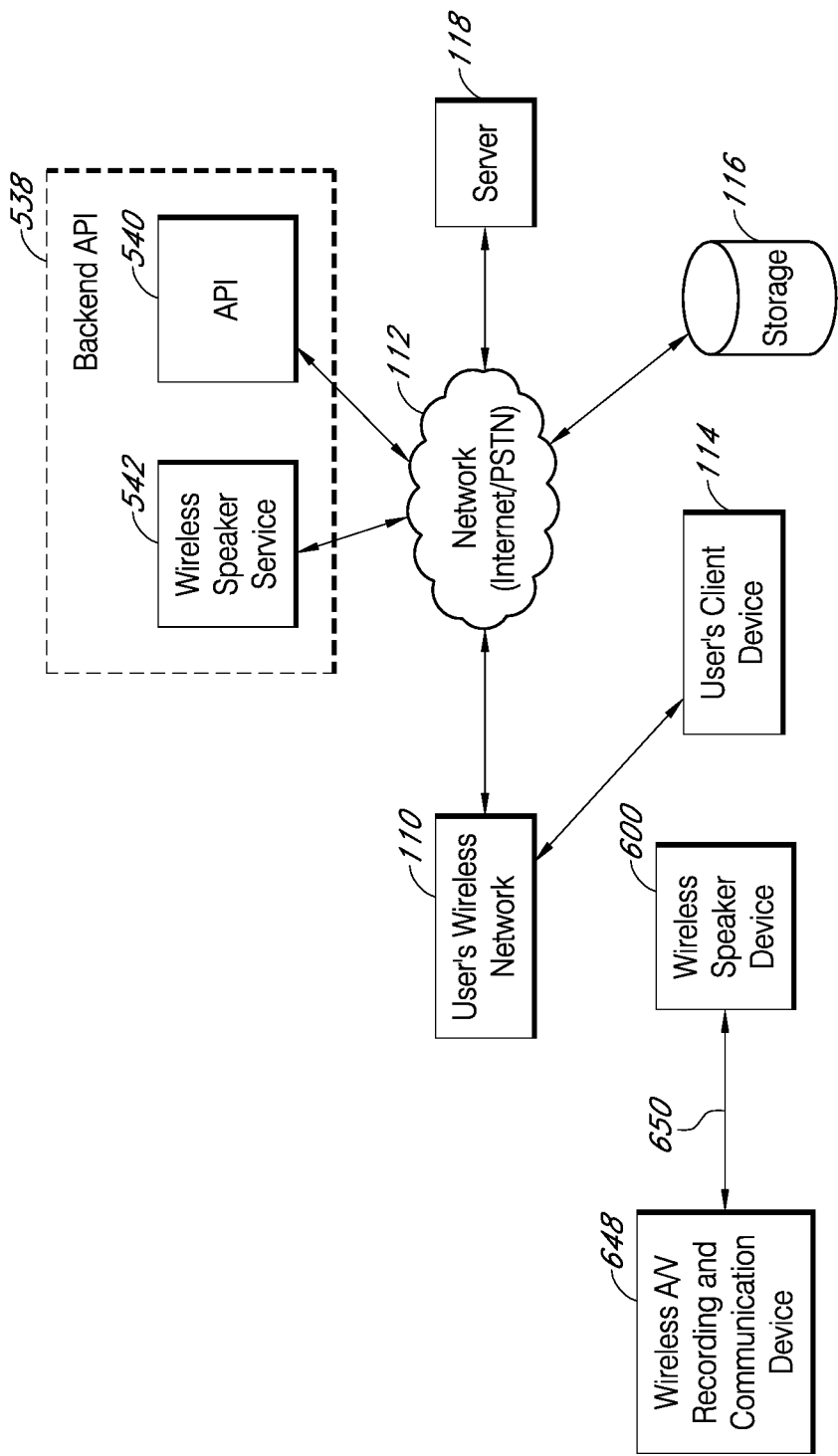
Figure 40:
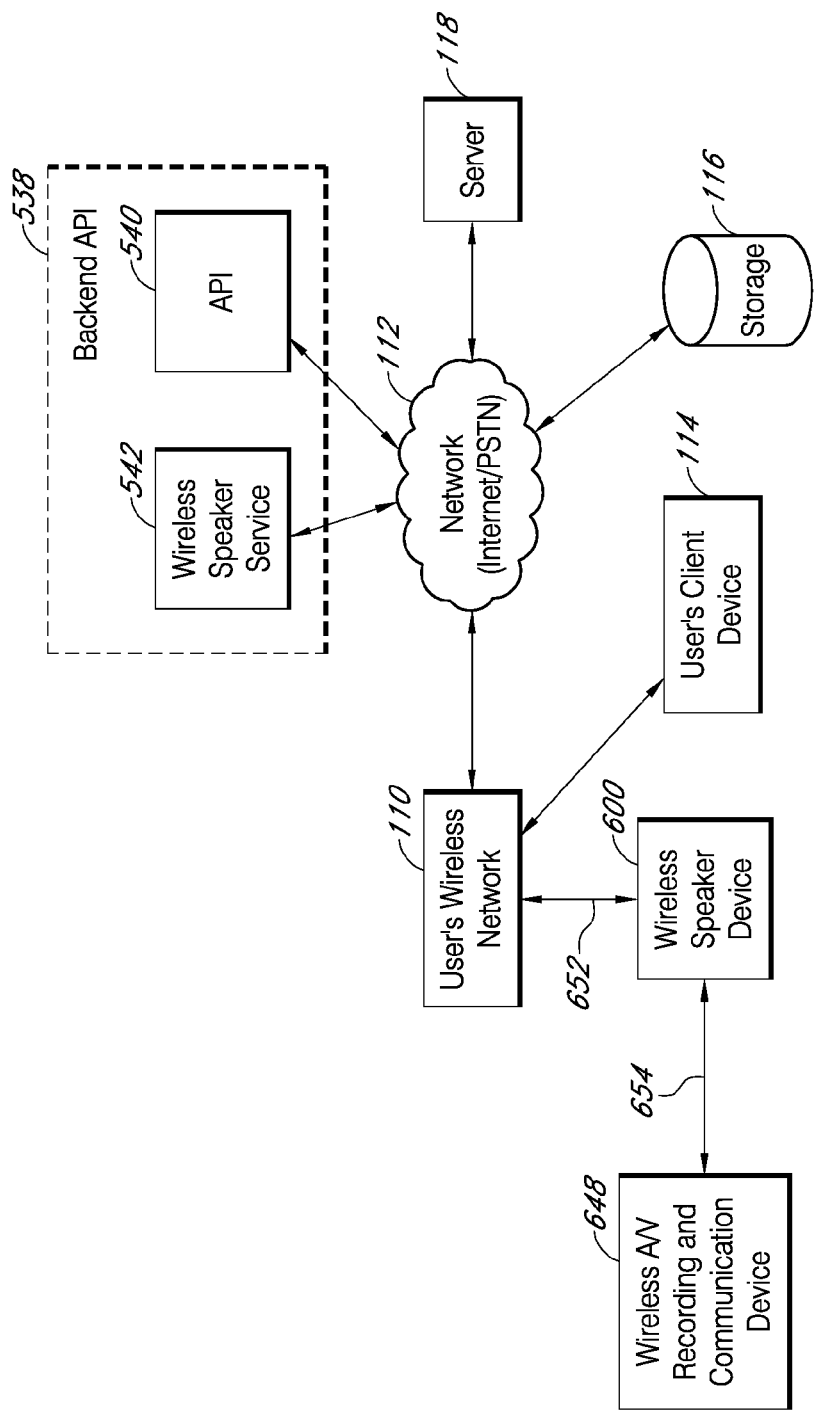

FIGS. 38-40 illustrate an embodiment of a process for connecting one or more wireless devices to the present wireless speaker device 600 according to the present disclosure. In the illustrated embodiment, the wireless device to be connected to the wireless speaker device 600 is a wireless A/V recording and communication device 648, such as a doorbell. The illustrated wireless device 648 is, however, just one non-limiting example. In alternative embodiments, any type of wireless device may be connected to the wireless speaker device 600.

With reference to FIG. 38, the user's client device 114 may be connected to the user's wireless network 110 (as indicated by the double-headed arrow 640), while the wireless A/V recording and communication device 648 is not connected to any other device or network, and may be powered off. In some embodiments, a process for connecting the wireless A/V recording and communication device 648 to the wireless speaker device 600 may be facilitated by an application executing on the user's client device 114. While other processes for connecting the wireless A/V recording and communication device 648 to the wireless speaker device 600 may not involve an application executing on the user's client device 114, for clarity the following description will reference such an application.

The application executing on the user's client device 114 may prompt the user to set the wireless A/V recording and communication device 648 in AP (access point) mode. Setting the wireless A/V recording and communication device 648 in AP mode may comprise, for example, pressing a button on the wireless A/V recording and communication device 648 and/or powering on the wireless A/V recording and communication device 648. Upon being set on AP mode, the wireless A/V recording and communication device 648 may broadcast a wireless provisioning beacon. The provisioning beacon is a broadcast wireless signal that indicates to other wireless devices that the wireless A/V recording and communication device 648 is a wireless access point. The provisioning beacon includes identifying information, such as an SSID (Service Set Identifier). The provisioning beacon may also indicate that the security of the wireless access point is open (no password required to connect to the wireless access point).

The application executing on the user's client device 114 may then send a signal to the backend API 538 via the user's wireless network 110 and/or the network 112. The signal from the user's client device 114 may indicate to the backend API 538 that a new wireless device 648 is being added. The backend API 538 may then send a signal to the wireless speaker device 600 indicating to the wireless speaker device 600 that a new wireless device 648 is being added. The signal from the backend API 538 to the wireless speaker device 600 may include a command to the wireless speaker device 600 to search for the provisioning beacon broadcast by the wireless A/V recording and communication device 648.

After receiving the command from the backend API 538, the wireless speaker device 600 may search for and locate the provisioning beacon broadcast by the wireless A/V recording and communication device 648. With reference to FIG. 39, after locating the provisioning beacon broadcast by the wireless A/V recording and communication device 648, the wireless speaker device 600 may sever its station connection with the wireless access point (e.g., router) in the user's wireless network 110 and connect to the wireless access point of the wireless A/V recording and communication device 648 (as indicated by the double-headed arrow 650). The wireless speaker device 600 may then transmit to the wireless A/V recording and communication device 648 the credentials of the wireless speaker device 600, including an identifier for the wireless speaker device 600, such as an SSID, and/or a password if a password is required to connect to the wireless speaker device 600. With reference to FIG. 40, after the wireless speaker device 600 sends its credentials to the wireless A/V recording and communication device 648, the wireless speaker device 600 may sever its station connection with the wireless A/V recording and communication device 648 and reestablish its station connection with the wireless access point (e.g., router) in the user's wireless network 110 (as indicated by the double-headed arrow 652), and the wireless A/V recording and communication device 648 may connect to the wireless access point provided by the wireless speaker device 600 (as indicated by the double-headed arrow 654) using the credentials provided by the wireless speaker device 600.

The process for connecting a wireless device 648 to the present wireless speaker device 600, described above with reference to FIGS. 38-40, advantageously requires very little user intervention. The user may open an application executing on the user's client device 114, and may set the wireless device 648 that is to be connected to AP mode. Other than that, all other aspects of the process may be carried out automatically by the wireless speaker device 600, the backend API 538, and the wireless device 648 that is being connected. In alternative embodiments, the application executing on the user's client device 114 may be omitted. For example, the user may do nothing more than set the wireless device 648 that is to be connected to AP mode. The wireless speaker device 600 may then detect the wireless provisioning beacon broadcast by the wireless device 648, automatically sever its station connection with the wireless access point (e.g., router) in the user's wireless network 110, and then connect to the wireless access point of the wireless device 648. The remaining aspects of the connection process may then proceed substantially as described above. The present embodiments thus advantageously enhance the user experience by reducing the amount of user intervention needed to connect a wireless device to the wireless speaker device 600.

In some embodiments, more than one wireless speaker device 600 may be connected to the user's wireless network 110. In such embodiments, when the backend API 538 is notified that a new wireless device is being added, the backend API 538 may send a signal to all connected wireless speaker devices 600 including a command to search for the provisioning beacon broadcast by the wireless device being added. Whichever among the wireless speaker devices 600 is the first to locate and connect to the provisioning beacon of the wireless device may then proceed with the connection process in the same or similar manner as described above.

In some embodiments, during the process of connecting a new wireless device to the wireless speaker device 600, the wireless AP provided by the wireless speaker device 600 may remain intact even while the wireless speaker device 600 is disconnected from its station connection to the wireless access point (e.g., router) in the user's wireless network 110. This aspect advantageously makes the process of connecting new wireless devices to the wireless speaker device 600 invisible to any other wireless devices that may already be connected to the AP provided by the wireless speaker device 600.

As described above, the present embodiments advantageously provide a wireless speaker device 600 configured for use with a wireless A/V recording and communication device, such as a doorbell, and also configured for use as a wireless repeater (or range extender). The wireless speaker device 600, which includes a wireless repeater 624, may connect to the user's local area network (LAN), such as a Wi-Fi network, and provide a wireless access point to which other wireless devices may connect. The wireless speaker device 600 may receive its credentials, such as an identifier and/or a password, from a backend API 538, thus facilitating the connection of one or more additional wireless devices. Such additional wireless devices may connect to the wireless speaker device 600 with little or no user intervention required. The wireless speaker device 600 may pass its credentials to the wireless device(s) being added, so that the user need not input this information himself or herself. The wireless speaker device 600 may further, in conjunction with one or more additional wireless speaker devices 600, form a roaming network, enabling connected wireless devices to enjoy the strongest available signal by connecting to any of a plurality of wireless speaker devices 600 having the same (or similar) credentials. The wireless speaker device 600 also facilitates authenticating new devices, ensuring that only authorized devices are able to connect to the wireless access point provided by the wireless speaker device 600.

As described above, one aspect of the present embodiments includes the realization that the process for setting up (also referred to herein as "provisioning") wireless speaker devices for A/V recording and communication devices sometimes results in failure, and the reason(s) for the failure may not be apparent, which can lead to frustration for the person attempting to provision the wireless speaker device. Another aspect of the present embodiments includes the realization that provisioning wireless speaker devices for A/V recording and communication devices sometimes succeeds, but thereafter the wireless speaker device performs poorly due to weak wireless signal strength, and the reason (s) for the poor performance may not be apparent, which can lead to frustration for the user of the wireless speaker device. The present embodiments solve these problems by providing audio prompts to the user to inform him or her of why the setup process failed and/or to inform him or her that the setup process was successful but the wireless signal is weak, which could cause poor performance. For example, a speaker device, such as a wireless speaker device, may be configured to auto-provision (e.g., to perform the provisioning process with little to no user intervention) during initial setup using at least one audio prompt played using a speaker of the speaker device. In various embodiments, upon powering up, the speaker device may be configured to automatically attempt to connect to an access point provided by a network device, such as (but not limited to) a router, and to play at least one audio prompt indicating successful or unsuccessful connection of the speaker device to the access point. Further, where the connection to the access point is unsuccessful, the audio prompt may include a statement that the provisioning process was unsuccessful because the wireless signal is too weak, and may include a further statement directing a user to move the speaker device and the access point closer to one another (e.g., by directing the user to move the speaker device to a location closer to the access point, or by directing the user to move the access point to a location closer to the speaker device), and/or to remove any obstructions that may be between the speaker device and the access point, in order to improve the connection reliability of the speaker device to the access point. In such embodiments, the setup of the speaker device may be more reliable (e.g., result in fewer failed attempts), may require less user input, and may be more efficient, since the various audio prompts may immediately inform the user of why the setup attempt failed and how to fix the problem, and/or immediately inform the user of why the setup, though successful, may result in poor performance. It would be advantageous, therefore, to allow for auto-provisioning of wireless speaker devices for A/V recording and communication devices using at least one audio prompt. The present embodiments provide these advantages, as described below.

Figure 41:
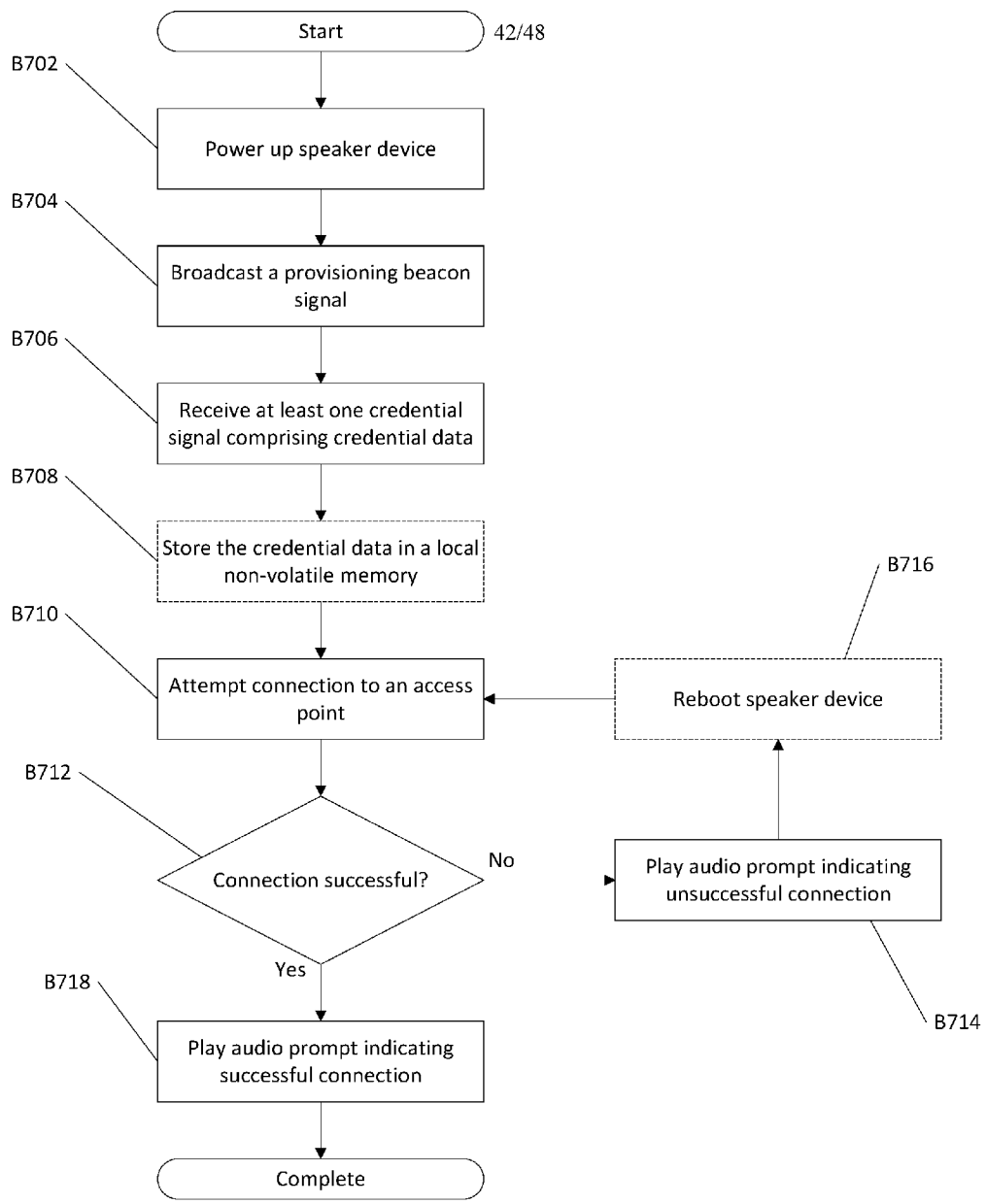
FIG. 41 is a flowchart illustrating an embodiment of a process for auto-provisioning a speaker device using at least one audio prompt according to various aspects of the present disclosure.

FIG. 41 is a flowchart illustrating an embodiment of a process 700 for auto-provisioning a speaker device, such as a wireless speaker device 600, using at least one audio prompt according to various aspects of the present disclosure. As described above, the wireless speaker device 600 may be configured for use with a wireless A/V recording and communication device, such as a doorbell. For example, a wireless speaker device 600 be configured to provide an alert, through its speaker 522, to a user of activity at the A/V recording and communication device 648 such as (but not limited to) a visitor and/or motion detection at the wireless A/V recording and communication device 648. In addition, in some embodiments, the wireless speaker device 600 may include a wireless repeater 624 to provide the A/V recording and communication device 648 with a stronger connection to the user's wireless network 110 for access to the Network (Internet/PSTN) 112, as further described below. Although described below in the context of the wireless speaker device 600, the various aspects of the present disclosure are not limited to wireless speaker devices and may also be applied to a speaker device without wireless capabilities.

In reference to FIG. 41, the process 700 may include powering up (block B702) the wireless speaker device 600, such as by inserting the AC pins 518 into a standard wall socket, as described above. In many embodiments, upon powering up, the process 700 may include broadcasting (block B704) a provisioning beacon signal using the communication module 610. In various embodiments, the provisioning beacon signal may include a broadcast wireless signal that indicates to a wireless router (or another network device) in the user's wireless network 110 that the wireless speaker device 600 is ready to connect. The process 700 may further include receiving (block B706), in response to the provisioning beacon signal, at least one credential signal from the network device such as (but not limited to) the wireless router configured to provide an access point to connect various network devices to the Network (Internet/PSTN) 112 via the user's wireless network 110. In some embodiments, the at least one credential signal may include credential data that may include an identifier associated with the network device such as (but not limited to) a service set identifier (SSID) and/or a network name. In other embodiments, the wireless speaker device 600 may also receive a password for gaining access to the access point, if the access point is part of a secured network. Alternatively, the wireless speaker device 600 may receive the password via a second credential signal from a client device associated with the wireless router. In some embodiments, the process 700 may further include storing (block B708) the first credential signal including the credential data and/or the second credential signal in the local non-volatile memory 620 of the wireless speaker device 600, as further described below.

In further reference to FIG. 41, the process 700 may include attempting (block B710) to connect to the access point using the credential data and determining (block B712) whether the attempt to connect to the access point was successful. In some embodiments, it may be determined (block B712) that the connection attempt was unsuccessful if there is no connection established between the wireless speaker device 600 and the wireless router within a first preset timeout period. In some embodiments, it may be determined (block B712) that the connection was unsuccessful if there is an initial connection established but the connection is lost or disconnected within a second preset timeout period. In further embodiments, it may be determined (block B712) that the connection attempt was unsuccessful if the connection strength is below a threshold strength, as further described below. Upon determining (block B712) an unsuccessful connection to the access point, the process 700 may include playing (block B714) a first audio prompt using the speaker 522. In various embodiments, the first audio prompt may include a statement indicating that the connection to the access point was unsuccessful, and may include a further statement indicating that the connection was unsuccessful because the signal is too weak (e.g., high RSSI score). In some embodiments, the statement may include various directions to the user for fixing the connection to the access point. For example, the statement may include directions to move the wireless speaker device 600 closer to the wireless router (or any network device), and/or directions to move the wireless router closer to the wireless speaker device 600. In a further example, the statement may include directions to remove any obstructions that may be located between the wireless speaker device 600 and the wireless router (or any network device). In various embodiments, in response to the first audio prompt, the user may unplug the wireless speaker device 600 from the wall socket, move the wireless speaker device 600 to a different location closer to the wireless router, and insert the AC pins 518 into a different wall socket at the different location. In some embodiments, the process 700 may include rebooting (block B716) the wireless speaker device 600 when the wireless speaker device 600 is unplugged and reinserted into the different wall socket. In many embodiments, the process 700 may include reattempting (block B710) to connect to the access point.

In some embodiments, the reattempt may include using the credential data stored in the non-volatile memory 620 of the wireless speaker device 600, as described below with reference to FIG. 43. In several embodiments, the wireless speaker device 600 may be associated with a first location when first attempting to connect to the access point and associated with a second location when reattempting to connect to the access point. Further, in many embodiments, the reattempt to connect to the access point at the second location may be performed automatically without any additional input from the user. That is, the wireless speaker device 600 may, after powering up at the second location, read the stored credential data out of the non-volatile memory 620 and attempt to connect to the access point without requiring any intervention from the user. In further reference to FIG. 41, upon determining (block B712) a successful connection to the access point, the process 700 may include playing (block B718) a second audio prompt indicating successful connection to the access point. In many embodiments, upon a successful connection between the wireless speaker device 600 and the access point, the wireless speaker device 600 may act as a repeater/extender for the access point, enabling one or more additional network devices, such as (but not limited to) the A/V recording and communication device, to connect wirelessly to the repeater/extender, as described below with reference to FIG. 43.

Figure 42:
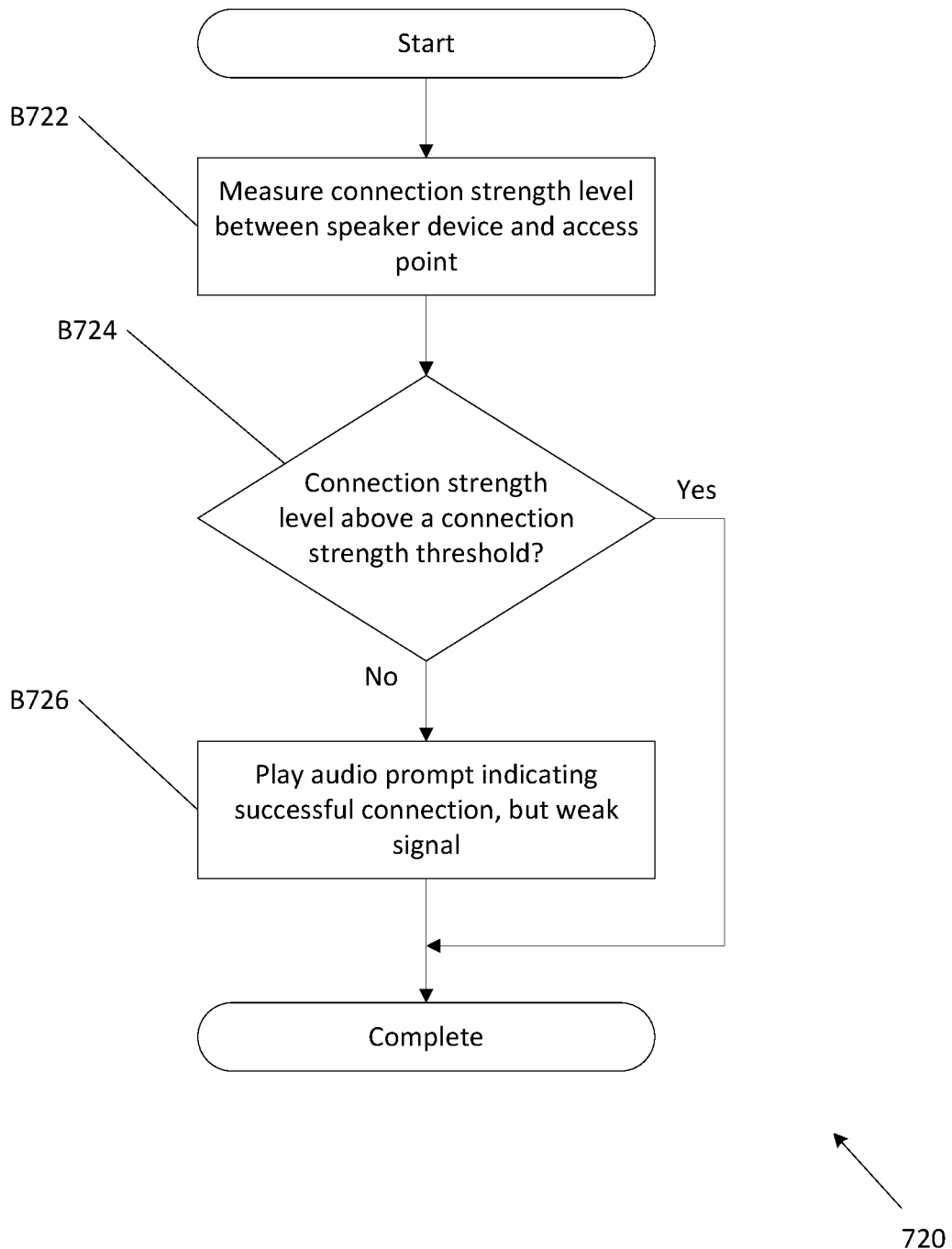
FIG. 42 is a flowchart illustrating an embodiment of a process for determining whether a speaker device has successfully connected to an access point according to various aspects of the present disclosure.

FIG. 42 is a flowchart illustrating an embodiment of a process 720 for determining whether a wireless speaker device has successfully connected to an access point according to various aspects of the present disclosure. In some embodiments, the process 720 may be performed in connection with block B712 of the process 700 of FIG. 41. Alternatively, the process 720 may be an independent process performed after the process 700 completes, or at any other time. The process 720 may include measuring (block B722) a connection strength level between the wireless speaker device 600 and the access point provided by the wireless router, and further determining (block B724) whether the connection strength level is above a connection strength threshold. If the connection strength level is above the connection strength threshold, then the process 720 may conclude that the connection was successful, and may, in some embodiments, play (block B718) the second audio prompt indicating a successful connection, as described above. However, if the connection strength level is below (or equal to) the connection strength threshold, then the process 720 may conclude that the connection is not strong enough, and may then play (block B726) a third audio prompt indicating that the connection was successful, but that the signal strength is weak. The third audio prompt may further indicate that a weak signal may cause poor performance, and may further recommend that the distance between the wireless speaker device 600 and the access point should be reduced and/or any obstructions between the wireless speaker device 600 and the access point should be removed. The process 720 may then complete.

In alternative embodiments, a successful connection attempt with a weak signal, such as below (or equal to) the connection strength threshold, may be considered an unsuccessful connection attempt, and may thus include playing the first audio prompt indicating an unsuccessful connection, as described above with reference to block B714. In some embodiments, upon determining that the connection strength level is below (or equal to) the connection strength threshold, the wireless speaker device 600 may play an audio prompt that includes a statement indicating that the attempted connection to the access point is weak and the wireless speaker device 600 should be moved to a location closer to the network device (e.g., wireless router). In various embodiments, the connection strength level may be measured using a received signal strength indication (RSSI) score and/or any other measuring parameter to indicate signal strength.

As described above, another aspect of the present embodiments includes the realization that when an attempt to provision a wireless speaker device for A/V recording and communication devices fails, and another attempt is made to provision the device, often the same setup steps must be performed by the user, which can lead to fatigue, frustration, and/or customer dissatisfaction. The present embodiments solve this problem by configuring the wireless speaker device to reboot and automatically attempt again to connect to the access point using locally stored network credentials, when a user reattempts to set up the wireless speaker device, such as in a different location and/or at a different point in time. The user thus does not have to repeat one or more user steps for provisioning the wireless speaker device during subsequent attempts to provision the wireless speaker device. In such embodiments, the setup of the speaker device may be more reliable (e.g., result in fewer failed attempts), may require less user input, and may be more efficient, since the user does not have to repeat one or more setup steps. It would be advantageous, therefore, to allow for auto-provisioning of wireless speaker devices for A/V recording and communication devices using at least one audio prompt. The present embodiments provide these advantages, as described below.

Figure 43:
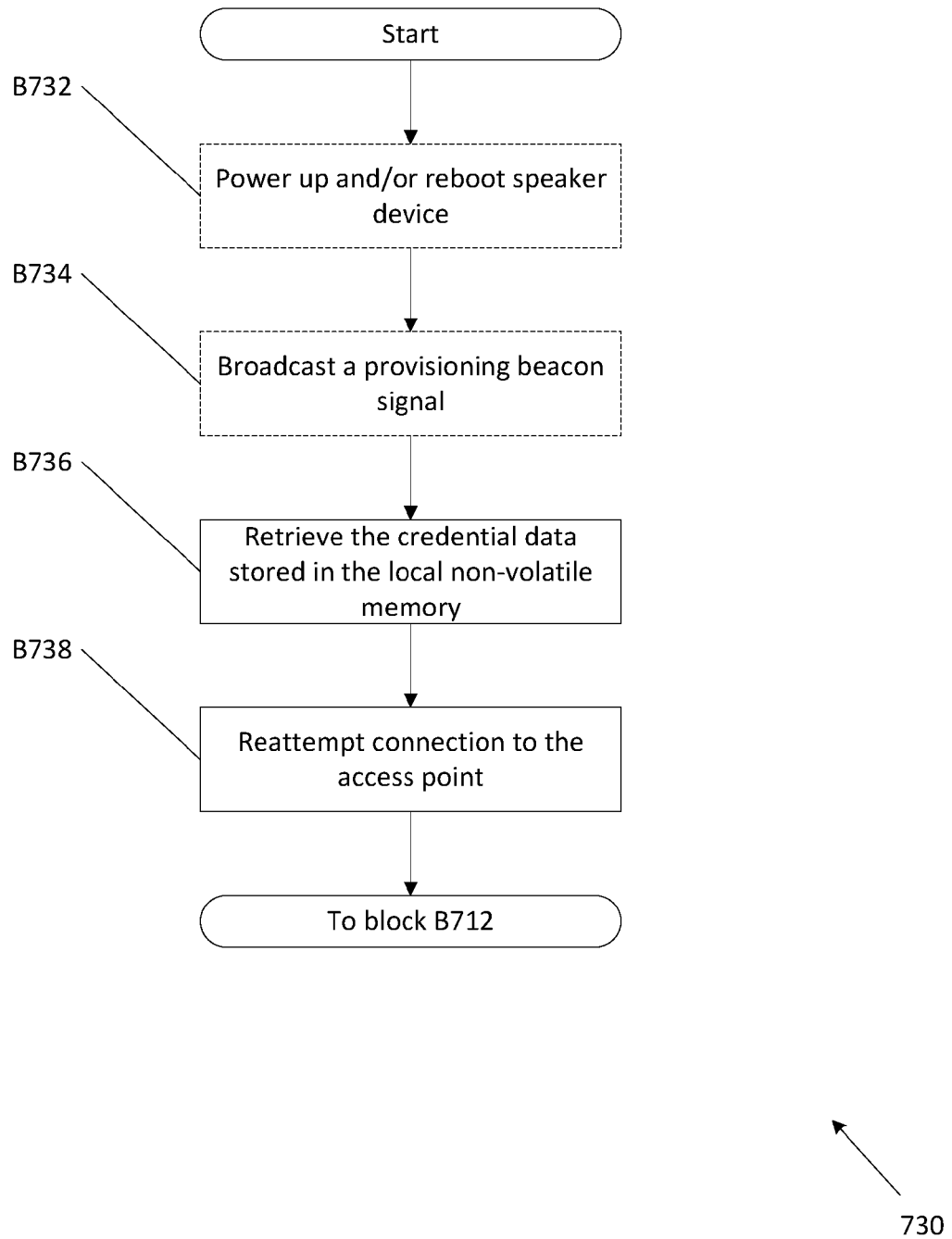
FIG. 43 is a flowchart illustrating an embodiment of a process 730 for a wireless speaker device automatically reattempting to connect to a wireless access point using locally stored credential data for the wireless access point according to various aspects of the present disclosure.

FIG. 43 is a flowchart illustrating an embodiment of a process 730 for a wireless speaker device automatically reattempting to connect to a wireless access point using locally stored credential data for the wireless access point according to various aspects of the present disclosure. As described above, a wireless speaker device may automatically reattempt to connect to an access point when the connection is unsuccessful and/or the connection is deemed successful but with a weak connection strength. In many embodiments, the reattempt may be initiated when the user unplugs the wireless speaker device 600 from a wall socket, moves the wireless speaker device 600 to a different location closer to a network device (e.g. a wireless router), and inserts the AC pins 518 into a different wall socket at the different location. In some embodiments, the wireless speaker device 600 may reboot when the wireless speaker device 600 is unplugged and reinserted into the different wall socket. In various embodiments, the process 730 may be initiated in response to the first audio prompt and/or the third audio prompt, as described above. For example, in response to the first prompt, the user may move the wireless speaker device 600 from a first location to a second location, where the second location may allow the wireless speaker device to have a stronger connection strength with the access point.

In reference to FIG. 43, the process 730 may include powering up and/or rebooting (block B732) the wireless speaker device 600. In various embodiments, the wireless speaker device 600 may power up and/or reboot (block B732) after a user has followed the first and/or third audio prompts that include one or more directions to the user for fixing the connection to the access point, as described above. For example, the process 730 may be initiated after the user has moved the wireless speaker device 600 to a different location, moved the router to a different location, and/or removed an obstruction from between the wireless speaker device 600 and the router. In some embodiments, the process 730 may also include the wireless speaker device 600 broadcasting (block B734) a provisioning beacon signal that indicates to the wireless router (or another network device) in the user's wireless network 110 that the wireless speaker device 600 is ready to connect, as described above. The process 730 may include retrieving (block B736) the credential data stored in the local non-volatile memory 620, as described above. In many embodiments, the credential data may include data from the first credential signal and/or the second credential signal. Using the received credential data, the process 730 may include reattempting (block B738) connection to the access point. As described above, the process 730 may be performed automatically without any additional input from the user and thus the user does not have to repeat one or more user steps for provisioning the wireless speaker device 600 during subsequent attempts to provision the wireless speaker device 600.

Figure 44:
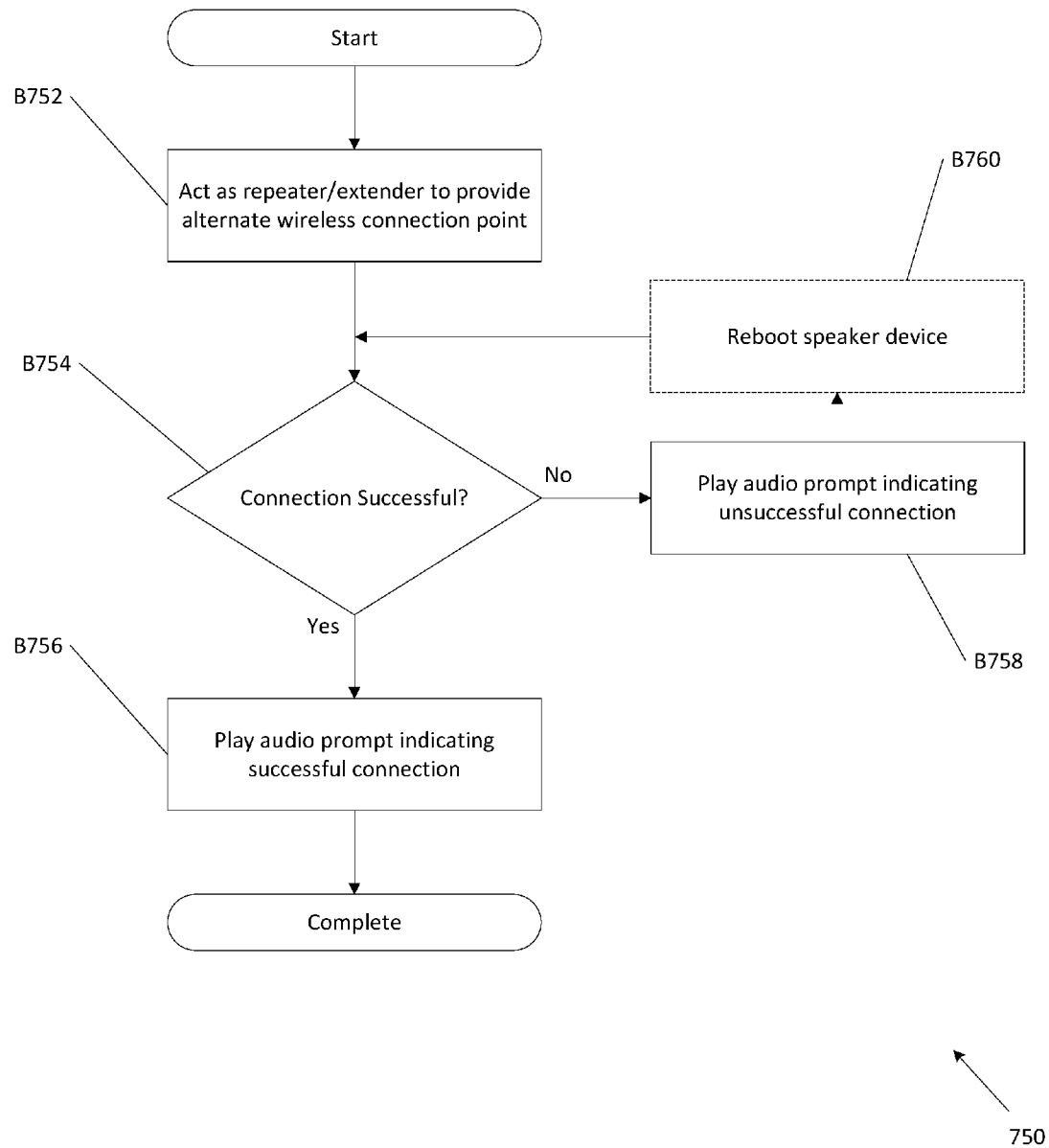
FIG. 44 is a flowchart illustrating an embodiment of a process for acting as a repeater/extender for the access point to provide an alternate wireless connection point for an A/V recording and communication device using at least one audio prompt according to various aspects of the present disclosure.

FIG. 44 is a flowchart illustrating an embodiment of a process 750 for providing a repeater/extender for an access point, thereby enabling an A/V recording and communication device 648 to connect wirelessly to the repeater/extender, using at least one audio prompt according to various aspects of the present disclosure. As described above, a wireless speaker device 600 may be configured to connect to an access point provided by a network device such as (but not limited to) a wireless router. Upon successful connection, the wireless speaker device 600 may be configured to act as a repeater/extender for the access point, thereby enabling additional network devices, such as (but not limited to) the A/V recording and communication device 648, to connect wirelessly to the repeater/extender. In reference to FIG. 44, the process 750 may include acting (block B752) as a repeater/extender to provide an alternate wireless connection point for connecting to the Network (Internet/PSTN) 112 via the user's wireless network 110. For example, the wireless speaker device 600 may provide (block B752) a repeater/extender by broadcasting a provisioning beacon signal that may include a broadcast wireless signal that indicates to other wireless devices that the wireless speaker device 600 may be used as a wireless network connection point. In some embodiments, the provisioning beacon signal may include identifying information, such as an SSID (Service Set Identifier) for the wireless speaker device 600. In addition, the provisioning beacon signal may also indicate that the security of the repeater/extender is open (no password required to connect to the wireless access point) or requires a password for access. In many embodiments, the A/V recording and communication device 648 may connect to the wireless speaker device 600 using various processes, as described above.

In reference to FIG. 44, the process 750 may include determining (block 754) whether the connection between the A/V recording and communication device 648 and the repeater/extender provided by the wireless speaker device 600 is successful. In many embodiments, the process 750 may determine (block 754) whether the connection between the A/V recording and communication device 648 and the repeater/extender was successful using methods similar to those described above for determining (block B712) whether a connection between the wireless speaker device 600 and the access point was successful. For example, in some embodiments, the process 750 may include measuring a connection strength level between the wireless speaker device 600 (e.g., repeater/extender) and the A/V recording and communication device 648 and determining whether the connection strength level (e.g., RSSI) is above a connection strength threshold, as described above. If the connection strength level is above the connection strength threshold, then the process 750 may conclude (block B754) that the connection was successful and play (block B756) an audio prompt including a statement indicating a successful connection, using the speaker 522, as described above. If the connection strength level is below (or equal to) the connection strength threshold, then the process 750 may conclude (block B754) that the connection was unsuccessful and play (block B758) an audio prompt including a statement indicating an unsuccessful connection, using the speaker 522, as described above. In some embodiments, the statement indicating an unsuccessful connection may indicate that the attempted connection of the A/V recording and communication device 648 to the repeater/extender is weak. In various embodiments, the statement indicating an unsuccessful connection may include various directions to the user for fixing the connection between the A/V recording and communication device 648 and the repeater/extender. For example, the statement may include directions to move the wireless speaker device 600 closer to the A/V recording and communication device 648 (or any other network device), and/or directions to move the A/V recording and communication device 648 closer to the wireless speaker device 600. In a further example, the statement may include directions to remove any obstructions that may be located between the wireless speaker device 600 and the A/V recording and communication device 648. In some embodiments, the user may unplug the wireless speaker device 600 and reinsert the AC pins 518 in another wall socket as directed by the audio prompt. In some embodiments, by rebooting (block B760), the wireless speaker device 600 may return to auto-provisioning by again attempting (block B710) to connect to the access point, as described above with reference to FIG. 43. In this manner, the user may be directed to find a location of the wireless speaker device 600 that improves the connection strength between the wireless speaker device 600 and the access point and/or the connection strength between the A/V recording and communication device 648 and the repeater/extender.

As described above, another aspect of the present embodiments includes the realization that wireless devices, such as (but not limited to) A/V recording and communication devices, may from time to time experience weak signal strength (and occasionally complete loss of signal) from their wireless access point. The present embodiments solve this problem by configuring the wireless speaker device to serve as a repeater/extender to various other network devices, such as (but not limited to) A/V recording and communication devices, and to further provide locally stored network credentials for the access point to the other network devices, thereby enabling those devices to switch their connection from the wireless speaker device to the access point when the signal received by those devices from the access point is stronger than the signal received by those devices from the repeater/extender, and/or when the signal strength received by those devices from the repeater/extender drops below a threshold, thereby providing a stronger and more reliable connection to the Internet for the other network devices. In this manner, the A/V recording and communication device 648 may connect to either the access point directly or to the access point through the repeater/extender. In many embodiments, the A/V recording and communication device 648 may select the appropriate connection point by selecting the connection point that provides a stronger signal, as described below.

Figure 45:
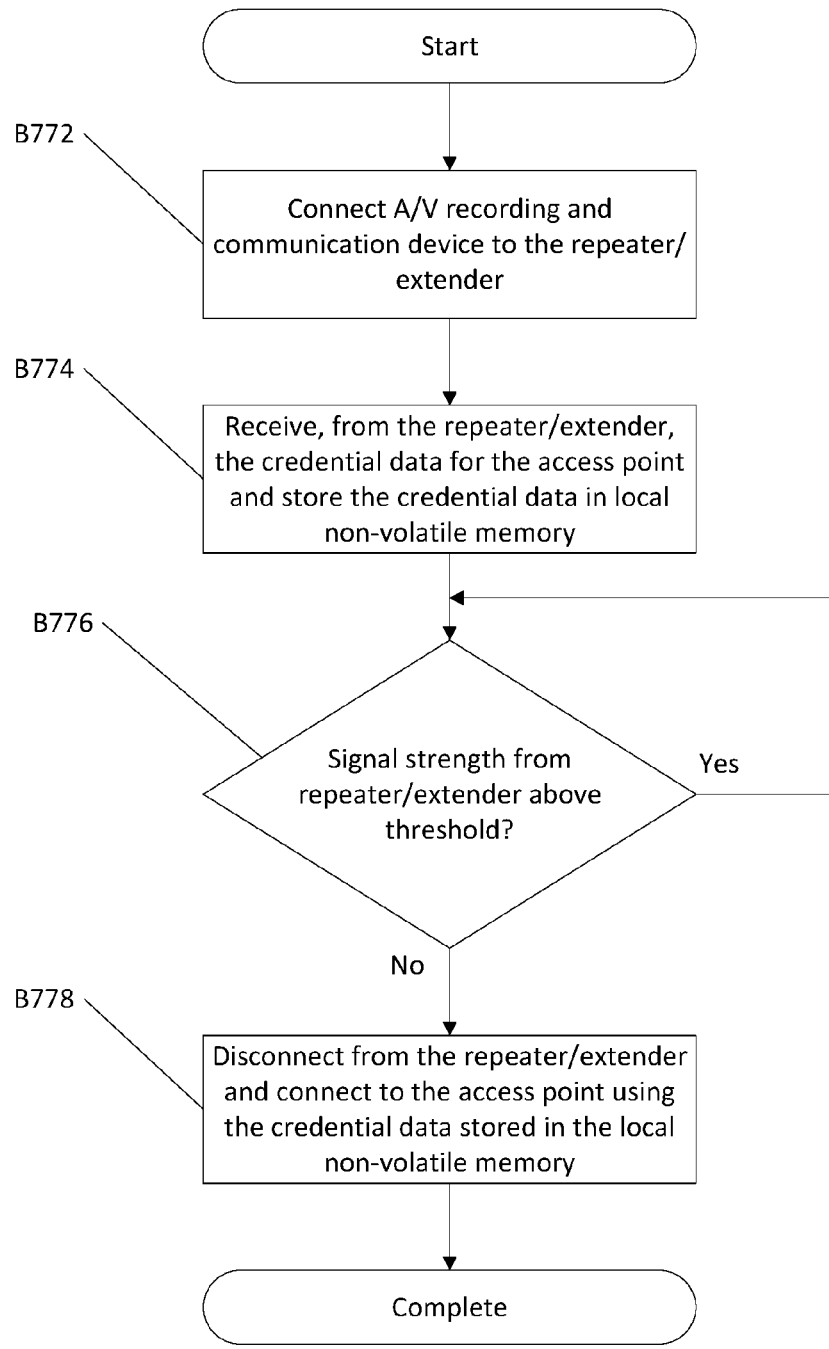
FIG. 45 is a flowchart illustrating an embodiment of a process for switching a connection of a wireless device from a repeater/extender to an access point when the signal strength received by the wireless device from the repeater/extender drops below a threshold, or when the signal received by the wireless device from the access point is stronger than the signal received by the wireless device from the repeater/extender, according to various aspects of the present disclosure.

FIG. 45 is a flowchart illustrating an embodiment of a process 770 for switching a connection of a wireless device from a repeater/extender to an access point when the signal strength (e.g., RSSI) received by the wireless device from the repeater/extender drops below a threshold, or when the signal received by the wireless device from the access point is stronger than the signal received by the wireless device from the repeater/extender, according to various aspects of the present disclosure. As described above, the wireless speaker device 600 may be configured to connect to an access point (such as a wireless router) and act as a repeater/extender to various network devices, such as (but not limited to) the A/V recording and communication device 648, for access to the Network (Internet/PSTN) 112 via the user's wireless network 110. The process 770 may include connecting (block B772) a network device, such as (but not limited to) an A/V recording and communication device 648, to the repeater/extender provided by the wireless speaker device 600, as described above. The process 770 may also include the A/V recording and communication device 648 receiving, from the repeater/extender, the credential data for the access point and storing (block B774) the credential data in a local non-volatile memory. In many embodiments, the credential data, received from the wireless speaker device 600 and stored in the local non-volatile memory, may be the credential data stored in the non-volatile memory 620 of the wireless speaker device 600, as described above. The process 770 may further include determining (block B776) whether the signal strength (e.g., RSSI) from the repeater/extender is above a threshold, as described above. If the signal strength from the repeater/extender is above the threshold, then the A/V recording and communication device 648 may continue to access the Network (Internet/PSTN) 112 using the repeater/extender repeating the wireless signal of the access point. However, if the signal strength from the repeater/extender is below (or equal to) the threshold, then the process 770 may include disconnecting (block B778) the A/V recording and communication device 648 from the repeater/extender and connecting directly to the access point using the credential data stored in the local non-volatile memory. In alternative embodiments, rather than (or in addition to) determining (block B776) whether the signal strength (e.g., RSSI) from the repeater/extender is above a threshold, the process may determine whether the signal strength from the access point is stronger than the signal strength from the repeater/extender. In such embodiments, if the signal strength from the access point is stronger than the signal strength from the repeater/extender, then the A/V recording and communication device 648 may disconnect from the repeater/extender and connect directly to the access point using the credential data stored in the local non-volatile memory. As described above, the process 770 allows network devices, such as (but not limited to) the A/V recording and communication device 648, to connect either to the access point directly or to the access point through the repeater/extender and thereby select the access point that provides a stronger signal.

Figure 46:
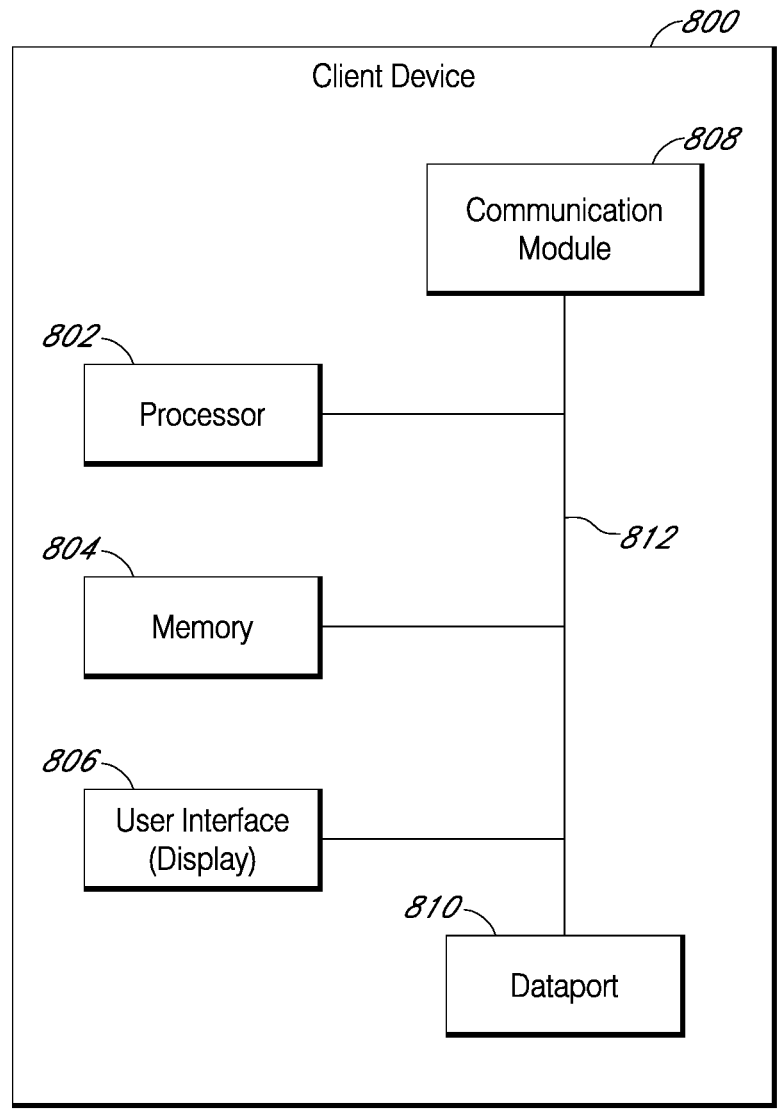
FIG. 46 is a functional block diagram of a client device on which the present embodiments may be implemented according to various aspects of the present disclosure.

FIG. 46 is a functional block diagram of a client device 800 configured for use with a wireless A/V recording and communication device according to various aspects of the present disclosure. The user's client device 114 described with reference to FIG. 1 may include some or all of the components and/or functionality of the client device 800. The client device 800 may comprise, for example, a smartphone.

With reference to FIG. 46, the client device 800 includes a processor 802, a memory 804, a user interface 806, a communication module 808, and a dataport 810. These components are communicatively coupled together by an interconnect bus 812. The processor 802 may include any processor used in smartphones and/or portable computing devices, such as an ARM processor (a processor based on the RISC (reduced instruction set computer) architecture developed by Advanced RISC Machines (ARM).). In some embodiments, the processor 802 may include one or more other processors, such as one or more conventional microprocessors, and/or one or more supplementary co-processors, such as math co-processors.

The memory 804 may include both operating memory, such as random access memory (RAM), as well as data storage, such as read-only memory (ROM), hard drives, flash memory, or any other suitable memory/storage element. The memory 804 may include removable memory elements, such as a CompactFlash card, a MultiMediaCard (MMC), and/or a Secure Digital (SD) card. In some embodiments, the memory 804 may comprise a combination of magnetic, optical, and/or semiconductor memory, and may include, for example, RAM, ROM, flash drive, and/or a hard disk or drive. The processor 802 and the memory 804 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 802 may be connected to the memory 804 via the dataport 810.

The user interface 806 may include any user interface or presentation elements suitable for a smartphone and/or a portable computing device, such as a keypad, a display screen, a touchscreen, a microphone, and a speaker. The communication module 808 is configured to handle communication links between the client device 800 and other, external devices or receivers, and to route incoming/outgoing data appropriately. For example, inbound data from the dataport 810 may be routed through the communication module 808 before being directed to the processor 802, and outbound data from the processor 802 may be routed through the communication module 808 before being directed to the dataport 810. The communication module 808 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 810 may be any type of connector used for physically interfacing with a smartphone and/or a portable computing device, such as a mini-USB port or an IPHONE®/IPOD® 30-pin connector or LIGHTNING® connector. In other embodiments, the dataport 810 may include multiple communication channels for simultaneous communication with, for example, other processors, servers, and/or client terminals.

The memory 804 may store instructions for communicating with other systems, such as a computer. The memory 804 may store, for example, a program (e.g., computer program code) adapted to direct the processor 802 in accordance with the present embodiments. The instructions also may include program elements, such as an operating system. While execution of sequences of instructions in the program causes the processor 802 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 47:
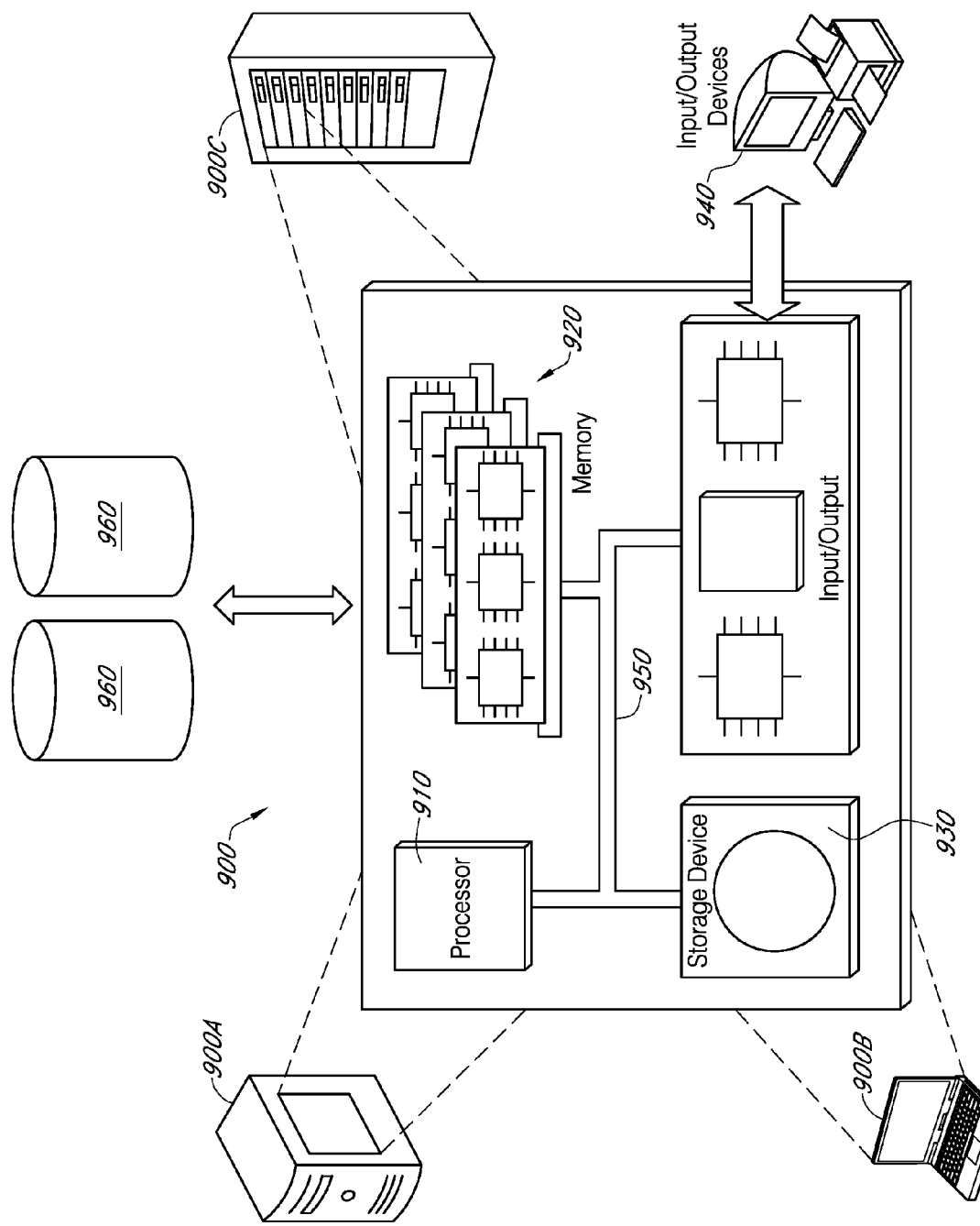
FIG. 47 is a functional block diagram of a general-purpose computing system on which the present embodiments may be implemented according to various aspects of present disclosure.

FIG. 47 is a functional block diagram of a general-purpose computing system configured for use with a wireless A/V recording and communication doorbell according to various aspects of the present disclosure. The computer system 900 may be embodied in at least one of a personal computer (also referred to as a desktop computer) 900A, a portable computer (also referred to as a laptop or notebook computer) 900B, and/or a server 900C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 900 may execute at least some of the operations described above. The computer system 900 may include at least one processor 910, memory 920, at least one storage device 930, and input/output (I/O) devices 940. Some or all of the components 910, 920, 930, 940 may be interconnected via a system bus 950. The processor 910 may be single- or multi-threaded and may have one or more cores. The processor 910 may execute instructions, such as those stored in the memory 920 and/or in the storage device 930. Information may be received and output using one or more I/O devices 940.

The memory 920 may store information, and may be a computer-readable medium, such as volatile or non-volatile memory. The storage device(s) 930 may provide storage for the system 900, and may be a computer-readable medium. In various aspects, the storage device(s) 930 may be a flash memory device, a hard disk device, an optical disk device, a tape device, or any other type of storage device.

The I/O devices 940 may provide input/output operations for the system 900. The I/O devices 940 may include a keyboard, a pointing device, and/or a microphone. The I/O devices 940 may further include a display unit for displaying graphical user interfaces, a speaker, and/or a printer. External data may be stored in one or more accessible external databases 960.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A method for a speaker device comprising a speaker, a non-volatile memory, a communication module, and a processing module operatively connected to the speaker, the non-volatile memory, and to the communication module, the method comprising:
    transmitting, from the speaker device, a provisioning beacon signal using the communication module of the speaker device, the provisioning beacon signal comprising a broadcast wireless signal that indicates to other wireless devices that the speaker device is a first wireless access point;
    receiving, by the speaker device using the communication module, from a network device configured to provide a second wireless access point, at least one credential signal, wherein the at least one credential signal is in response to the provisioning beacon signal and includes credential data for connecting to the second wireless access point;
    storing the credential data in the non-volatile memory of the speaker device;
    attempting, by the speaker device, to connect to the second wireless access point provided by the network device using the credential data;
    determining that the attempt to connect to the second wireless access point was successful; and
    playing a first audio prompt, using the speaker of the speaker device, after determining that the attempt to connect to the second wireless access point was successful, wherein the first audio prompt comprises a statement indicating that the attempt to connect to the second wireless access point was successful.

2. The method of claim 1, further comprising measuring a connection strength level between the speaker device and the second wireless access point.

3. The method of claim 2, further comprising determining that the attempt to connect to the second wireless access point was successful when the connection strength level is above a first connection strength threshold.

4. The method of claim 2, further comprising determining that the attempt to connect to the second wireless access point was unsuccessful when the connection strength level is below a connection strength threshold.

5. The method of claim 2, wherein the connection strength level is measured using a received signal strength indication (RSSI) score.

6. The method of claim 4, further comprising playing a second audio prompt, using the speaker, the second audio prompt comprising a statement indicating that the attempt to connect to the second wireless access point was unsuccessful.

7. The method of claim 6, wherein the second audio prompt further comprises a statement that includes directions to move the speaker device closer in proximity to the network device.

8. The method of claim 6, wherein the second audio prompt further comprises a statement that includes directions to move the speaker device away from any obstructions between the speaker device and the network device.

9. The method of claim 1, wherein the credential data includes an identifier for the network device.

10. The method of claim 9, wherein the identifier is a service set identifier (SSID).

11. The method of claim 1, wherein the credential data is a password for gaining access to the second wireless access point.

12. The method of claim 1, wherein the network device is a wireless router device.

13. The method of claim 1, further comprising receiving, from a client device associated with the network device, at least one second credential signal comprising a password for gaining access to the second wireless access point.

14. The method of claim 1, further comprising reattempting to connect to the second wireless access point using the credential data stored in the non-volatile memory.

15. The method of claim 14, wherein the speaker device is associated with a first location when attempting to connect to the second wireless access point and associated with a second location when reattempting to connect to the second wireless access point.

16. The method of claim 14, wherein the reattempting to connect to the second wireless access point is performed without any additional input from a user.

17. The method of claim 1, further comprising:
    transmitting, from the speaker device, a second provisioning beacon signal using the communication module of the speaker device, wherein the second provisioning beacon signal includes credential data for connecting to the first wireless access point; and receiving, by the speaker device, from an audio/video recording and communication device (A/V device), an attempt to connect to the first wireless access point.

18. The method of claim 17, further comprising:

determining that the attempt by the A/V device to connect to the first wireless access point was successful; and playing a third audio prompt, using the speaker of the speaker device, wherein the third audio prompt comprises a statement indicating that the attempt by the A/V device to connect to the first wireless access point was successful.

19. The method of claim 18, wherein the speaker device acts as a repeater/extender for the second wireless access point by providing an alternate wireless connection point for the A/V device when the A/V device is not able to connect to the second wireless access point.

20. The method of claim 18, further comprising:

determining that the attempt by the A/V device to connect to the first wireless access point was unsuccessful; and playing a fourth audio prompt, using the speaker, wherein the fourth audio prompt comprises a statement indicating that the attempt by the A/V device to connect to the first wireless access point was unsuccessful.

21. The method of claim 20, wherein the fourth audio prompt further comprises a statement indicating that the connection by the A/V device to the first wireless access point is weak and the speaker device should be moved to a location closer in proximity to the A/V device.

22. The method of claim 18, further comprising measuring a connection strength level between the first wireless access point and the A/V device.

23. The method of claim 22, further comprising determining that the attempt to connect the A/V device to the first wireless access point was successful when the connection strength level is above a connection strength threshold.

* * * * *